United States Patent
Debora et al.

(10) Patent No.: US 11,548,211 B2
(45) Date of Patent: Jan. 10, 2023

(54) JOINERS, METHODS OF JOINING, AND RELATED SYSTEMS FOR ADDITIVE MANUFACTURING

(71) Applicant: Mosaic Manufacturing Ltd., Toronto (CA)

(72) Inventors: Mitchell Oliver Debora, Thornhill (CA); Derek Alan Vogt, Calgary (CA); Christopher Patrick Labelle, Toronto (CA); Brendan Kyle Coady, New Market (CA)

(73) Assignee: Mosaic Manufacturing Ltd., Toronto (CA)

( * ) Notice: Subject to any disclaimer, the term of this patent is extended or adjusted under 35 U.S.C. 154(b) by 719 days.

(21) Appl. No.: 16/341,261

(22) PCT Filed: Oct. 20, 2017

(86) PCT No.: PCT/CA2017/051256
§ 371 (c)(1),
(2) Date: Apr. 11, 2019

(87) PCT Pub. No.: WO2018/072034
PCT Pub. Date: Apr. 26, 2018

(65) Prior Publication Data
US 2020/0130256 A1  Apr. 30, 2020

Related U.S. Application Data

(60) Provisional application No. 62/411,256, filed on Oct. 21, 2016.

(51) Int. Cl.
*B33Y 50/02* (2015.01)
*B29C 64/106* (2017.01)
(Continued)

(52) U.S. Cl.
CPC .......... *B29C 64/106* (2017.08); *B29C 64/188* (2017.08); *B29C 64/209* (2017.08);
(Continued)

(58) Field of Classification Search
CPC ... B29C 64/106; B29C 64/188; B29C 64/209; B29C 64/245; B29C 69/00; B29C 70/68;
(Continued)

(56) References Cited

U.S. PATENT DOCUMENTS 6,682,688 B1    1/2004  Higashi et al.
7,125,512 B2   10/2006  Crump et al.
(Continued)

FOREIGN PATENT DOCUMENTS

CA    2785598 A1    7/2011
CA    2848672 A1   10/2014
(Continued)

OTHER PUBLICATIONS

Belter et al., "Strengthening of 3D printed fused deposition manufactured parts using the fill compositing technique," PLOS|ONE, published Apr. 16, 2015 (https://doi.org/10.1371/journal.pone.0122915—retrieved Mar. 3, 2020).
(Continued)

*Primary Examiner* — Yuhui R Pan
(74) *Attorney, Agent, or Firm* — Hamilton, Brook, Smith & Reynolds, P.C.

(57) ABSTRACT

Joiners, methods of joining, and related systems for additive manufacturing are provided. The method of joining includes bulk depositing, by an additive manufacturing tool head, a joiner (anchor) of a second material in a receptacle in a body of a first material. Also, the method of joining includes depositing an anchor layer of a third material upon the anchor. Networks of joiners in 3D printed parts, multi-material parts comprising joiners, computer program prod-
(Continued)

ucts for providing joiners, joiner systems including trolleys, and related methods and systems are also provided. Further provided is a system, and method, for securing a part to a build platform and separating the part from the build platform.

4 Claims, 16 Drawing Sheets

(51) Int. Cl.
  *B29C 64/188* (2017.01)
  *B29C 64/245* (2017.01)
  *B29C 64/209* (2017.01)
  B33Y 10/00 (2015.01)
  B33Y 30/00 (2015.01)
  B32B 3/06 (2006.01)
(52) U.S. Cl.
  CPC .............. *B29C 64/245* (2017.08); *B32B 3/06* (2013.01); *B33Y 10/00* (2014.12); *B33Y 30/00* (2014.12); *B33Y 50/02* (2014.12)
(58) Field of Classification Search
  CPC ..... B29C 70/745; B32B 1/02; B32B 2250/04; B32B 2250/24; B32B 2307/202; B32B 2307/706; B32B 2307/708; B32B 2553/00; B32B 27/08; B32B 27/302; B32B 27/36; B32B 3/02; B32B 3/06; B32B 3/10; B32B 7/02; B33Y 10/00; B33Y 30/00; B33Y 40/00; B33Y 50/02; B33Y 80/00
  See application file for complete search history.

(56) References Cited

U.S. PATENT DOCUMENTS

| | | | |
|---|---|---|---|
| 7,236,166 B2 | 6/2007 | Zinniel et al. | |
| 7,667,158 B2 | 2/2010 | Dance et al. | |
| 7,917,243 B2 | 3/2011 | Kozlak et al. | |
| 8,668,859 B2 | 3/2014 | Pettis | |
| 9,168,699 B2 | 10/2015 | Pax | |
| 9,381,701 B1 | 7/2016 | Dufort et al. | |
| 9,433,969 B2 | 9/2016 | Pridoehl et al. | |
| 2007/0077323 A1 | 4/2007 | Stonesmith et al. | |
| 2007/0126157 A1 | 6/2007 | Bredt | |
| 2008/0006966 A1 | 1/2008 | Mannella | |
| 2010/0327479 A1 | 12/2010 | Zinniel et al. | |
| 2012/0046779 A1 | 2/2012 | Pax et al. | |
| 2012/0072006 A1 | 3/2012 | Knighton | |
| 2012/0328726 A1* | 12/2012 | Zenere ................. | B29C 64/135 425/174.4 |
| 2014/0039663 A1 | 2/2014 | Boyer et al. | |
| 2014/0048980 A1 | 2/2014 | Crump et al. | |
| 2014/0074274 A1 | 3/2014 | Douglas et al. | |
| 2014/0220168 A1 | 8/2014 | Perez et al. | |
| 2014/0308539 A1 | 10/2014 | Witz et al. | |
| 2014/0371895 A1 | 12/2014 | Sadusk et al. | |
| 2015/0014885 A1 | 1/2015 | Hofmann et al. | |
| 2015/0056318 A1 | 2/2015 | Ho | |
| 2015/0077215 A1 | 3/2015 | Ranky et al. | |
| 2015/0142153 A1 | 5/2015 | Chun et al. | |
| 2015/0266235 A1 | 9/2015 | Page | |
| 2015/0321418 A1 | 11/2015 | Sterman et al. | |
| 2016/0039152 A1 | 2/2016 | Hara | |
| 2016/0052208 A1 | 2/2016 | Debora et al. | |
| 2016/0144428 A1* | 5/2016 | Mironets ................. | B22F 12/00 219/76.12 |
| 2016/0167312 A1 | 6/2016 | Feinberg et al. | |
| 2016/0198576 A1 | 7/2016 | Lewis et al. | |
| 2017/0190120 A1* | 7/2017 | Bloome ................. | B33Y 50/02 |
| 2018/0022044 A1* | 1/2018 | Dulkiewicz ............. | B29C 64/20 425/375 |
| 2018/0250748 A1 | 9/2018 | Page | |

FOREIGN PATENT DOCUMENTS

| | | |
|---|---|---|
| CA | 2875872 A1 | 6/2015 |
| CN | 104097360 A | 10/2014 |
| CN | 104562024 A | 4/2015 |
| CN | 104786507 A | 7/2015 |
| CN | 204505844 U | 7/2015 |
| CN | 105014977 A | 11/2015 |
| CN | 105690766 A | 6/2016 |
| CN | 105751503 A | 7/2016 |
| CN | 105773982 A | 7/2016 |
| EP | 2719484 A1 | 4/2014 |
| WO | 2014121032 A1 | 8/2014 |
| WO | 2015/131317 A1 | 9/2015 |
| WO | 2015139095 A1 | 9/2015 |

OTHER PUBLICATIONS

Conner-Simons, A., "'MultiFab' 3D-prints a record 10 materials at once, no assembly required," CSAI-MIT, Aug. 27, 2015 (https://www.csail.mit.edu/news/multifab-3d-prints-record-10-materials-once-no-assembly-required—retrieved Mar. 3, 2020).
Grunewald, S., "Arevo labs take 3D prnting 3D with new 6-axis composite part additive manufacturing platform," 3Dprint.com | The voice of 3D printing / additive manufacturing, Nov. 16, 2015 (https://3dprint.com/105787/arevo-abs-6-axis-ram-platform/—retrieved Mar. 3, 2020).
Kickstarter: Z-Unlimited add-on for Ultimaker (https://www.kickstarter.com/projects/1661525705/z-unlimited-add-on-for-ultimaker/description—retrieved Mar. 3, 2020).
3D Printing Blog: More on the PCB Build Plate for ABS Printing Trick, Nov. 20, 2014 (https://3dprinting-blog.com/tag/abs-perfboard-printing/—retrieved Mar. 3, 2020).
Thingiverse: Flexible Coupling—NinjaFlex/ABS Dual Print, Nov. 5, 2013 (https://www.thingiverse.com/thing:177981—retrieved Mar. 3, 2020).
Thingiverse: Perfboard Build Surface, Jan. 3, 2011 (https://www.thingiverse.com/thing:5428/#comments—Mar. 3, 2020).
International Search Report dated Jan. 24, 2018 re International Application No. PCT/CA2017/051256 entitled "Joiners, Methods of Joining, and Related Systems for Additive Manufacturing," filed Oct. 20, 2017.
Written Opinion of the International Searching Authority dated Jan. 24, 2018 re International Application No. PCT/CA2017/051256 entitled "Joiners, Methods of Joining, and Related Systems for Additive Manufacturing," filed Oct. 20, 2017.
Belter et al., "Strengthening of 3D printed fused deposition manufactured parts using the fill compositing technique," PLOS ONE / DOI:10. 1371/journal.pone.0122915, Apr. 16, 2015.
"Strengthening the connection between layers of Fdm 3D printed objects with z-anchors," www.3ders.org, 5 pages downloaded Mar. 25, 2019.

* cited by examiner

JOINERS, METHODS OF JOINING, AND RELATED SYSTEMS FOR ADDITIVE MANUFACTURING

RELATED APPLICATIONS

This application is the U.S. National Stage of International Application No. PCT/CA2017/051256, filed Oct. 20, 2017, which designates the U.S., published in English, and claims the benefit of U.S. Provisional Application No. 62/411,256, filed Oct. 21, 2016. The entire teachings of the above applications are incorporated herein by reference.

FIELD

The field of the invention concerns methods and products for fastening materials together in additive manufacturing (AM), including fastening printing materials to each other and to build platforms.

BACKGROUND

Traditional mass manufacturing is characterized by high volume production of standardized products, typically by means of an assembly line. Components of mass-produced products are generally manufactured independently by specialized processes and then assembled into a finished product, which is then distributed. With many recent advances in additive manufacturing (AM), it is becoming more feasible to manufacture complex products in a single build process based on a digital representation of the product. Rather than building each part separately and then assembling them, AM has potential for products to be manufactured in an integrated manner. Automated single AM processes for manufacturing would provide many benefits.

In order to develop systems capable of manufacturing functional products through a largely AM process, many technological obstacles will need to be overcome. Some of these are to develop advanced methods for fastening multiple materials together during a build process, for fixturing parts during the build process, for integrating multiple build technologies together, and for improving end-part properties. The disclosure herein relates to solutions to such obstacles, which are discussed in detail below.

SUMMARY

According to a first aspect, the invention provides a joiner comprising: an anchor of a second material which anchor is bulk deposited by an additive manufacturing tool head in a receptacle in a body of a first material. According to a second aspect, the invention provides a method of joining, comprising: bulk depositing by an additive manufacturing tool head an anchor of a second material in a receptacle in a body of a first material.

According to a third aspect, the invention provides a joiner comprising: (a) an anchor of a second material which anchor is bulk deposited by an additive manufacturing tool head in a receptacle in a body of a first material; and (b) an anchor layer of a third material which anchor layer is deposited upon the anchor. According to a fourth aspect, the invention provides a method of joining, comprising: (a) bulk depositing by an additive manufacturing tool head an anchor of a second material in a receptacle in a body of a first material; and (b) depositing an anchor layer of a third material upon the anchor.

In some embodiments of the first, second, third, and fourth aspects, the body of the first material may be formed in an additive manufacturing process by the additive manufacturing tool head.

In some embodiments of the first, second, third, and fourth aspects, the body of the first material may be formed in layers, the receptacle formed in at least two adjacent layers.

In some embodiments of the first, second, third, and fourth aspects, the body of the first material may be a foreign object formed by means other than by the additive manufacturing tool head.

In some embodiments of the first, second, third, and fourth aspects, the body of the first material may be a build platform of an additive manufacturing system. In certain of these embodiments, at least one of position and orientation of the receptacle in the build platform may be determined by datuming.

In some embodiments of the first, second, third, and fourth aspects, the anchor may extend through a hole in a foreign object to secure the foreign object to the body. In certain of these embodiments, at least one of position and orientation of the foreign object relative to the body may be determined by datuming.

In some embodiments of the first, second, third, and fourth aspects, the additive manufacturing tool head may be a print head of a 3D printer.

In some embodiments of the first, second, third, and fourth aspects, the first and second materials may be the same.

In some embodiments of the third and fourth aspects, the second and third materials may be the same.

In some embodiments of the third and fourth aspects, the second and third materials may be electrically conductive, and the receptacle may be formed in an electrically conductive material isolated from the first material of the body.

In some embodiments of the third and fourth aspects, the anchor layer may comprise an inter-anchor segment that connects the anchor to another anchor.

According to a fifth aspect, the invention provides a joiner for layers of material in a 3D printed part, the joiner comprising: (a) a receptacle formed in at least two adjacent layers of a 3D printed part of at least a first material, the receptacle crossing an interface between the two adjacent layers; and (b) an anchor of a second material, the anchor being bulk deposited in the receptacle to join the at least two adjacent layers.

According to a sixth aspect, the invention provides a method of joining layers of material in a 3D printed part, the method comprising: (a) forming a receptacle in at least two adjacent layers of a 3D printed part of at least a first material, the receptacle crossing an interface between the two adjacent layers; and (b) bulk depositing an anchor of a second material into the receptacle to join the at least two adjacent layers.

According to a seventh aspect, the invention provides a network of joiners in a 3D printed part, the network comprising: (a) a plurality of receptacles formed in a plurality of layers of a 3D printed part, a first portion of the receptacles extending through at least a first pair of adjacent layers, a second portion of the receptacles extending through at least a second pair of adjacent layers different from the at least first pair of adjacent layers; and (b) a plurality of anchors, each anchor bulk deposited in one of the receptacles, the anchors and receptacles forming a network of joiners to join the plurality of layers.

According to an eighth aspect, the invention provides a method of joining layers of a 3D printed part, the method comprising: (a) forming a plurality of receptacles in a plurality of layers of a 3D printed part, a first portion of the receptacles extending through at least a first pair of adjacent layers, a second portion of the receptacles extending through at least a second pair of adjacent layers different from the at least first pair of adjacent layers; and (b) bulk depositing a plurality of anchors in the receptacles to join the plurality of layers, each anchor deposited in one of the receptacles.

In some embodiments of the seventh and eighth aspects, the first portion of the receptacles and the second portion of the receptacles may extend through at least one common layer.

In some embodiments of the seventh and eighth aspects, at least one of the anchors may connect with at least one other of the anchors.

According to a ninth aspect, the invention provides a multi-material part comprising: (a) a first body formed of a first material in an additive manufacturing process; (b) a second body formed of a second material in the additive manufacturing process, the second body contacting the first body at an inter-material interface between the first and second bodies; (c) one or more receptacles formed in at least one of the first and second bodies at the interface; and (d) one or more anchors bulk deposited in the one or more receptacles to form one or more joiners to join the first and second bodies, each joiner formed of one of the anchors and one of the receptacles.

According to a tenth aspect, the invention provides a method of joining materials of a multi-material part, the method comprising, in an additive manufacturing process: (a) forming a first body of a first material; (b) forming a second body of a second material, the second body contacting the first body at an inter-material interface between the first and second bodies; (c) forming one or more receptacles in at least one of the first and second bodies at the interface; and (d) bulk depositing one or more anchors in the one or more receptacles, the anchors and receptacles forming one or more joiners to join the first and second bodies, each joiner formed of one of the anchors and one of the receptacles.

In some embodiments of the ninth and tenth aspects, in at least a portion of the anchors, an anchor arm may connect each anchor to at least one of the first and second bodies.

In some embodiments of the ninth and tenth aspects, the receptacles may be formed while forming the at least one of the first and second bodies.

In some embodiments of the ninth and tenth aspects, the first and second bodies may be formed in layers, and the receptacles may be formed in at least two layers of the at least one of the first and second bodies.

According to an eleventh aspect, the invention provides a multi-material part comprising: (a) a first body of a first material; (b) a second body of a second material, the second body contacting the first body at an inter-material interface between the first and second bodies; (c) one or more receptacles in the first body at the interface; and (d) one or more anchors of the second material bulk deposited by an additive manufacturing tool head in the one or more receptacles, the anchors and receptacles forming one or more joiners to join the first and second bodies.

According to a twelfth aspect, the invention provides a method of joining materials of a multi-material part, the method comprising: (a) providing a first body of a first material, the first body including one or more receptacles; (b) bulk depositing by an additive manufacturing tool head one or more anchors of a second material in the one or more receptacles; and (c) forming a second body of the second material, the second body contacting the first body at an inter-material interface between the first and second bodies, the anchors and receptacles forming one or more joiners to join the first and second bodies.

According to a thirteenth aspect, the invention provides a multi-material part comprising: (a) a first body formed in one or more layers of a first material in an additive manufacturing process; (b) a second body formed in one or more layers of a second material in the additive manufacturing process, the first body contacting the second body at an inter-material interface; and (c) a tie road formed of the first material and in a plane of one of the layers of the first body, the tie road extending from the first body into the second body and across the inter-material interface.

According to a fourteenth aspect, the invention provides a method of forming a multi-material part, the method comprising: (a) forming a first body in one or more layers of a first material in an additive manufacturing process; (b) forming a second body in one or more layers of a second material in the additive manufacturing process, the first body contacting the second body at an inter-material interface; and (c) forming a tie road of the first material and in a plane of one of the layers of the first body, the tie road extending from the first body into the second body and across the inter-material interface.

According to a fifteenth aspect, the invention provides a method comprising: (a) identifying an interface between a first material and a second material; (b) identifying a set of locations for positioning a set of joiners at the interface; (c) establishing one or more receptacles, each receptacle positioned at a location from the identified set of locations; and (d) providing tool path instructions for bulk depositing one or more anchors by an additive manufacturing tool head, each anchor being bulk deposited in one of the receptacles to create a joiner of the set of joiners.

According to a sixteenth aspect, the invention provides a computer program product comprising a non-transitory computer executable code embodied in a computer-readable medium that, when executed by one or more processors, causes the one or more processors to: (a) identify an interface between a first material and a second material; (b) identify a set of locations for positioning a set of joiners at the interface; (c) establish one or more receptacles, each receptacle positioned at a location from the identified set of locations; and (d) provide tool path instructions for bulk depositing one or more anchors by an additive manufacturing tool head, each anchor being bulk deposited in one of the receptacles to create a joiner of the set of joiners.

According to a seventeenth aspect, the invention provides a method comprising: (a) identifying an interface between a first material and a second material in a digital model of an object; (b) identifying a set of locations for positioning a set of joiners at the interface; (c) adding one or more receptacles to the digital model, each receptacle positioned at a location from the identified set of locations; and (d) providing tool path instructions for bulk depositing one or more anchors by an additive manufacturing tool head, each anchor being bulk deposited in one of the receptacles to create a joiner of the set of joiners.

According to an eighteenth aspect, the invention provides a computer program product comprising a non-transitory computer executable code embodied in a computer-readable medium that, when executed by one or more processors, causes the one or more processors to: (a) identify an interface between a first material and a second material in a digital model of an object; (b) identify a set of locations for positioning a set of joiners at the interface; (c) add one or more receptacles to the digital model, each receptacle positioned at a location from the identified set of locations; and (d) provide tool path instructions for bulk depositing one or more anchors by an additive manufacturing tool head, each anchor being bulk deposited in one of the receptacles to create a joiner of the set of joiners.

According to a nineteenth aspect, the invention provides a method comprising: (a) identifying an interface between a first material of an object and a second material of a build platform; (b) identifying a set of locations for positioning a set of joiners at the interface; (c) identifying one or more receptacles of the build platform according to the identified set of locations; and (d) providing tool path instructions for bulk depositing one or more anchors by an additive manufacturing tool head, each anchor being bulk deposited in one of the identified receptacles to create a joiner of the set of joiners.

According to a twentieth aspect, the invention provides a computer program product comprising a non-transitory computer executable code embodied in a computer-readable medium that, when executed by one or more processors, causes the one or more processors to: (a) identify an interface between a first material of an object and a second material of a build platform; (b) identify a set of locations for positioning a set of joiners at the interface; (c) identify one or more receptacles of the build platform according to the identified set of locations; and (d) provide tool path instructions for bulk depositing one or more anchors by an additive manufacturing tool head, each anchor being bulk deposited in one of the identified receptacles to create a joiner of the set of joiners.

In some embodiments of the nineteenth and twentieth aspects, the one or more receptacles of the build platform may be identified by employing a datum feature associated with the build platform. In certain of these embodiments, the set of locations may be identified in relation to a boundary of the interface. In certain of these embodiments, the first and second materials may be the same. In certain of these embodiments, the set of locations may be identified in relation to a boundary of the interface, and the first and second materials may be the same.

In some embodiments of the fifteenth, sixteenth, seventeenth, eighteenth, nineteenth, and twentieth aspects, the set of locations may be identified in relation to a boundary of the interface.

In some embodiments of the fifteenth, sixteenth, seventeenth, eighteenth, nineteenth, and twentieth aspects, the first and second materials may be the same.

According to a twenty-first aspect, the invention provides a system for securing a part to a build platform and separating the part from the build platform, the system comprising: (a) a build platform having a receptacle; and (b) an anchor bulk deposited by an additive manufacturing tool head in the receptacle, the anchor attached to a base of a part being formed in an additive manufacturing process, the anchor securing the part to the build platform while the part is being formed, at least a portion of the anchor being separable from at least one of the base and the receptacle to separate the formed part from the build platform.

According to a twenty-second aspect, the invention provides a method for securing a part to a build platform and separating the part from the build platform, the method comprising: (a) bulk depositing by an additive manufacturing tool head an anchor in a receptacle of a build platform; (b) attaching the anchor to a base of a part being formed in an additive manufacturing process, the anchor securing the part to the build platform while the part is being formed; and (c) separating the formed part from the build platform by separating at least a portion of the anchor from at least one of the base and the receptacle.

In some embodiments of the twenty-first and twenty-second aspects, the anchor may be attached to the base by a mechanism that effects controlled separation of at least a portion of the anchor from the base, to separate the formed part from the build platform.

In some embodiments of the twenty-first and twenty-second aspects, the receptacle may be an active receptacle, and activation of the receptacle may cause separation of at least a portion of the anchor from the at least one of the base and the receptacle.

In some embodiments of the twenty-first and twenty-second aspects, the receptacle may be formed in an anchor pin positioned in the build platform, and actuation of the anchor pin may cause separation of at least a portion of the anchor from the at least one of the base and the receptacle.

In some embodiments of the twenty-first and twenty-second aspects, the receptacle may be formed in an anchor trolley movably positioned in a channel of the build platform, and movement of the anchor trolley in the channel may allow separation of at least a portion of the anchor from the at least one of the base and the receptacle.

In some embodiments of the twenty-first and twenty-second aspects, the receptacle may be a linear receptacle and include a linear actuation mechanism, the anchor deposited around the linear actuation mechanism to form an injected trolley, and actuation of the injected trolley by the linear actuation mechanism may cause separation of at least a portion of the anchor from the at least one of the base and the receptacle.

According to a twenty-third aspect, the invention provides a separator to separate a part from a build platform in an additive manufacturing system, the separator comprising: (a) a build platform having a surface, an opening in the surface, and a channel below the surface, the channel communicating with the opening and being parallel to a plane of the platform, a part being positioned on the surface and above at least a portion of the opening; and (b) a trolley movable in the channel, wherein movement of the trolley in the channel and under and/or adjacent to the part causes separation of the part from the build platform.

According to a twenty-fourth aspect, the invention provides a method of separating a part from a build platform in an additive manufacturing system, the method comprising: (a) providing a build platform having a surface, an opening in the surface, and a channel below the surface, the channel communicating with the opening and being parallel to a plane of the platform, a part being positioned on the surface and above at least a portion of the opening; and (b) moving a trolley in the channel and under and/or adjacent to the part to cause separation of the part from the build platform.

In some embodiments of the twenty-third and twenty-fourth aspects, the part may be formed by an additive manufacturing tool head.

In some embodiments of the twenty-third and twenty-fourth aspects, the opening of the build platform may comprise a punctate receptacle in which an anchor is bulk deposited to secure the part to the build platform, a top portion of the anchor being attached to the part, a lower portion of the anchor extending into the channel, and the trolley including a severing means to shear off the lower portion of the anchor with movement of the trolley in the channel. In certain of these embodiments, the part may be formed by an additive manufacturing tool head.

In some embodiments of the twenty-third and twenty-fourth aspects, the opening of the build platform may comprise a linear receptacle in which an anchor is bulk deposited to secure the part to the build platform, a top portion of the anchor being attached to the part, and the trolley including a portion that extends into the receptacle to dislodge the anchor from the receptacle with movement of the trolley in the channel. In certain of these embodiments, the part may be formed by an additive manufacturing tool head.

In some embodiments of the twenty-third and twenty-fourth aspects, the opening of the build platform may comprise a linear opening and the trolley may include a portion that extends through the opening and above the surface of the build platform to dislodge the part from the build platform with movement of the trolley in the channel. In certain of these embodiments, the part may be formed by an additive manufacturing tool head.

According to a twenty-fifth aspect, the invention provides a device comprising: (a) a build platform associated with a build volume of an additive manufacturing system, the build platform having a linear receptacle; (b) a trolley in the linear receptacle, the trolley comprising at least one anchor bulk deposited by a tool head of the additive manufacturing system, the trolley securing a first portion of a part to the build platform, the part being formed by the additive manufacturing system and having a size that exceeds the build volume in at least one dimension; and (c) a linear actuating mechanism coupled to the trolley, the actuation mechanism moving the trolley relative to the build platform to move the first portion of the part outside of the build volume, the build volume thereafter being available for forming of a second portion of the part.

According to a twenty-sixth aspect, the invention provides a method comprising: (a) providing a build platform associated with a build volume of an additive manufacturing system, the build platform having a linear receptacle; (b) positioning a trolley in the linear receptacle, the trolley comprising at least one anchor bulk deposited by a tool head of the additive manufacturing system, the trolley securing a first portion of a part to the build platform, the part being formed by the additive manufacturing system and having a size that exceeds the build volume in at least one dimension; and (c) with a linear actuating mechanism coupled to the trolley, moving the trolley relative to the build platform to move the first portion of the part outside of the build volume, the build volume thereafter being available for forming of a second portion of the part.

In some embodiments of the twenty-fifth and twenty-sixth aspects, the trolley may be an injected trolley bulk deposited in the linear receptacle by the tool head of the additive manufacturing system.

In some embodiments of the twenty-fifth and twenty-sixth aspects, the trolley may be an anchor trolley having at least one receptacle into which the at least one anchor is bulk deposited.

According to a twenty-seventh aspect, the invention provides a method comprising: (a) providing a build platform of an additive manufacturing system, the build platform having at least one linear receptacle, and associated trolleys deposited in the at least one linear receptacle; (b) depositing by a tool head of the additive manufacturing system first and second components on the build platform, the first and second components supported by the trolleys, the first component adapted to receive a first portion of an object, and the second component adapted to receive a second portion of the object; and (c) with an actuating mechanism coupled to the trolleys, moving at least one trolley relative to the build platform to move at least one of the first and second components to at least partially enclose the object.

In some embodiments of the twenty-seventh aspect, the first and second components may be fixturing components to clamp the object in place.

In some embodiments of the twenty-seventh aspect, the first and second components may be mold components defining a cavity, and the object may be molded by filling material into the cavity.

BRIEF DESCRIPTION OF THE DRAWINGS

The foregoing will be apparent from the following more particular description of example embodiments of the invention, as illustrated in the accompanying drawings. The drawings are not necessarily to scale, emphasis instead being placed upon illustrating embodiments of the present invention.

FIG. 10A is a cross-section of a two-body object without joiners. FIG. 10B is an exploded view of FIG. 10A. FIG. 10C is cross-section of an alternative two-body object having joiners.

FIG. 16A is an isometric view of the hose fitting. FIG. 16B is a cutaway view of the same part.

FIG. 18A is an isometric view of a multi-material, 3D printed orthopedic shoe insole and FIG. 18B is a top view of the same shoe insole. FIG. 18C is a side view of a digital model (e.g., CAD model) of the shoe insole of FIG. 18A and FIG. 18B. FIG. 18D is an exploded view of FIG. 18C. FIG. 18E is a top view of the first base material of the shoe insole of FIG. 18A and FIG. 18B. FIG. 18F shows a first example approach to positioning joiners on the base material of FIG. 18E wherein joiners of the same size are randomly distributed within the multi-material boundary. FIG. 18G shows a second example approach to positioning joiners on the base material of FIG. 18E wherein a grid of potential joiner locations is superimposed. FIG. 18H shows a third example approach wherein large linear joiners, large punctate joiners, and small punctate joiners are positioned within the multi-material boundary. FIG. 18I shows a fourth example approach wherein concentric linear joiners are positioned within the multi-material boundary.

FIG. 20A is a partial cross-section of a build platform in isometric view. FIG. 20B and FIG. 20C are isometric views of build platforms.

FIG. 22A through FIG. 22D and FIG. 22G are cross-sectional views. FIG. 22E and FIG. 22F are isometric views. FIG. 22H and FIG. 22I are 3D views. A first example of how to remove the part created in FIG. 22B and FIG. 22C is shown in FIG. 22D, FIG. 22E, and FIG. 22F, and a second example is shown in FIG. 22G, FIG. 22H, and FIG. 22I.

FIG. 25A through FIG. 25D show a stepwise example use of an anchor shear trolley. FIG. 25E through FIG. 25H show a stepwise example use of an anchor ejecting trolley. FIG. 25I through FIG. 25L show a stepwise example use of a part ejecting trolley.

FIG. 27 is a simple schematic of a manufacturing system having a first operation and a second operation. On the left, the first operation involves an FFF 3D printer with print head, and on the right, the second operation involves a subtractive manufacturing CNC mill with machining head.

FIG. 28A is a top view of a rectangular printed circuit board (PCB). FIG. 28B is a side view of the same PCB in a cross-section cutaway, and a side cross-section of a 3D printed part that is adapted to receive the PCB. FIG. 28C is a side view cross-section showing the 3D printed part with the PCB positioned in it.

FIG. 29A through FIG. 29C show a first stepwise example employing fixture components that receive and secure the object. FIG. 29D through FIG. 29F show a second stepwise example employing mold components, wherein a part is formed in the mold cavity.

DESCRIPTION OF EMBODIMENTS

Figure 1:
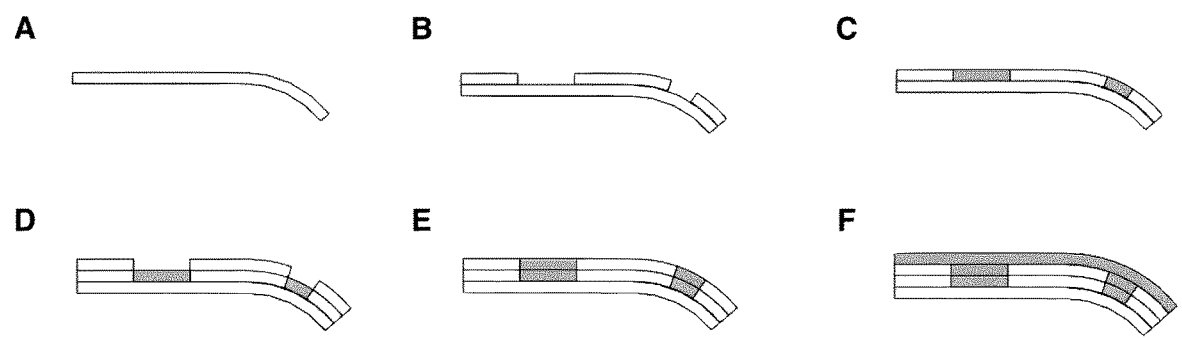
FIG. 1A through FIG. 1F show cross-sections of 3D printed layers exemplifying layered material deposition.

A description of example embodiments of the invention follows.

For convenience, the majority of the discussion herein will concern fused filament fabrication (FFF) using a 3D printer. However, the inventions disclosed herein are not limited to that type of additive manufacturing (AM) and are applicable in all AM technology families including, but not limited to, material extrusion (e.g., FFF), material jetting, stereolithography (SLA), selective laser sintering (SLS), binder jetting, direct energy deposition, sheet lamination and powder bed fusion. Moreover, when the terms "material is printed" or "material is deposited" are employed for the purposes of this disclosure, it should not be taken to refer only to material extrusion technologies. Rather, this more generally refers to material that is being committed to form a structure. For example, in SLA, material is not deposited as in material extrusion but rather is cured or solidified in a certain region. Similarly, in SLS, material is not deposited as in material extrusion but rather a region of pre-deposited material can be sintered to form a structure. For the purposes of this disclosure, we will consider this "printing" or "depositing".

Series enabled multi-material extrusion technology is described U.S. application Ser. No. 14/831,396 to Debora et al., which published on Feb. 25, 2016 as US 2016/0052208, the entire teachings of which are incorporated herein by reference in their entirety.

For the purposes of this disclosure, the term "printed part(s)" refers to the component(s) being manufactured by additive manufacturing, especially by a 3-dimensional (hereinafter "3D") printer, and may include any other structures such as support material, waste structures or other relevant specimens constructed during the additive manufacturing (e.g., 3D printing) process. For convenience, sometimes the shortened version "part" is used interchangeably with "printed part". For the purposes of this disclosure, the term "fixturing" refers to securing a printed part to a desired position on a build platform.

For purposes of this disclosure, the term "tool path" not only encompasses movement of an AM tool head, but also deposition amounts and other relevant printing parameters of a given AM process.

For the purposes of this disclosure, the term "road" refers to a segment of printed material. For the purposes of this disclosure, the term "tool pathing" refers to the preparation of software code (generally G-code) such that a 3D object is represented by coordinates used in additive manufacturing. This generally involves a mathematical slicing operation.

For the purposes of this disclosure, the term "build volume" refers to the maximum size (length, width, and height) of a part that a 3D printer can print. Generally, build volume is derived from the maximum limits of where the print head can move with respect to the build platform.

Many approaches exist in traditional manufacturing for securing different materials together, from adhesives to threaded fasteners. Commonly, components are manufactured independently, and then, through manual or automated labor, are assembled and fastened together. For example, a bolt or screw may be used to fasten a plastic handle to an aluminum scoop to form a spade. It is to be noted that 3D printed parts can be used as inputs in this process in what is hereinafter referred to as a "hybrid AM approach". An AM object(s) can be assembled together with a traditionally manufactured component(s) to form a multi-material part. For example, a metal scoop can be 3D printed and then manually assembled and screwed onto a plastic handle to form a spade. Although this is leveraging AM in a traditional manufacturing workflow, the hybrid AM approach does not capture the full value potential of manufacturing an entire product through a single integrated AM process. In this case 3D printing is being used as an alternative manufacturing method for an individual input component.

If a spade were to be produced entirely through additive manufacturing, however, there would be motivation for the two materials to be printed together with an integrated fastener to avoid the requirement for assembly of the components and fastening. This would save manual assembly costs and could simplify the design of the components as assembly tolerances would no longer be relevant. The invention disclosed herein provides methods and apparatus that enable such integrated/embedded manufacturing to take place.

In some cases, however, AM may not be the ideal manufacturing method to produce a part of a multi-material assembly. For example, if a certain component is very large, it may be best to make it using a quicker manufacturing method such as injection molding. In another case, some materials are naturally occurring and cannot be 3D printed, e.g., wood or rock. Based on the state of the art of 3D printing technology, some components are not yet suitable for 3D printing such as complex multi-layer circuit boards. In such cases, it may be beneficial to introduce traditionally manufactured objects into an integrated additive manufacturing process. Introduced parts will hereafter be referred to as "foreign objects". The use of foreign objects in an AM process is different from a hybrid AM approach as foreign objects are inputs to the integrated AM process whereas hybrid AM is an assembly of discrete components, some of which were produced through AM. Note that a foreign object can also be a 3D printed part. For example, you may want to print a stainless steel screwdriver shaft and then insert this into an AM process as a foreign object so that a plastic handle can be added to the shaft to form a functional product.

As current 3D printing methods generally print parts layer by layer, the resultant parts often exhibit anisotropy, meaning that they have different properties in different directions. Generally, under load a printed part will fracture along the interface between two or more layers. A part/product is only as strong as its weakest link and thus interlayer bonding (adhesion) has been a limiting factor to the durability and strength of 3D printed parts, particularly parts that will be under load. Prior to the present invention, alternative manufacturing methods such as injection molding or subtractive manufacturing might have been preferred for products under load. However, as described hereinbelow, the invention provides approaches to strengthen or fortify interfaces between 3D printed layers, thus increasing the strength of 3D printed parts.

Most 3D printing materials have sufficient self-adhesion, meaning that when they are printed they adhere well to themselves. However, interfaces between different material bodies can pose a significant risk of part failure. A limitation of current multi-material printing technologies is that the different materials must be able to substantially adhere to each other during and after the printing process. This is a significant limitation as many different materials do not adhere well to each other and thus cannot currently be printed together to form a multi-material part. For example, two common 3D printing materials, polylactic acid (PLA) and acrylonitrile-butadiene-styrene (ABS) do not adhere well to each other when printed onto one another.

Problems can occur during the printing process with printing of incompatible materials. As the print head deposits a second material onto a first material, if the second material does not adhere well to the first material then the second material will likely detach from the surface and cause the print to fail. Problems can also exist with the finished multi-material part. If the second material sticks well enough to the first material that the print can be completed but the bond between these two materials is not as strong as interlayer bonds are for either material with itself, then the interface between the first and second materials will likely be the weakest part of the object. Accordingly, the part may break along this interface.

It has been shown that chemical modification of certain materials can make them adhere better to each other. However, such chemical modification may be used at the expense of other desirable material properties. Prior to the present invention, there has been no universal solution that permits any combination of materials to be printed and adhere together. In the same way that the methods and products of the invention can be used to strengthen single material parts, they can be used to strengthen multi-material parts.

In traditional 3D printing, 3-dimensional objects are built layer by layer. Each layer is usually fabricated before the fabrication of the next layer above it begins. This simplifies the 3D printing process into a series of two-dimensional slices. In order to deposit each layer, a print head will usually traverse a tool path and deposit build material on top of a previous layer.

It is to be noted however that some advanced 3D printing systems are capable of manufacturing parts with layers that are not planar. In these cases, the layer can be described as a surface and is not 2-dimensional. For simplicity moving forward, most of the discussion will focus on standard 2-dimensional layer printing with the exception of sections where surface printing is discussed.

Material deposition that occurs solely layer by layer will be referred to as "layered material deposition". FIG. 1 shows cross-sections of 3D printed layers exemplifying layered material deposition. Referring to FIG. 1A, a base layer of a first material is deposited. In order to communicate the concept of layered material deposition for 3D surfaces, in this example the right end is depicted as curving down. Referring to FIG. 1B, a second layer of the first material is deposited onto the base layer in 3 discrete regions leaving two gaps in the second layer. Referring to FIG. 1C, a second layer, this time of a second material, is deposited into the gaps to complete the second layer. Referring to FIG. 1D, a third layer of the first material is deposited onto the second layer, again leaving two gaps, which gaps are aligned with the second material that previously filled in the gaps in the second layer. Referring to FIG. 1E, a third layer of the second material is deposited into the gaps in the third layer. Referring to FIG. 1F, a fourth layer of the second material is deposited upon the third layer, resulting in a multi-material cross-section created solely through layered material deposition.

Figure 2:
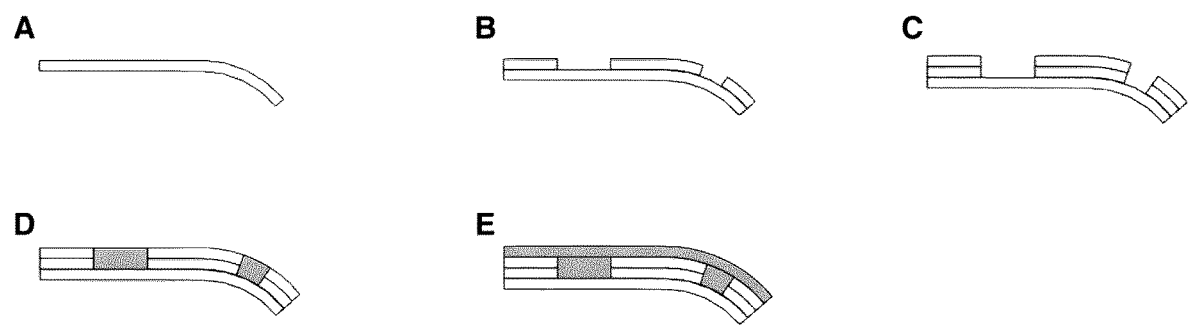
FIG. 2A through FIG. 2E show cross-sections of 3D printed layers demonstrating layered material deposition and "bulk material deposition".

In contrast to layered material deposition, we have shown that material can be deposited by an AM printer in a non-layered manner to form a non-layered body/portion within a 3-dimensional object (FIG. 2). For instance, material can be deposited (e.g., extruded) into a receptacle to form a bulk material deposit.

FIG. 2 shows cross-sections of 3D printed layers demonstrating layered material deposition and "bulk material deposition". For purposes of this disclosure, bulk material deposition means deposition (e.g., formation) of material in bulk format in a non-layered manner. Bulk material deposition typically is the equivalent of two or more layers of material being deposited at once. It is understood that in some 3D printers, not all regions are printed with the same layer thickness. For instance, outside roads (e.g., outside shells) may be printed at 0.3 mm height and inside roads of filament may be printed at 0.1 mm height. The 0.3 mm outside roads would not be considered bulk material deposition for the purposes of this disclosure.

Referring to FIG. 2A, a base layer of a first material is deposited. In order to communicate the concept of layered material deposition for 3D surfaces, in this example the right end is depicted as curving down. Referring to FIG. 2B, a second layer of the first material is deposited onto the base layer in 3 discrete regions leaving two gaps in the second layer. Referring to FIG. 2C, a third layer of the first material is deposited onto the second layer in 3 discrete regions again leaving two gaps in the third layer, which gaps are aligned with the gaps in the previously deposited second layer, thereby creating two receptacles. Referring to FIG. 2D, a second region of a second material is bulk deposited into the gaps in the second and third layers of the first material, creating anchors in the two receptacles. Referring to FIG. 2E, a fourth layer of the second material is deposited upon the third layer, resulting in a multi-material cross-section created through layered material deposition and, at two selected locations, bulk material deposition. The layer deposited upon the anchors is termed "the anchor layer" and in most embodiments is of the same material as the anchors. In some embodiments, the same additive manufacturing tool head (e.g., 3D print head) is used for bulk material deposition and layered deposition.

It is necessary that anchor layer material adheres well to the tops of the anchors. If there is not sufficient adhesion between the anchor layer and the tops of the anchors, fastening may fail. In some situations, other than to the tops of the anchors, the material being used to print the anchor layer may not adhere well to the layer below.

In some alternative embodiments, the process of printing an anchor and printing an anchor layer could be done in series. That is, a first anchor may be printed in a first receptacle and then a segment of the anchor layer may be printed directly from the first anchor to a second receptacle. When the print head reaches the second receptacle, it bulk deposits material forming a second anchor in it. This may be more efficient than printing the anchors first and then printing the anchor layer. This may also provide improved bonding between the anchors and the anchor layer as the material is continuous. In some embodiments, the anchor layer may be printed directly from an anchor to another location and may terminate at that other location, e.g., terminate without connecting to another anchor.

While the resulting cross-sections in FIG. 1F and FIG. 2E appear similar, the difference in the way that they were printed has a significant effect on several resultant part properties. Most notably, the bulk deposited material of FIG. 2E can be largely uniform and isotropic, unlike the layered material that filled the gaps in FIG. 1F. This layered second material of FIG. 1F consists of two layers that have a discrete interface between them and thus their properties would likely be anisotropic.

The method and anchors depicted in FIG. 2 exemplify a novel approach in additive manufacturing, here strengthening a 3D printed part. The approach can be used in a large variety of applications, providing numerous advantages, examples of which are described below.

The inventors have shown that a joiner can be created between a first material and a second material by bulk depositing the second material into a receptacle in a base made of the first material, which provides an anchoring/locking relationship between the two materials. In many embodiments, a layer of material (preferably the second material) is provided upon the base and the anchor. Such a joiner has been coined a Mosaic RIVET™ by Mosaic Manufacturing Ltd. Unlike standard fasteners like nuts and bolts, glue, welding and the like, a joiner can be created inside of a 3D printer without requirement for additional tooling, fasteners, or labor. Advantageously, joiners are substantially material-independent, as they do not rely on material-specific bonding compatibility. Use of joiners in additive manufacturing processes could become as pervasive and powerful as use of nuts, bolts, screws and other fasteners in traditional manufacturing processes.

In a first broad aspect, a "joiner" comprises an anchor of a second material which anchor is bulk deposited by an AM tool head (e.g., a 3D printer print head) in a receptacle in a base of a first material, for example, so that the first and second materials are joined. A joiner can extend at least the equivalent of two deposited layers (e.g., layers deposited locally or in the vicinity of the joiner) into the base, and may extend a greater distance into the base. It is understood that the equivalent of two layers can vary among AM systems, as a layer could be, for example, 0.05 mm in SLA and 0.25 m in concrete printing. Further, there may be different layer thicknesses within one printed part. If the base is not printed and is a foreign object, an equivalent of two deposited layers may refer to typical layers deposited by the tool head of the AM system. The first material and the second material may be the same. Alternatively, the first material and the second material may differ in color, chemical composition, electrical conductivity and/or other characteristics. The anchor may comprise a portion that is shaped to be mechanically locked with the receptacle into which it is deposited. In some embodiments, the anchor may comprise a portion that extends beyond the top of the receptacle into which it is deposited; e.g., the portion may have a diameter that is greater than the diameter of the receptacle top.

In a second broad aspect, a "joiner" comprises (i) an anchor of a second material which anchor is bulk deposited by an AM tool head (e.g., a 3D printer print head) in a receptacle in a base of a first material, and (ii) an anchor layer of a third material which anchor layer is deposited upon the anchor. Thus, the first material and the deposited third material are linked. A joiner can extend at least the equivalent of two deposited layers (e.g., layers deposited locally or in the vicinity of the joiner) into the base, and may extend a greater distance into the base. In preferred embodiments, the anchor layer is also deposited on the base. In many embodiments, additional layers are deposited upon the anchor layer. The first material and the third material may be the same. Alternatively, the first material and the third material may differ in color, chemical composition, electrical conductivity and/or other characteristics. In most embodiments, the second material and the third material are the same, including some embodiments where the first material and the third material are the same. In certain embodiments, the material that forms the anchor may be different from the material of the anchor layer.

The anchor material may be selected for bulk deposition based on, for example, lower viscosity, different ductility, different strength, dissolvability (example of which will be discussed below), higher bond strength to other materials, etc. In certain embodiments (examples of which will be discussed below), it may be desirable for an anchor material to be electrically conductive. In some embodiments, an anchor may be made of a material that expands upon curing, solidifying, irradiation, drying, etc. in order to improve linking performance.

A receptacle according to the invention defines a cavity within a solid body that is partially exposed to at least one surface of the solid body. The shape of a receptacle is not limited to any particular geometry. A receptacle can have any of a variety of shapes. In some embodiments, a particular geometry may be selected based on the materials being used, strength requirement of the joiner, aesthetic requirements of the joiner/printed part, nozzle geometry of the 3D printer creating the joiner, the properties of the second material being deposited to form an anchor in the receptacle, etc.

Figure 3:
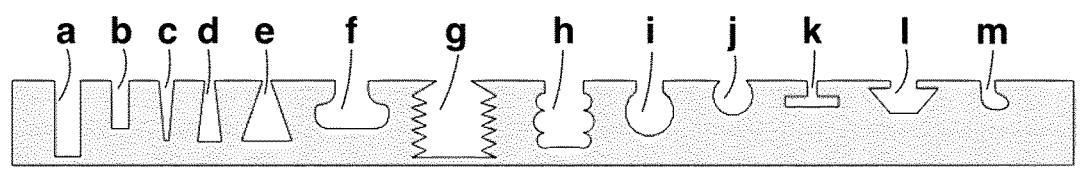
FIG. 3 shows examples of receptacle cross-sectional geometries. Here reference characters (lower case letters) refer to the cross-sectional geometries.

Several examples of receptacle cross-sectional geometries are shown in FIG. 3. Here reference characters (lower case letters) refer to the cross-sectional geometries. Receptacles (a) and (b) have simple rectangular geometry and show that the depth and width can vary. Receptacles (c), (d) and (e) have trapezoidal geometry; it can be seen that a receptacle's sides may angle inwardly or outwardly and have different degrees of slope. Receptacles (f), (k) and (l) have slot type geometries where (l) in particular is similar to a commonly used "t-slot" profile in structural framing extrusion. Receptacle (g) has threaded or knurled sides. Receptacles (h), (i) and (j) have different round geometries. Receptacle (h) has multiple round sections. Note that receptacle (i) has a neck and extends deeper below the surface than receptacle (j), which is a circle that is exposed to the top surface. Receptacle (m) represents a profile that is not symmetrical about its center axis.

A receptacle may be punctate, i.e., defining a small, discrete cavity, hereinafter referred to as a "punctate receptacle". Alternatively, a receptacle may be continuous or non-punctate, wherein a receptacle spans a length of an exposed surface, hereinafter referred to as a "linear receptacle". As the term is used herein, a linear receptacle need not be a straight line, and optionally may include a curve(s). Receptacles may have a consistent cross-section or a varying cross-section along their length. For convenience, examples discussed below will generally concern constant cross-section geometries.

Figure 4:
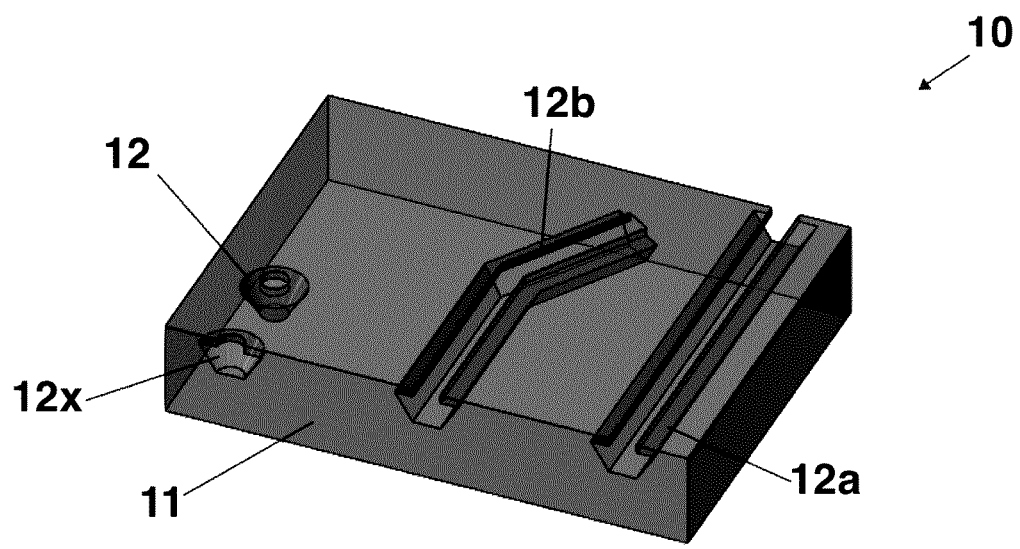
FIG. 4 shows examples of punctate and linear receptacles in a solid body.

FIG. 4 shows a punctate receptacle as well as a linear receptacle in a solid body. Solid body 10 has several receptacles within it. On surface 11 of solid body 10 it can be seen that a geometry similar to (l) of FIG. 3 is used. For convenience, this geometry will be used in examples below, but the methods and products according to the invention are not limited to such geometry. Punctate receptacle 12 is an axisymmetric cavity with the aforementioned profile. The same receptacle geometry 12 is shown in cross-section as 12x. Elements 12a and 12b represent linear receptacles in solid body 10. Receptacle 12a is a linear receptacle that passes all the way through solid body 10 and follows a straight path whereas receptacle 12b is a linear receptacle that does not pass all the way through to the other side of solid body 10 and follows an angled or curved path. In some embodiments, a receptacle such as 12b could be fully contained within the solid; it does not need to be exposed at surface 11.

A receptacle can be designed into a part. An injection molded part, for example, could have one or more receptacles built into it. A part made through AM, for example, can have receptacles planned at a 3D model stage so that they exist when the part is printed. Alternatively, receptacles can be added to a part as a secondary process. For example, a receptacle could be drilled or machined into a part. For example, a dovetail bit may be used to machine a receptacle into a part. In some embodiments, an additive manufacturing device such as an FFF 3D printer may be equipped with a subtractive manufacturing tool in order to machine receptacles into either foreign objects or objects manufactured on the 3D printer. Receptacles can also be naturally occurring, native or common to a part (e.g., bark on a tree, or a hole in a screwdriver handle).

An anchor is formed by bulk depositing a material into a receptacle. As discussed above, "deposition" is not limited to injection by a 3D printer and includes curing, solidifying, or any other means of adding material to a part being produced by AM. An anchor may fill a portion or all of the volume of a receptacle. An anchor may form a link in any of the following ways, or any combination of these ways:

1) Mechanical bond: If an anchor is larger than a constriction of the receptacle, or enmeshes with the receptacle, then the anchor is physically constrained/locked inside the receptacle.

2) Friction bond: The anchor applies a pressure on the inside surfaces of the receptacle, causing the anchor to be constrained by friction.

3) Chemical bond: The anchor is chemically bonded to the material forming the surfaces of the receptacle.

Figure 5:
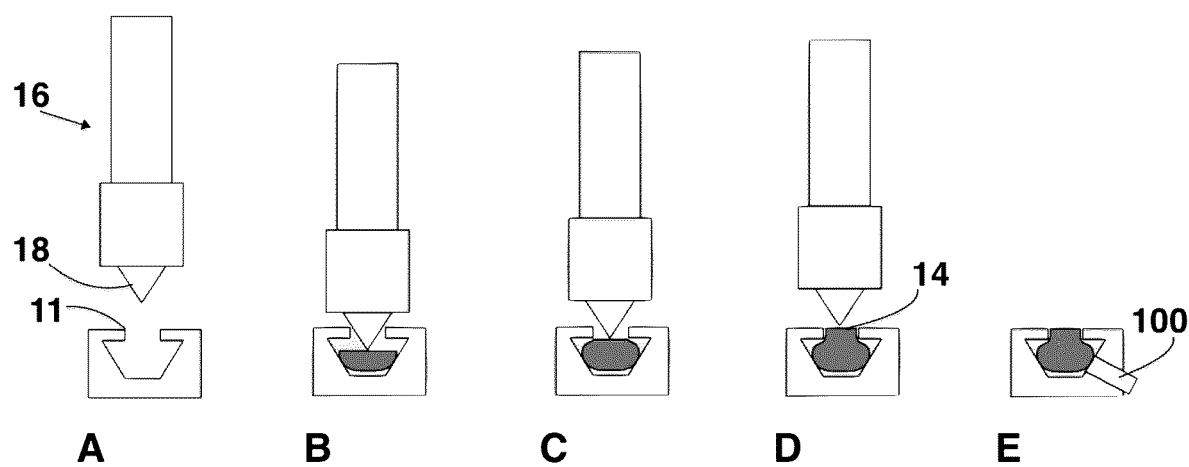
FIG. 5A through FIG. 5D show an example of one way an anchor can be formed using a material depositing print head.
FIG. 5E shows an alternative example of how an anchor can be formed/deposited.

FIG. 5 (not drawn to scale) shows an example of one way an anchor may be formed using a material depositing print head. FIG. 5A shows a cross-section of a receptacle in a solid body. A print head 16 with a nozzle 18 is positioned above the top surface 11 of the body. To initiate the creation of an anchor, the print head is positioned closer to (or into) the receptacle as is shown in FIG. 5B, such that the nozzle touches or almost touches the top surface 11. This constrains the opening of the receptacle to permit more even deposition of material. Material is then deposited into the receptacle and, as the material fills the volume of the receptacle, the print head is lifted up as is shown in the progression from FIG. 5B to FIG. 5C. The receptacle is filled with material until the top of the anchor 14 reaches the top surface 11 as is shown in FIG. 5D.

Note that the process described above is a specific example of how an anchor could be formed through bulk material deposition. In some embodiments, a nozzle may be above the top surface, in line with it, partially inside the receptacle, or may enter the receptacle to constrain the top opening as was described above. With reference to FIG. 5, in some embodiments, material may be deposited until the anchor's top sits below top surface 11, is equal with the top surface (as shown in FIG. 5D), or until the anchor's top is above the receptacle top surface 11. In certain embodiments, a nozzle may be used to force material deeper into the receptacle; that is, the nozzle could be actuated to mechanically ram/compress material into the receptacle after it has been deposited or during the deposition process. In some embodiments, the nozzle does not need to move during the anchor bulk material deposition process. It could simply position itself above the receptacle and deposit material while remaining static.

FIG. 5E shows an alternative embodiment of how an anchor can be formed/deposited. In FIG. 5E, 100 represents a source which can be an electromagnetic radiation emitter, an energy source such as for example as a heater, a binder source, a material jetting source, a catalyst source, a material deposition source, or any other AM print head component for various 3D printing technologies. As discussed previously, there are special considerations for how a "bulk deposited material region" (non-layered region) can be created using other AM technologies than fused material bulk deposition. In SLA, instead of curing a large voxel from outside of a receptacle using a printer's primary energy source, an energy source 100 that emits UV light or other appropriate electromagnetic radiation with characteristics that cause a given resin to cure/solidify may be positioned at a receptacle in order to cause a bulk solidification within the receptacle. In SLS, a similar strategy may be employed wherein an energy source 100 creates heat sufficient to cause sintering/solidification of a bulk volume of material within the receptacle. In binder jetting technologies, the source 100 may deposit a volume of binder in order to cause a bulk portion of material within the receptacle to be covered with binder and thus solidified. In material extrusion, source 100 may be a material deposition source such as an FFF print head. In some embodiments, a receptacle may be filled from the inside where possible. Advantages of this may include the ability to use a high flow rate material deposition print head to fill the receptacle faster. The ability to fill the receptacle from the bottom or side may also allow more complete filling, which may enhance joiner performance. In some embodiments, a source 100 may be positioned at a receptacle in a build platform (such as FIG. 20B). Receptacles within build platform may be equipped with multiple sources 100 to allow rapid anchor creation. In some embodiments, source 100 may be fixed in a body, such as for example a build platform. In other embodiments, source 100 may be mounted to an arm (e.g., a robotic arm) capable of positioning the source at various positions and orientations within the 3D printer's build volume.

Optionally, any of a variety of sensors may be used to monitor the process of bulk depositing material into a receptacle. In some embodiments, a force sensor may be used to monitor the force on the print head in order to detect when a receptacle is filled. Alternatively, an optical sensor such as a camera or the like may be used to detect when a receptacle is filled.

Optionally, nozzle geometry may be adapted to provide improved bulk material deposition performance. For example, the nozzle may be slenderer than the norm to allow it to go deeper into a receptacle to deposit an anchor. In some embodiments, the nozzle may have a flatter area around the orifice which can act to constrain a receptacle top opening during bulk material deposition. In some embodiments, a nozzle with a large orifice diameter may be used to deposit material rapidly into a receptacle.

Optionally, the temperature of an extruder may be raised to decrease the viscosity of the material to allow it to flow faster and/or fill an entire receptacle before solidifying. In some embodiments, the temperature of the receptacle or material the receptacle is in may be controlled in order to affect the viscosity of the material being deposited. For example, the receptacle may be heated to lower the viscosity of a thermoplastic that is being deposited inside of it.

Optionally, an anchor deposition nozzle may be used that is separate from a primary material deposition nozzle. The anchor deposition nozzle may be selected or modified for improved anchor deposition (e.g., high flow rate, hotter temperature, and/or deeper nozzle geometry) and would generally deposit the same material as the primary build material to ensure good anchor to anchor layer bonding.

For the case of a printing (AM) technology where material is to be cured, sintered, solidified, etc. inside of a receptacle, there exist several well understood strategies within each printing technology to enable this. In general, voxel size is increased during printing. Typically, it is desirable to have a small voxel size for good printing resolution, but in the case of forming a bulk deposition inside of a receptacle, a large voxel size is generally desired. In SLA, for example, a larger amount of energy (e.g., ultraviolet radiation) could be applied at a selected location, resulting in larger voxel size useful for creation of a bulk material anchor.

Figure 6:
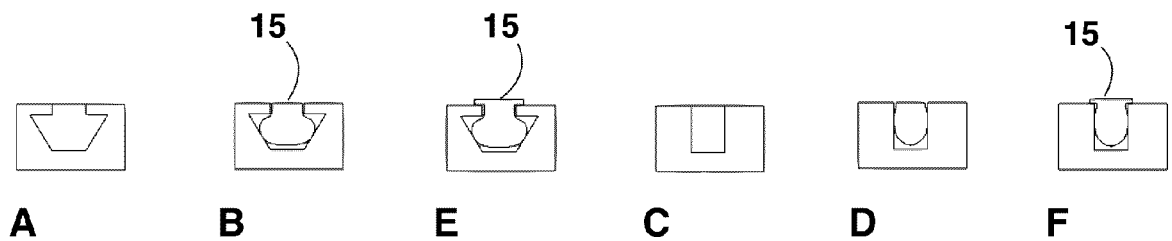
FIG. 6A through FIG. 6F show various examples of deposited anchors.

FIG. 6 shows various examples of deposited anchors. FIG. 6A, FIG. 6B, and FIG. 6E show identical receptacles in a body. In FIG. 6A, the anchor fills the entire receptacle. In FIG. 6B, the anchor only partially fills the receptacle. In FIG. 6E, the anchor also partially fills the receptacle, but in contrast to FIG. 6B where the top 15 of the anchor is substantially even with the top surface of the body, in FIG. 6E the top 15 of the anchor is spread a short distance across the top surface of the body. This increase in area of the anchor top may be advantageous in creating greater adhesion to the anchor layer that is deposited on it, particularly if the body and the anchor layer are of different composition. It can be seen that in all three cases, the base of the anchor is larger than the top of the receptacle and thus the deposited anchor is mechanically locked in the receptacle.

FIG. 6C, FIG. 6D, and FIG. 6F show identical receptacle geometries but in FIG. 6C the anchor fills the entire receptacle, and in FIG. 6D and FIG. 6F the anchor only fills a portion of the receptacle. In contrast to FIG. 6D where the top of the anchor is substantially even with the top surface of the body, in FIG. 6F the top 15 of the anchor is spread a short distance across the top surface of the body. This increase in area of the anchor top may be advantageous in creating greater adhesion to the anchor layer that is deposited on it, particularly if the body and the anchor layer are of different composition. In the examples of FIG. 6C, FIG. 6D, and FIG. 6F, the base of the receptacle is the same size as the top of the receptacle. Thus, a mechanical lock might not be as strong as for the previously described receptacle shape, particularly if the anchor top surfaces in FIG. 6C and FIG. 6D are perfectly smooth.

Per the discussion of anchor-receptacle bonding above, ways that a deposited anchor could be fastened/locked into a receptacle include the following three cases:

1) The surfaces that make up a receptacle may not be perfectly smooth. If the receptacle was 3D printed it may have ridges in these surfaces. It has been found that when anchor material fills a receptacle it conforms to the inside surfaces of the receptacle. Material of the anchor that gets into any ridges or grooves in the receptacle may enmesh to form a locking bond.

2) During the process of depositing material into a receptacle there could be pressure on the inside surfaces of the receptacle. This may produce increased friction between the anchor and surfaces of the receptacle and cause locking due to friction.

3) In some embodiments, the respective materials of the receptacle and the anchor may be selected so that chemical bonds may be formed between them.

The inventors performed a test where anchors of PLA were deposited into receptacles of ABS having both of the receptacle geometries shown in FIG. 6. The result was that the PLA anchors were securely locked in both receptacle geometries. Since PLA does not adhere well or chemically bond to ABS, this demonstrated that both case 1 (mechanical bond) and case 2 (friction fit) are viable securing mechanisms.

There are many parameters of a joiner that can be adjusted to lead to different behavior/performance of the joiner. For instance, it may be desirable to have a joiner that can be dislodged with a low amount of force to allow a user to break apart an interface. One such example is printing break-away packaging material around a printed part, which packaging material is "pulled off" by a user when removing the printed part from a shipping container.

In some embodiments, a joiner may be designed to fracture at a particular location. In other embodiments, a joiner may be designed such that the anchor can be pulled out of the receptacle without breaking.

In some embodiments, joiners may be created to allow multi-use snap fits that can engage and disengage. In an example application such as packaging for shipping, products may have co-printed packaging attached to them so that they are ready to package or ship right out of the 3D printer. When a user receives the product, the user can easily remove the packaging by pulling it off of the product, that is, pulling anchors out of receptacles. If ever the user needed to return or ship the product again, the user could press the packaging back onto the product by having the anchors snap back into the receptacles.

In some embodiments, joiners may be made to be very strong but brittle where the anchor meets the material body in order to promote a clean break under high load. This could be used in certain products to make them more environmentally friendly. In an application where an epoxy or glue was used in the past, joiners may be used instead. When a multi-material printed product is processed in a waste facility, the joiners could fracture allowing the different materials to separate cleanly and be independently recycled.

In some embodiments, joiners may be fabricated out of a soluble/dissolvable material. For example, joiners could be made from HIPS (high impact polystyrene), which can be dissolved using a liquid dissolving agent. When a product reaches its end of life and materials need to be sorted for recycling, this could be enabled by simply passing the part through a dissolving bath. In some embodiments, channels could be designed into parts that contain dissolvable joiners to allow for a dissolving agent to access the joiner. For example, if a steel bicycle pedal has HIPS joiners securing an ABS casing to the steel, then channels could be designed into the multi-material assembly to allow dissolving agents to reach the HIPS joiners. When the part is recycled, the HIPS joiners could be dissolved, allowing the ABS to be separated from the steel.

Figure 7:
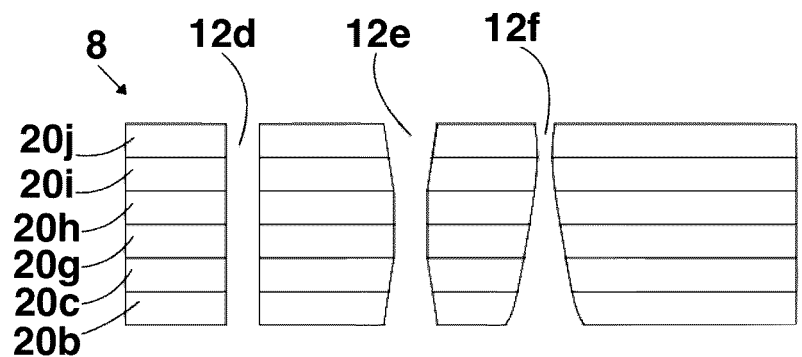
FIG. 7 shows a cross-section of an example 3D printed part having multiple layers and receptacles passing therethrough.

As discussed previously, one consequence of 3D printing being a layer by layer process is anisotropy of the resultant parts. Referring to FIG. 7, the cross-section of a 3D printed part 8 has many layers 20 in it wherein there is an interface between each lower layer and the layer above it (e.g., between lower layer 20b and layer 20c above). In order to improve the strength of 3D printed parts a solution is required to strengthen such interfaces between printed layers. A joiner can be used to supplement intra-material bonding/locking strength and thus improve printed part strength.

FIG. 7 shows three example receptacles 12d, 12e, and 12f in a printed part 8. Each receptacle profile is axisymmetric for simplicity of the examples, although it does not need to be. The receptacles could be linear or punctate, as was described previously.

In FIG. 7, receptacle 12d profile is a simple cylindrical profile passing through all six layers. When material is bulk deposited into the receptacle, it fills the volume to form an anchor. When the part 8 is loaded, the anchor reinforces the part to resist the layers separating or shearing. The anchor is not layered and thus it does not have the same weakness along the layer interfaces as the rest of the part does. Similarly to the anchors discussed for FIG. 6C and FIG. 6D, the anchor can lock to the layers by meshing with the ridges of the non-flat receptacle surface, even though the geometry of the receptacle 12d is not inherently capturing. Friction, and/or optional chemical bonding may also contribute to the locking of the anchor to the layers.

In FIG. 7, receptacle 12e profile is a constant cylinder for the middle two layers and increases in diameter toward the top and bottom. The middle section is a constriction as its diameter is smaller than the diameters at the top and bottom of the receptacle. When material is bulk deposited into the receptacle, it fills the volume to form an anchor. The geometry of the anchor is "capturing" and locks the layers together.

In FIG. 7, receptacle 12f profile is similar to receptacle 12e profile in that it has a constriction, although in receptacle 12f profile the constriction is much closer to the top of the part 8. The diameter of the receptacle at the bottom of receptacle 12f profile is much larger than anywhere above; thus this receptacle is not symmetrical about its midline as receptacle 12d and 12e profiles are. When material is bulk deposited into the receptacle, it fills the volume to form an anchor. The geometry of the anchor locks the layers together as it is capturing. The geometry of receptacle 12f may be desirable to aid in the process of depositing material into a receptacle. The larger diameter near the bottom of the receptacle allows for less resistance as material is deposited into the receptacle. In general, if material encounters too much resistance during deposition, it may not be able to get all the way to the bottom of a receptacle and can solidify and/or clog near the top. Increasing diameter as depicted for receptacle 12f profile may help reduce the chance of clogging and increase the reliability of material deposition filling a receptacle. In some experiments, the inventors have found this geometry allows for deeper receptacle filling than the geometries of receptacles 12d or 12e.

Figure 8:
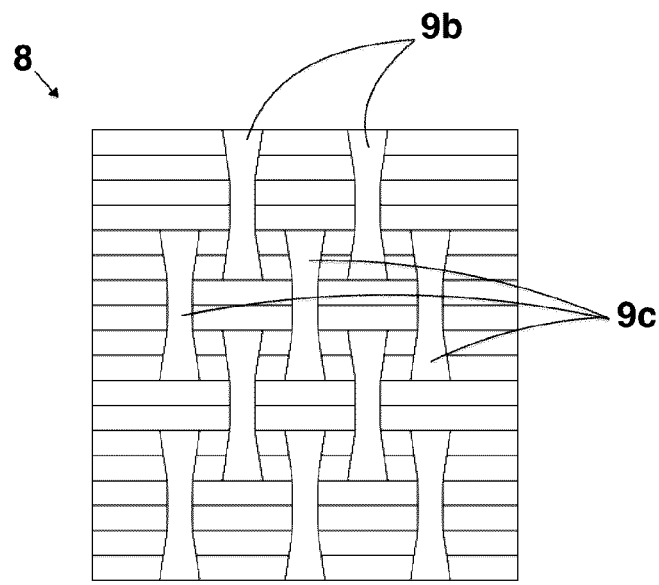
FIG. 8 shows an example of how multiple joiners can be used to form a reinforcing network throughout a 3D printed part.

FIG. 8 shows an example of how multiple joiners can be used to form a reinforcing network throughout a 3D printed part. A cross-section of a 3D printed part 8 with many joiners 9b and 9c in it is depicted. Joiners 9b reinforce the top six layers as discussed for FIG. 7. Joiners 9c reinforce the six layers they are in. These two groupings of reinforced layers overlap by two layers, which ensures that the groupings are reinforced with respect to each other. Other configurations of joiners are of course also encompassed by the invention.

The spacing, sizing, and position of each joiner may be selected based on the functional requirements of the printed part. Software, e.g., finite element analysis, can be used to automatically identify locations for joiners and insert them into the build, based on one or more criteria, including parametric inputs such as material properties, strength requirements, etc. For example, a 3D printed part that is long in the direction normal to the plane of the layers with a varying cross-section may require more joiners in the narrow cross-sections to reinforce these higher stress areas. Selection of spacing, sizing, and position of joiners and identification of locations for joiners can also be based, at least in part, on user input.

Figure 9:
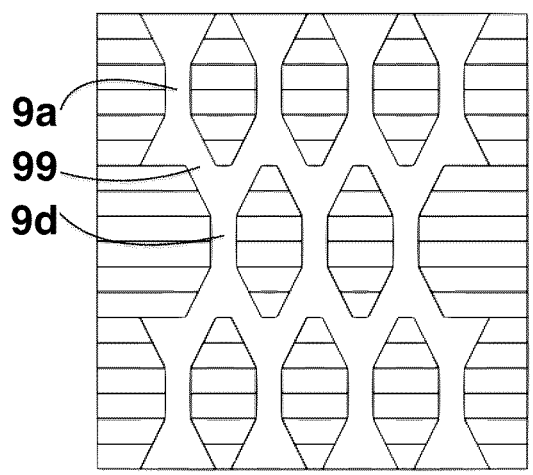
FIG. 9 shows an example of how a plurality of joiners can connect to form a continuous network in a printed part.

FIG. 9 shows an example of how a plurality of joiners may connect to form a continuous network in a printed part. Joiner 9a connects with joiner 9d at overlap area 99. Such a connection occurs elsewhere throughout the part. Conveniently, in some embodiments, anchor material could be bulk deposited by a 3D printer in a single operation to fill all connected receptacles at once, thereby producing a reinforced printed part. In some embodiments, the receptacles could be filled with anchors by the 3D printer as printing progressed.

In some embodiments, a stimulus such as, for example, heating, cooling, exposing to UV light, exposing to other electromagnetic radiation, adding a catalyst or other substance to initiate a chemical reaction (e.g., polymerization), etc. may be employed to solidify the anchor material after filling the receptacle network. Optionally, a two-part epoxy could be used to fill all the receptacles and solidify. It may be advantageous to use a two-part epoxy that is not exothermic in order to prevent the part from being damaged due to energy released during the solidification process.

In the current state of multi-material additive manufacturing, if a first material and a second material do not adhere well to each other, then when a layer of the first material is deposited onto the second material, it may curl up or fall off. Typically when this happens during FFF printing, the material that is curling up will get stuck to the print head and cause complete printing failure. Also, when a multi-material printed part has a load applied to it to the point of breaking, the part generally breaks apart along the interface between the materials. The weaker the inter-material bonding, the easier the different materials are to break apart. In an example, the inventors printed a flexible TPE (thermoplastic elastomer) on top of a standard PLA material to create a vibration-dampening camera mount. When the print was completed and a force was applied to the part to remove it from the build platform, the TPE body broke away from the PLA body along the multi-material interface, causing the part to fail.

Overcoming such obstacles would enable a new range of functional products to be manufactured through AM. Just as joiners can be used to strengthen single material parts, they can be used to strengthen multi-material parts. Joiners can provide reinforcement of multi-material interfaces to offer material-independent bonding/coupling/locking.

Figure 10:
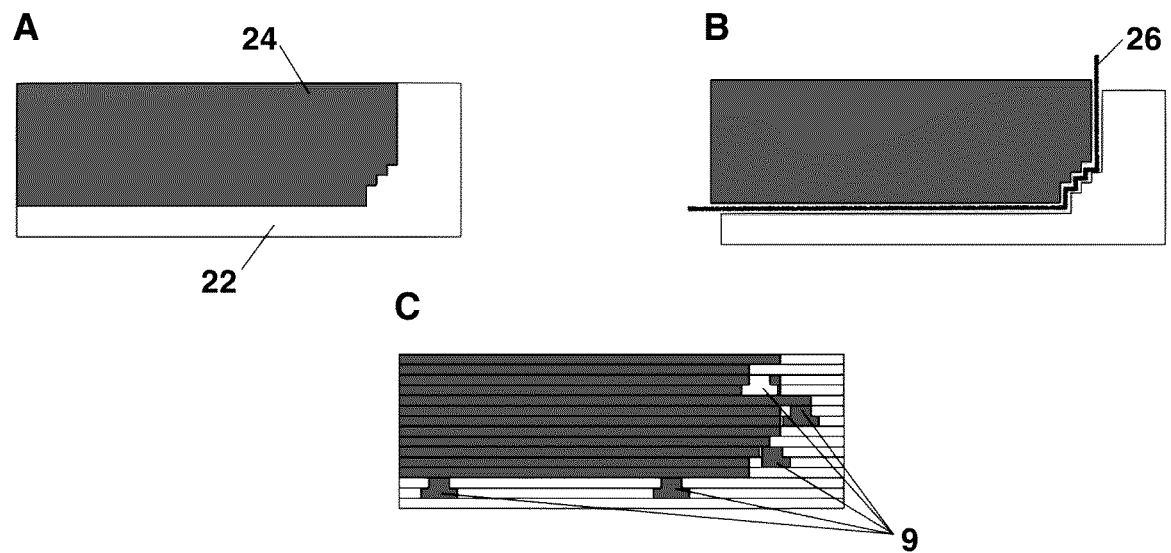
FIG. 10A through 10C illustrate an example of how joiners can be used in a two-body object.

FIG. 10 depicts an example of a two-body object to show how joiners can be used under several different constraints. FIG. 10A is a cross-section of a two-body part with a first white base material 22 and a second grey material 24. FIG. 10B is an exploded view of the same part that shows the two materials with a gap between them to highlight interface 26 between the two bodies. FIG. 10C is a cross-section showing an alternative version of the part wherein joiners 9 are used to lock the two bodies together along the interface between the two materials. Joiners can be employed for horizontal, angled, and vertical interfaces, as will be discussed now in depth.

Figure 11:
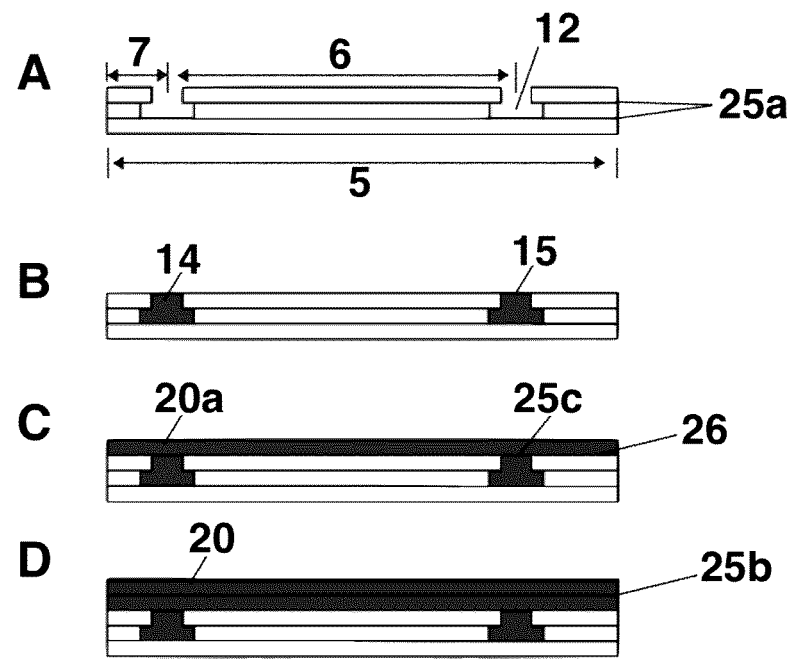
FIG. 11A through FIG. 11D show in cross-section a stepwise example of how joiners can be used to link together two different materials that are printed horizontally on top of each other.

FIG. 11 shows a stepwise example of how joiners can be used to link together two different materials that are printed horizontally on top of each other. The interface between the different materials is in the plane of the printed layers. FIG. 11A is a cross-section showing three layers of a first white material with two receptacles 12 in them spaced by distance 6. The leftmost receptacle is spaced from the end of the part a distance 7 and the entire length of the part is 5. Intra-material interfaces 25a generally have sufficient self-adhesion. Referring to FIG. 11B, anchors 14 of a second grey material have been deposited into the receptacles. The top surface of the print at this stage has two exposed anchor surfaces 15 of the second material which will be used to anchor the next layer. FIG. 11C shows a cross-section wherein an anchor layer 20a of the second material has been deposited, creating interface 26 between the first and the second materials. Interface 25c has also been created between the anchors and the anchor layer 20a. Even if the adhesion at interface 26 is not strong, the two joiners provide adhesion between the two different materials.

Note that the segment of length 6 of layer 20a that is between the anchors is supported on both sides, whereas the segment of length 7 of layer 20a from the left anchor to the left end of the part is only supported on its right side by the left anchor. There exists a maximum length 7 that a segment of a given material at a multi-material interface should be from an anchor without being supported on both sides, beyond which there may not be sufficient adhesion. If the length 7 is too long, then the segment may have insufficient adhesion and move out of place, potentially causing print failure. The maximum length that is acceptable will hereinafter be referred to as the maximum unsupported road length. The maximum unsupported road length will depend on several factors including but not limited to the materials being printed, the thickness and width of the segment/road, the printing process (FFF vs. SLA, etc.), the orientation of the print relative to the direction of gravity, the solidification rate of the material being printed, etc.

FIG. 11D is a cross-section showing two layers of the second material on top of three layers of the first material. The interface 25b between the two layers of the second material will likely have good intra-material adhesion.

There are several types of multi-material interfaces, and various joiner options for each. The example depicted in FIG. 11 represents the simplest such interface, which is an inter-layer interface between a first material and a second material that lies in the plane of the printed layers. It is similar to the case depicted in FIG. 7, and the joiner approach of FIG. 7 could be applied in the case of FIG. 11 as an alternative. However, the approach of FIG. 11 presents an advantage for some material combinations in that it does not rely on inter-material bonding. For example, in FIG. 7, if layers 20b, 20c, 20g were of a first material and layers 20h, 20i, 20j were of a second material, joiners could be bulk deposited after all six layers had been printed, as was previously discussed, in order to fasten the three layers of the first material to the three layers of the second material. However, substantial inter-material bonding would be needed to ensure that layer 20*h* could be printed on layer 20*g* without causing the print to fail.

Figure 12:
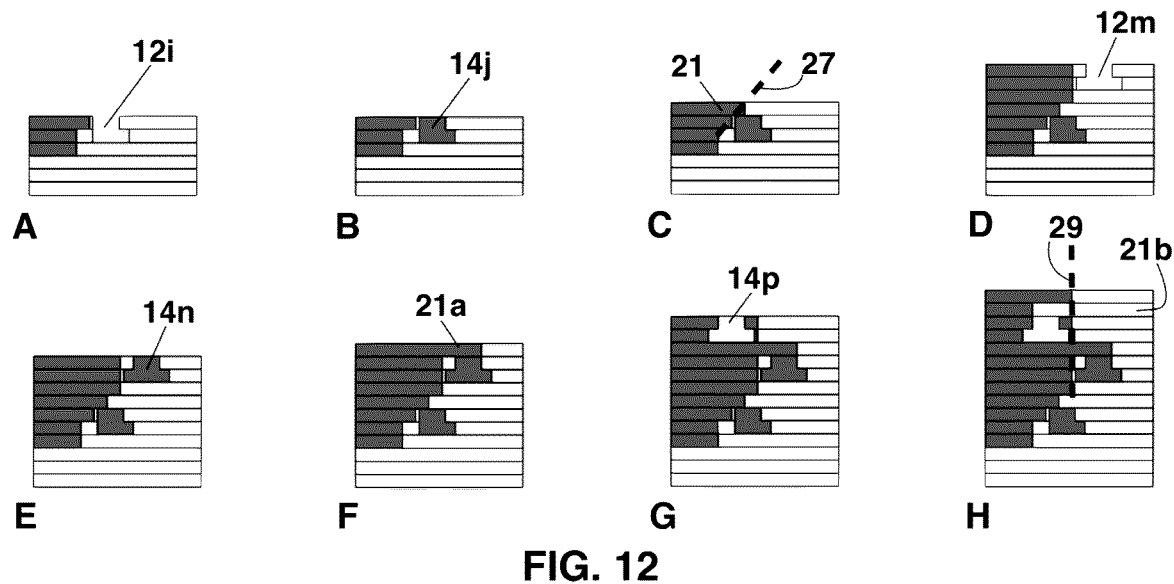
FIG. 12A through FIG. 12H show in cross-section a stepwise example of how joiners can be used for intra-layer bonding, i.e., when the multi-material interface is not between layers but rather is within a layer.

FIG. 12 shows a stepwise example of how joiners can be used for intra-layer bonding, i.e., when the multi-material interface is not between layers but rather is within a layer. The cross-sections of FIG. 12 show a material interface that is within a layer along the plane 27 diagonally into the page (depicted in FIG. 12C). Referring to FIG. 12A, a receptacle 12*i* has been created in the first white base material. Note that this receptacle geometry has been adapted based on its close proximity to the boundary of the first material. When compared to receptacle 12*m* of FIG. 12D, it is apparent that the bottom left portion is missing from receptacle 12*i*. Referring to FIG. 12B, the receptacle 12*i* has been filled with an anchor 14*j* of a second grey material. Referring to FIG. 12C, an additional layer 21 of the second material has been printed to link the anchor 14*j* with the grey body. This segment 21 which extends past the grey body boundary in order to reach an anchor is an example of an "anchor arm". Note that the anchor arm 21 of FIG. 12C is different from layer 20*a* in FIG. 11 as layer 20*a* is a part of the grey body and would exist even if joiners were not being employed. Anchor arm 21 of FIG. 12, however, extends past the inter-material interface/boundary for the purpose of connecting the grey body to the embedded anchor 14*j*.

An anchor arm may be a single printed layer or multiple printed layers. Similarly to how a joiner may be punctate or linear, an anchor arm may be a punctate anchor arm or it may be a linear anchor arm that connects a length of a body to a linear anchor. (Referring to FIG. 10A, it can be seen that an anchor arm does not exist in the original model of a multi-material part).

FIG. 12D shows a vertical multi-material inter-layer interface. Receptacle 12*m* has been printed into the white body. In FIG. 12E, anchor 14*n* has been bulk deposited into the receptacle 12*m* to form an anchor point for anchor arm 21*a* shown in FIG. 12F. Note that the anchor 14*n* has been spaced from the inter-material boundary 29 (depicted in FIG. 12H) to allow the receptacle geometry to include a left portion without interfering with the boundary 29. In the progression from FIG. 12F to FIG. 12G to FIG. 12H, it can be seen that another joiner is used to reinforce the interface 29. Anchor 14*p* was printed into the grey body and then anchor arm 21*b* was printed to anchor the white material to anchor 14*p*.

In this example with a vertical interface, two joiners were used, one comprising an anchor 14*p* of the first material and the other comprising an anchor 14*n* of the second material. In an alternative embodiment, both joiners could have used anchors of same material and thus been placed on the same side of the boundary 29. However, it may be advantageous to stagger joiners on either side of the boundary 29 as is shown in FIG. 12H. Staggering may allow denser anchor placement. In some embodiments, anchors may be moved further away from an interface by extending anchor arms; this may allow more joiners to be placed in a small volume without interfering with each other.

Apart from the bulk deposition of anchors, the examples in FIG. 11 and FIG. 12 are discussed on a layer by layer basis; i.e., the printer completes both materials on each layer before moving to the next layer. This is done to simplify the examples, but it is known in the art that optionally 3D printers may complete multiple layers of a first material before switching to print one or multiple layers of a second material. Both approaches are encompassed by the invention.

The fact that the joiners can be used in a layered printing approach means that they can be employed using a standard 3-axis 3D printer. Advantageously, joiner technology does not require hardware modifications to a 3D printer; it can be employed by appropriate modifications to the software algorithms that control the generation of printing tool paths, as described herein.

For a standard 3-axis 3D printer, typically the print head may move in up to three translational degrees of freedom but the angular position of the print head stays the same. That is, the print head does not rotate and the nozzle stays pointing down towards a build platform. More advanced 3D printers are becoming commercially available with print heads that have more than three degrees of freedom. (See, for example, Grunewald, S. J., 3Dprint.com, "Arevo Labs takes 3D printing 3D with new 6-axis composite part additive manufacturing platform", Nov. 16, 2015.) With print heads that can print 3D surfaces, hereinafter referred to as "4+ axis printers", the limitation of printing one planar layer at a time is partially removed. This creates greater freedom for the way anchors may be deposited into parts and the way receptacles may be placed in parts.

Figure 13:
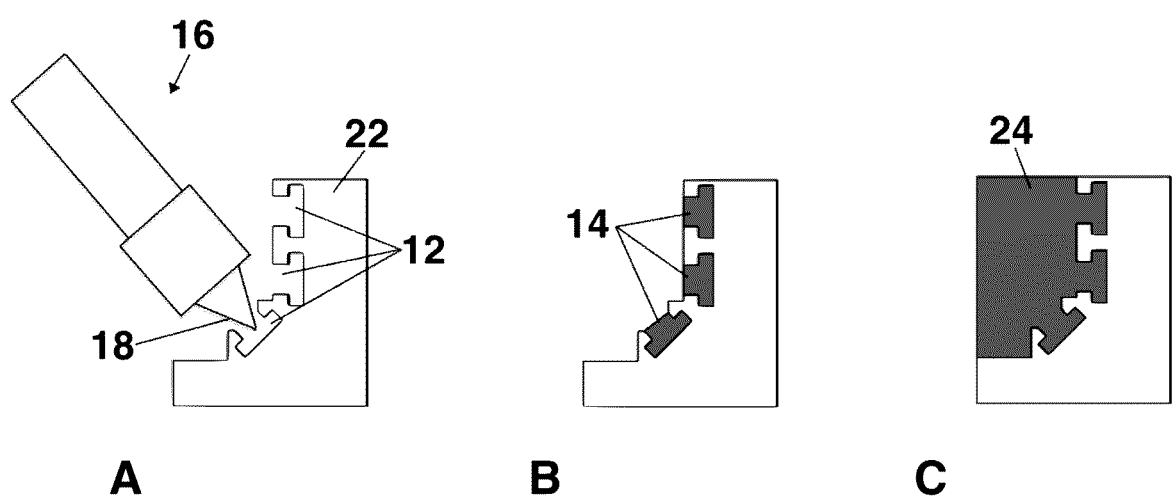
FIG. 13A through FIG. 13C show in cross-section a stepwise example ("body-by-body approach") of how the multi-material part of FIG. 12 can be created with a 4+ axis printer, with different joiner placement.

FIG. 13 shows a stepwise example ("body-by-body approach") of how the multi-material part of FIG. 12 may be created with a 4+ axis printer, with different joiner placement. Referring to FIG. 13A, it can be seen that the entire body 22 of a first white material has been printed with three receptacles 12 in the body. Print head 16 can be positioned so that nozzle 18 can approach each receptacle. In FIG. 13B, the anchors 14 of a second grey material have been bulk deposited into the receptacles 12, leaving three anchor top surfaces exposed. In FIG. 13C, it can be seen that the entire body 24 of second material has been printed to complete the multi-material part. The three joiners in FIG. 13C are different from the three joiners in FIG. 12H, even though both finished parts have the same outside geometry/appearance. The bonding at the multi-material interface and the anchor placement are different.

Advantages of producing the part according to the body-by-body approach of FIG. 13 may include:

1) Fewer material changes are needed. Rather than switching materials at each layer, the material only needs to change a minimum of once in the print. This can lead to time savings, material savings, and/or higher end part quality due to more consistent uninterrupted printing.

2) Using a 4+ axis printer allows printed layers to be 3D surfaces and not just 2D planes, which may lead to better aesthetic and structural properties of the printed part.

It is worth noting that there may be a physical limitation of how far the nozzle 18 can reach within a part. In cases where the nozzle cannot reach a receptacle, this will need to be identified in software and then a hybrid approach between the layered approach of FIG. 12 and the body by body approach of FIG. 13 will need to be used. In an example hybrid case, the first body is printed until a point where a receptacle is finished, and then an anchor is placed in the receptacle before the printing of the first body resumes.

As discussed above, creating a bond between a first material and a second material printed together largely involves creating a bond at the inter-material interface(s). The inventors have shown how this can be done using joiners. Depending on the orientation of the interface(s) with respect to the printing layer orientation, it may be convenient and/or preferred to use a joiner with an anchoring arm as shown in FIG. 12. Below will be described an alternative solution, tie roads, for creating a bond at an inter-material interface within a printed layer (the same case where anchor arms were employed above). Tie roads can be implemented in automatic tool path planning.

Figure 14:
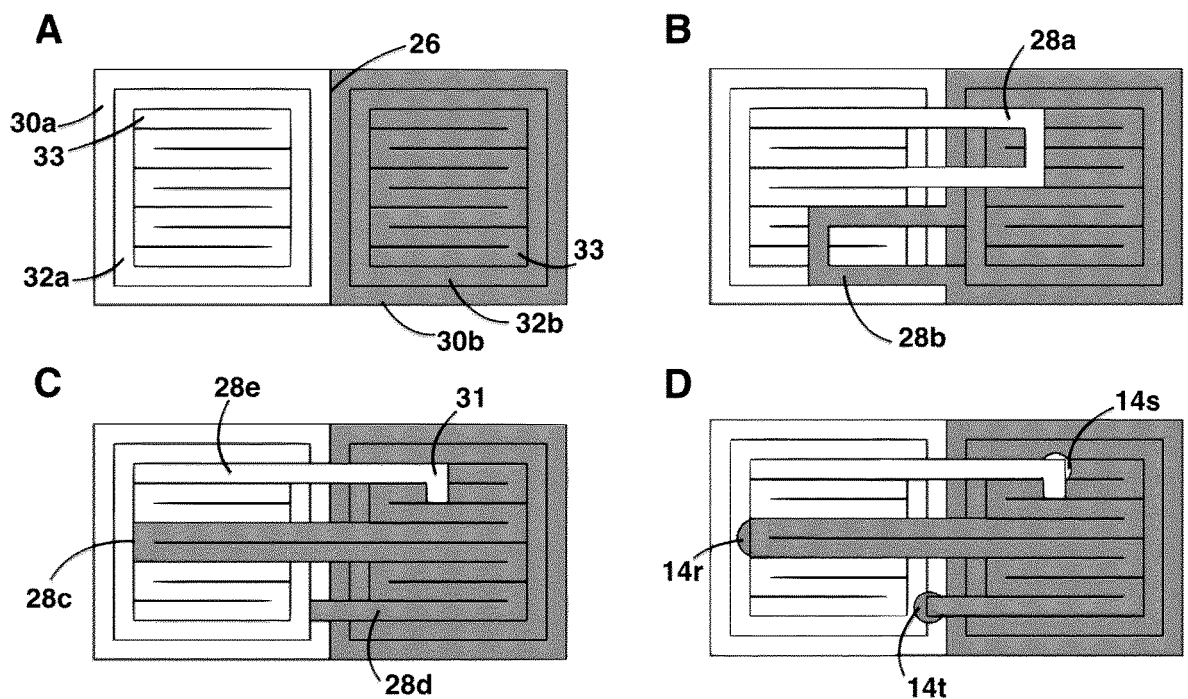
FIG. 14A through 14D are top views of different examples of tie roads being used to enhance the bond at a multi-material interface in the plane of a printed layer.

FIG. 14 depicts examples of tie roads being used to enhance the bond at a multi-material interface in the plane of a printed layer. FIG. 14A, FIG. 14B, FIG. 14C, and FIG. 14D show top views of a 3D printed layer of a first white material adjacent and touching a 3D printed layer of a second grey material. In order to show the tool paths used to print the bodies, each printing "road" of material is shown. Note that in these top views only the top layer is being shown, but there may be layers below this layer, and/or there may be layers printed on top of this layer.

FIG. 14A shows a common way that a tool path would be generated to print a first material beside a second material. The first material has an outline "shell" 30a as well as a second internal outline shell 32a. The area within the internal outline shell 32a is filled in with a raster pattern 33. The outline shell 30a of the first material meets outline shell 30b of the second material at multi-material interface 26. The second material similarly has an internal outline shell 32b which is filled in with a raster pattern 33.

In FIG. 14A, the only thing holding together these two bodies of different materials within this layer is any adhesion at the interface 26. Strengthening the interface 26 to strengthen the bonding between the two bodies is desirable. One could use glue or bolts, but it would be quicker, less labor-intensive, and cheaper if one could strengthen the interface by using a better tool path (i.e., a tie road approach).

FIG. 14B shows examples of how tie roads can be used to create an enhanced bond at an interface between different materials. Road 28a of a first white material crosses the multi-material interface and enters into the interior of what was in FIG. 14A all second grey material. This tie road which is part of the first material could form a mechanical, chemical, friction, or other bond to the second material. Similarly, road 28b of the second material does the same thing as road 28a, but from the second grey material into the first white material. It can be seen that in some embodiments a tie road may be a continuous loop. A tie road can be of varying sizes and go varying distances into the other body. It can also be seen that a tie road may be from internal material roads, as is the case with road 28a, or may be from an outline shell, as is the case with road 28b. Importantly, a tool path involving tie roads would be planned to ensure that different material is not deposited in the same area. In this example, if the second material was printed before the first material, the tool path would avoid depositing second material in the path that the first material tie road 28a would end up taking.

From a structural standpoint, the multi-material parts of FIG. 14A and FIG. 14B are significantly different as a result of the tie roads shown in FIG. 14B. As discussed, if the interface 26 in FIG. 14A is loaded, the only thing holding it together is the bond between the different materials at 26. In FIG. 14B, however, assuming that the continuous tie roads 28a and 28b are sufficiently secured to the bodies of the grey and white materials, respectively, there are four separate roads crossing the interface and securing the two bodies together. In most cases, a continuous material is significantly more durable then a discontinuous interface and thus the bond between the two bodies has been reinforced.

FIG. 14C shows how a tie road could be a road or roads rather than a continuous loop. Road 28c is a road loop of second grey material that enters into the body of first white material and then goes back into the body of second material in a continuous path. It is two roads wide, which could make the strength of this tie road stronger than road 28d, which is a single road. Note that road 28d of second material does not enter as far into the first material as road 28c does. This is a parametric variable that, if desired, can be specified or calculated by software.

Road 28e is a road from the first white material that enters into the body of second grey material. Note that the end 31 of the road 28e continues downward towards tie road 28d. This is an example of how a tie road does not need to be a straight segment. Having a segment in a different direction at the end 31 of the tie road 28e could help to secure road 28e within the second material.

In some embodiments, tie roads and joiners could be used together. Referring to FIG. 14C, if the first white material of 31 does not adhere well to the second grey material during printing, then it could be problematic to print the road 28e too far into the second material. Curling up could occur as described previously. This is a case where a joiner(s) from the layers below would help. Referring to FIG. 14D, the end 31 of the tie road 28e is shown to be printed in this top layer upon an anchor 14s below. Similarly, anchors 14r and 14t are shown for tie roads 28c and 28d, respectively.

For clarity, please note that the tie roads associated with anchors shown in FIG. 14D may be equated with the anchor arms shown in FIG. 12. FIG. 14 is a top view, and FIG. 12 is a side cross-section. If a joiner is not used to anchor the end of an anchor arm, then the anchor road equates to a tie road.

It may be desirable in some embodiments to print one or many tie roads as one of the final processes of each layer. This could ensure that a mechanical, chemical, friction and/or other bond is made with material on either side of the tie roads in addition to material below on a previous layer. This could allow for more surface area and increase the likelihood of a successful print.

Figure 15:
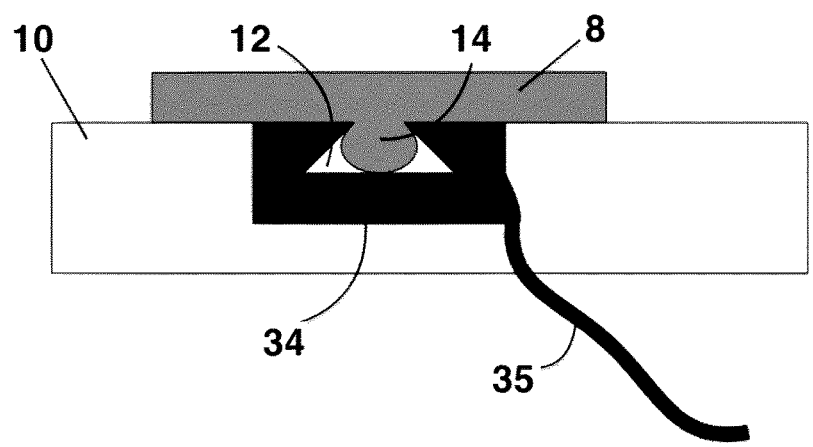
FIG. 15 shows in cross-section an example of how a receptacle can be electrically isolated and used to create an electrical connection to a material body.

In some embodiments, joiners can have additional functions, such as, for example, electrical conductivity. FIG. 15 shows an example of how a receptacle can be electrically isolated and used to create an electrical connection to a material body 8. A first base material 10 has a receptacle 12 in it that is isolated from base material 10 by a second conductive material 34. The conductive material 34 has a wire 35 connected to it. Anchor 14 is printed into the receptacle 12 in the conductive material 34 and will be in electrical contact. The anchor 14 is connected to the base layers of the printed part 8 and thus if the anchored part (34, 8) is electrically conductive, there will be electrical continuity from wire 35 to part 8. This provides an example of a conductive joiner.

In embodiments where products are manufactured using an integrated AM approach and the products include electronics, this type of interfacing may be important. The product may have a microcontroller or other computer which needs to interface with, for example, sensors, displays, chargers, etc. and thus there is a need for a way to robustly make electrical connections.

In some embodiments, joiners may be employed in a similar manner for thermal connections (heat sinks), connections for antennas or other transmitters, etc.

The ability to automate the termination of conductive paths may advantageously reduce labor costs, increase production speed, and/or increase reliability, which has economic value in manufacturing.

In some embodiments, receptacles may be incorporated into foreign objects such as printed circuit boards (PCB). If a PCB is used as a foreign object in an AM process, conductive traces can be connected to such receptacles on the PCB in order to connect them with components in the printed part. For example, if a microcontroller were to be used as a foreign object input to a 3D printed garage door opener, the printed part would need a battery compartment as well as a button. The electrical connections from both of these could be routed to the microcontroller but they will need to be connected to the power input and GPIO pins of the microcontroller. Joiners could be used to do this. Structural joiners could be used to build a casing for the garage door opener around the PCB and then conductive joiners could be used to connect the power and button conductive materials of the printed part to the PCB.

Figure 16:
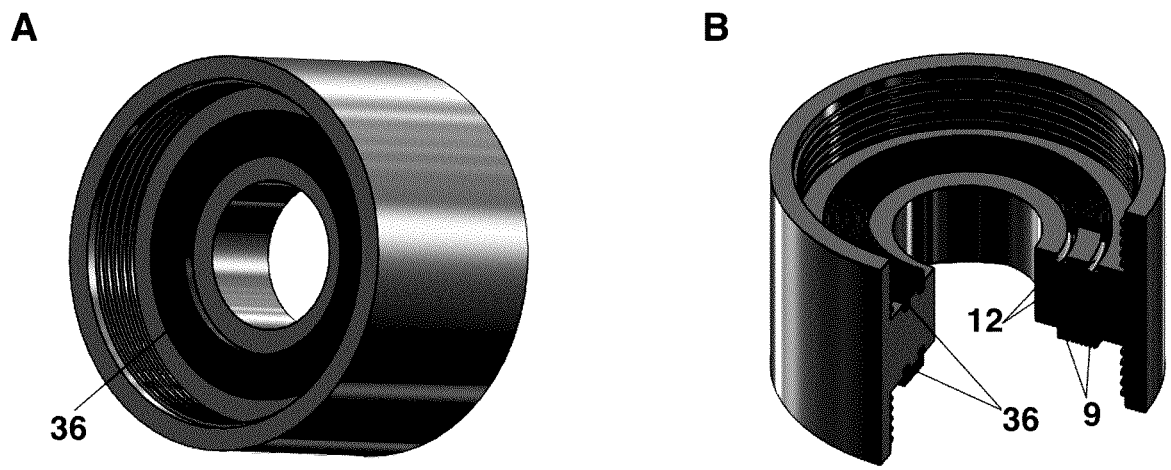
FIG. 16A and FIG. 16B show an example of how linear joiners can be used in creating a 3D printed multi-material hose fitting.

FIG. 16 shows an example of how linear joiners may be used in creating a 3D printed multi-material hose fitting. The example hose fitting is a double-sided female-female connector with a seal 36 on the inside of each side. FIG. 16A shows an isometric view of the hose fitting. The fitting body is of a first durable material such as ABS or nylon. Seals 36 of a second silicone material have been printed on each side of the body to form a multi-material functional part. (Only one such seal is visible in this view.) FIG. 16B is a cutaway view of the same part. Here, it can be seen that the seals 36 are attached to the fitting body using two linear joiners 9. On the right of this view, seal 36 is shown cut away further in order to expose linear receptacles 12 into which the second silicone material was deposited.

Currently available software for 3D printing provides very little or no control over the interface between two solid bodies. Some G-code preparation software packages (commonly referred to as "slicers") provide control over "overlap percentage", but nothing more. Prior to the present invention, there has been no way to increase adhesion between two bodies being 3D printed adjacent each other through tool path planning.

With respect to planning 3D printing of complex parts, it would be very time consuming to manually incorporate joiners in the parts. Accordingly, an example of a software tool to add joiners to a part automatically or semi-automatically will be discussed below.

Certain embodiments provide an automated process of mapping out anchors, implementing them into solid models and then modifying print head tool paths and extrusion commands to inject anchors. The automated process may be implemented in software, hardware, or a combination of software and hardware.

Figure 17:
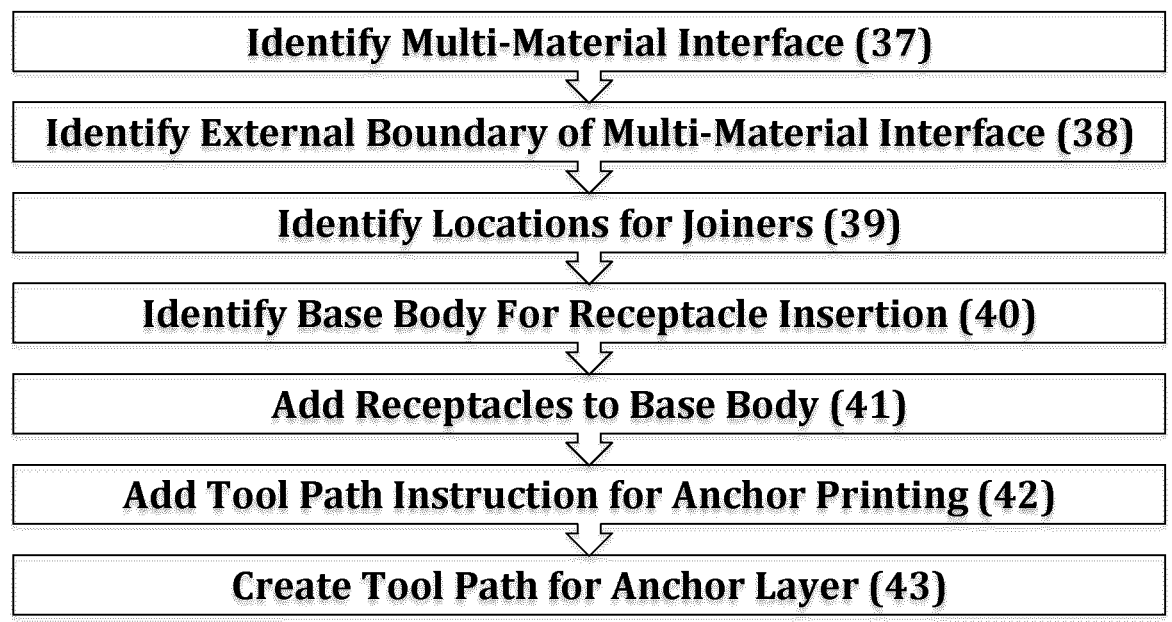
FIG. 17 is a flow chart of an example anchor planning process for adding joiners to an object for 3D printing.

FIG. 17 is a flow chart of an example anchor planning process for adding joiners to an object for 3D printing. The process includes procedures (e.g., steps, modules) that can be implemented on one or more processors. An input to the process can be a digital model (e.g., CAD model) of an object to be printed. An output of the process can be tool path code to be used by a 3D printer to print an instance of the object. The process of FIG. 17 includes several procedures (e.g., steps, modules), some of which may be optional. At 37, a multi-material interface is identified, e.g., from the input digital model. Optionally, at 38, an external boundary of the multi-material interface is identified. At 39, locations for joiners are identified, which may be in relation to or based on the external boundary and, optionally, one or more criteria. At 40, a base body for receptacle insertion is identified. At 41, one or more receptacles are created, e.g., added to the object model. At 42, one or more anchors are created, e.g., tool path instructions for anchor printing are added to tool path instructions. Optionally, at 43, tool path instructions for printing an anchor layer are created. An example application of use of the process of FIG. 17 is the addition of punctate joiners at a 2D planar multi-material interface.

Figure 18:
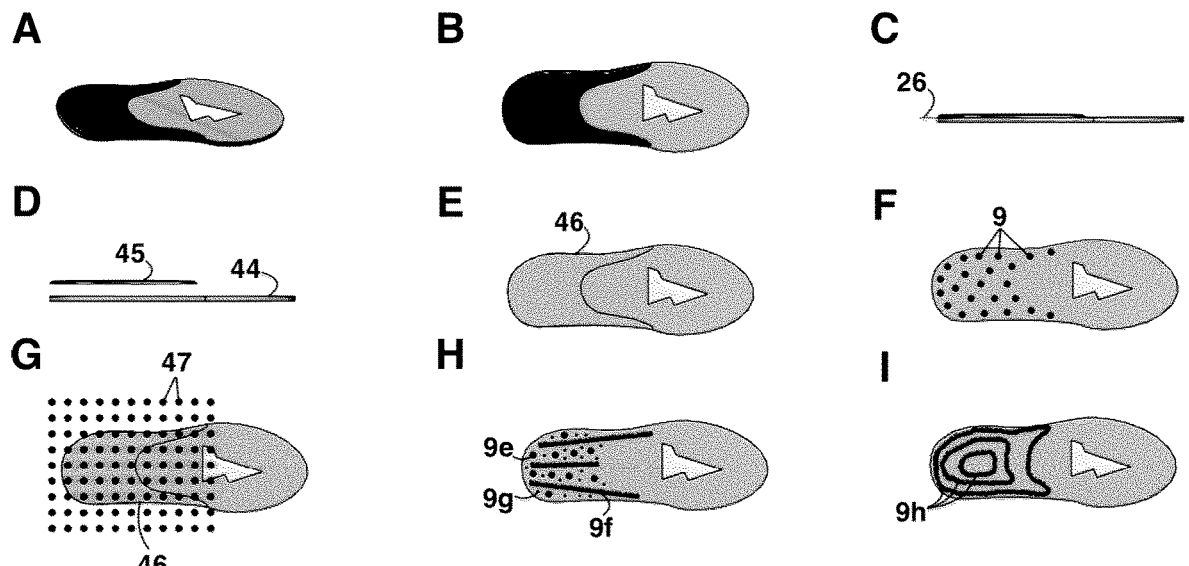
FIG. 18A through FIG. 18I show example applications of the process of FIG. 17.

FIG. 18 depicts an example application of the process of FIG. 17. FIG. 18A is an isometric view of an orthopedic shoe insole and FIG. 18B is a top view of the same 3D printed product. FIG. 18C is a side view of a digital model (e.g., CAD model) of the shoe insole object of FIG. 18A. Exploded view FIG. 18D shows that the insole comprises a first rigid base material 44 and a second soft padding material 45. These two parts need to be bonded together to form the final orthopedic shoe insole.

According to FIG. 17, the first step 37 in the example anchor planning process is to identify all multi-material interfaces. Referring to the side view shown in FIG. 18C, there is only one multi-material interface 26 that lies in the plane of the top surface of the first base material. In general, multi-material interfaces can be identified by inspecting a digital model (e.g., a CAD model) of the object to be printed, or any other suitable method. According to FIG. 17 step 38, the boundary of the interface is next identified in order to determine the surface area that needs joiners. Referring to the top view of the first base material shown in FIG. 18E, this boundary is the same as the outline 46 of the second padding material 45. In general, a boundary of an interface can be identified by inspecting the digital model of the object to be printed, or any other suitable method. FIG. 17 shows the next step 39 is to identify locations for joiners. There are many methods that may be used to do this. One method for positioning joiners within an interface boundary is shown in FIG. 18G. A grid of potential joiner locations 47 is superimposed on top of the 2D interface boundary. All locations that fall outside of the boundary 46 are removed, leaving all locations that are candidates for joiners.

According to FIG. 17, the next step 40 is to identify the base material for receptacle insertion. In this example the chosen printing orientation is to have the bottom of the insole on the 3D printer build platform. Thus, the first material would be the base material and would incorporate receptacles. (In embodiments of a general solution, the software could choose the bottom-most material that incorporates receptacles based on the way the user orients the bodies for printing.) Referring to FIG. 17, the next step 41 is to create receptacles in the first base material of FIG. 18 in the locations identified above with the grid. Referring to FIG. 17, the next step 42 is to add tool path instructions for anchor printing. For the product of FIG. 18, anchor bulk deposition instructions are provided for the print head such that an anchor of the second padding material is deposited into each of the receptacles in the first base material. Referring to FIG. 17, the next step 43 is to create a tool path for an anchor layer. For the product of FIG. 18, a tool path is provided to print the anchor layer of the second padding material.

Returning back to joiner location planning for the product of FIG. 18, the grid method of FIG. 18G is only one option. FIG. 18F shows another mapping wherein joiners 9 of the same size are randomly distributed within the multi-material boundary. Such mapping could be performed using a simple optimization algorithm that adjusts the location of each joiner to space out the joiners substantially equally. In another example, shown in FIG. 18H, more complex joiner planning may be used wherein different types of joiners are employed. Large linear joiners 9*f* are provided within the interior of the multi-material interface boundary. Larger punctate joiners 9*e* are provided between the linear joiners 9*f* and smaller punctate joiners 9*g* are provided closer to the edges of the boundary and to fill in any remaining large areas. FIG. 18I shows an example of how concentric linear joiners 9*h* may be employed. Alternatively, a linear joiner could be provided in a continuous spiral (not shown), which allows the joiner to be printed in a continuous fashion.

As discussed above, in some embodiments, an anchor layer material may adhere well to the tops of the anchors but poorly to the base material in the same layer below (hence why joiners are desirable). In certain such embodiments, a special anchor layer tool path may be provided.

An example of such a tool path will be described with reference to FIG. 19. FIG. 19A is a top view of a solid body of a first material with several anchors 14 of a second material bulk deposited into it. Anchor 14g is an example of an "interior anchor" whereas all other anchors depicted are examples of "perimeter anchors". (When planning perimeter anchor placement in general, optionally one may set a minimum distance from the part surface so that the anchor does not have a negative geometrical or visual effect on the outside of the printed part.)

Referring to FIG. 19B, second material has been deposited to form "inter-anchor segments" that connect the anchors together. Each segment starts and ends on an anchor, ensuring that the segment is constrained to the surface of the first base material. Segment 49 is the only interior inter-anchor segment. All other inter-anchor segments depicted are exterior inter-anchor segments 48. By connecting all anchors with printed segments, the two internal areas 51 are created.

In some alternative embodiments, the process of printing an anchor and printing an inter-anchor segment could be done in series. That is, an anchor may be printed in a first receptacle and then a segment may be printed directly from that anchor to a second receptacle. When the print head reaches the second receptacle, it bulk deposits material forming a second anchor in it. This may provide improved anchor to inter-anchor segment bonding as the material is continuous.

Referring to FIG. 19C, the internal areas are infilled with diagonal raster pattern 33. Note that each infill segment starts touching an inter-anchor segment and similarly ends touching an inter-anchor segment. This ensures that each infill segment 33 is secured to inter-anchor segments, which are secured to anchors.

Next, area external to the inter-anchor segments needs to be filled in. Referring to FIG. 19D, segment 52a does not have an anchor or anchor segment to which its ends can be secured when printing. This is often the case for external segments, i.e., segments near the part surface. In order to compensate somewhat for a lack of support at the ends, an external segment may be printed adjacent an inter-anchor segment so that they are touching on one side. These segments of the same material may then adhere along their length, securing the external segment sufficiently. In contrast, external segment 52b is able to be anchored to an inter-anchor segment, as well as paralleling an inter-anchor segment. Referring to FIG. 19E, outline shell 30 of the anchor layer has been printed in a similar fashion where it is bonded along its length to adjacent segments of the same second material within the part.

Optionally, to ensure the ends of inter-anchor segments make good contact with the tops of anchors, the printing nozzle may compress the end of the printed segment into the anchor by lowering the nozzle relative to the anchor. Optionally, extra anchor material may be deposited over the anchor top to provide additional contact.

During the planning process, several conditions may be checked. One condition, for example, would be to ensure that each printed road that is unsupported (i.e., does not contact an anchor at both ends) is below a threshold length previously referred to herein as "maximum unsupported road length". If such a condition were not met, then anchor placement could be adjusted until it was met.

As discussed above, planning processes according to the invention involve creation of receptacles in a base material at selected joiner locations. This can be implemented at different software levels or stages, such as procedure 41 in the example process of FIG. 17. Any desired receptacle geometry may be employed. In some embodiments, the receptacle geometry may be selected by a user. For example, the user may select from a pre-set list of joiner receptacle geometries. These geometries could be stored as a solid-model format (such as, for example, .ipt or .sldprt), as a 3D CAD export (such as, for example, .stl, .obj, .3mf), as a function (such as, for example, a Cartesian function later to be revolved or extruded about an axis), as a NURBS surface, or as any other convenient mathematical description). In some embodiments, the receptacle geometry may be procedurally generated by the software based on inputs such as, for example, material types, joiner strength requirement, or other factors for joiner geometry variations including those discussed herein.

In some embodiments, receptacles may be incorporated prior to slicing, i.e., they are present in a three-dimensional representation of an object (model) that is subsequently sliced. Procedures 40 and 41 of the process illustrated in FIG. 17 can be implemented in this way. One approach to produce this representation is Boolean subtraction of a first solid body from a second solid body, which is common in computer-aided design (CAD) software. The first body may correspond to a selected receptacle 3D geometry and the second body to the base material. Each time the geometry is subtracted from the second body, a corresponding receptacle is created in the second body. The resultant representation of an object containing a receptacle(s) is sliced to create a tool path used to print the object.

It is common that during the slicing process, algorithms will search for areas of a model that require a support material in order to support roads that may not have a sufficient amount of material in the layer below them. This support material is usually in the form of a breakaway structure or a dissolvable structure. In situations where joiners are to be used, it may be undesirable for a slicer to automatically generate support material in the common manner. Support material within a receptacle could fill in the receptacle volume and prevent the proper deposition of an anchor. In some embodiments, a digital marker may be generated as part of the process of creating a receptacle. This digital marker may indicate to a slicer that support material should not be generated within a receptacle. The digital marker may include data that defines the receptacle, for use by the slicer so that generation of support material at the receptacle is prevented. Prior to the present invention, such providing information to a slicer to identify regions that do not require support material has not been known.

In some embodiments, receptacles may be incorporated during slicing, i.e., during the conversion of a 3D representation of an object to tool path information. Procedures 40 and 41 of the processes of FIG. 17 can be implemented in this way. In some embodiments, tool paths that have already been generated may be post-processed so that the resultant tool paths will form an object that has receptacle(s) in it. That is, receptacles are incorporated after slicing. Although this may be more complex than incorporating receptacles prior to slicing, it provides additional broad scope for use of joiner technology. Procedures 40 and 41 of FIG. 17 can be implemented in this way. Currently, most 3D printers do not perform a slicing operation and simply accept tool path information that has been generated by a slicer beforehand. In some embodiments, software to add receptacle elements and corresponding anchors could be run by the processor of a 3D printer. That is, the 3D printer could accept standard tool paths and automatically add joiners to them. Procedures 37 through 43 of FIG. 17 can be implemented in this way.

In some embodiments, there may be one or more advantages to generating support material prior to the incorporation of receptacles to ensure that support material does not get created inside of receptacles.

In some embodiments, there may be one or more advantages to adding receptacles during slicing, e.g., efficiency, easy workflow for user, control of parameters in the slicer. In some embodiments, there may be one or more advantages to adding receptacles after slicing, e.g., no dependence on type of slicer, ability to add joiners at the printer level.

Creating receptacles after tool pathing has been completed involves modification of the printing code. After being sliced, an object is represented by many individual roads that when printed together form the object. In order to incorporate receptacles in the printed object, many of these roads may need to be shortened, split, or removed.

In some embodiments, a first body of a selected receptacle shape is sliced, producing layers with a defined external geometry. This external geometry on a per level basis may be stored as tool paths or as a mathematical representation (e.g., function). The tool path data for the first body and the tool path data for a second body that will have the receptacle in it may then be superimposed. Where they overlap, tool paths (roads) of the second body may be removed to create space for the receptacle. Procedures 40 and 41 of FIG. 17 can be implemented in this way.

In some embodiments, tool paths of the second body would be checked for intersection/overlap with the desired receptacle geometry on each layer. Different types of overlap could exist, with different consequent actions taken. If an overlapping tool path of the second body had one end point in the desired receptacle, that tool path would be shortened until the overlap no longer existed. If both end points of the overlapping tool path were contained within the desired receptacle, the path would be removed entirely. If neither end point of an overlapping second body tool path were contained within the desired receptacle, the tool path would be divided into two shorter segments, each segment having a new end point at the perimeter of the desired receptacle.

If a receptacle is created by simply removing roads or segments of roads of the second body that intersect the desired receptacle geometry, then that receptacle may have a surface that comprises multiple ends of roads. Generally, it is uncommon in 3D printing to have a surface that is made up of the ends of roads. It is more common for a continuous perimeter road (e.g., shell) to be provided that traverses substantially all of the external surface of a given layer (see 30 in FIG. 19E). This creates a smooth external surface that is more likely to conform to the desired geometry of the printed part in any given layer. Accordingly, if desired in some embodiments, perimeter roads may be added to create the surfaces of receptacles, e.g., linear receptacles. One or multiple perimeter roads may be employed. The width of the one or multiple perimeter roads would be factored into the previously described process of removing/shortening roads to ensure that appropriate space is provided for the perimeter road(s). Tool paths for the perimeter roads would be included in the tool path of the printed part (second body).

However, in some embodiments, having roads that terminate at the sides of receptacles could increase joiner strength by increasing friction between receptacles and deposited anchors. Thus, it may be desirable to omit perimeter roads in some situations.

In some embodiments, if desired, different finishes or textures of the inside surface of a receptacle may be provided. For example, a smooth surface finish may be provided by using a very small layer height which reduces grooves between layers. This may promote anchors pulling out more easily, which could be useful, e.g., for reusable joiners as discussed previously. In other examples, a receptacle surface could be made rough to increase surface area and/or increase friction characteristics of the surface and/or increase the likelihood that a deposited anchor is mechanically locked. This may be achieved by using thick layer heights which produce relatively deep grooves. This may also be achieved by not including perimeter roads at the receptacle sides so that the receptacle geometry is defined by the ends of roads that have been adjusted to create the receptacle. Multiple road ends may create a jagged texture.

Similarly to the creation of receptacles, the creation of anchors in software may be done before, during, or after slicing. Procedures 42 and 43 of FIG. 17 can be implemented in this way. Since an anchor engages a receptacle when forming a joiner, the locations of receptacles and the locations of corresponding anchors are related.

As discussed previously, the deposition of an anchor differs from standard layer by layer printing in that it is a bulk material deposition. Bulk material deposition is not common in 3D printing and there currently exists no standard way to define a bulk material deposition, or at least not one with the precision needed for anchors to be bulk deposited in receptacles. In order for a computer-controlled AM system such as a 3D printer to deposit an anchor in a receptacle, several parameters relating to bulk material deposition may be specified for each anchor. These may include but are not limited to:

1) The position (coordinates in 3D space) of the exposed portion of a punctate receptacle or, in the case of a linear receptacle, the coordinates or mathematical function defining a path along the exposed portion of the linear receptacle.

2) A vector representing a desired trajectory for material to be deposited into the receptacle, ordinarily a vector that is normal to the top plane of the anchor. For a linear receptacle, if this trajectory changes along the receptacle length, respective vectors may be defined for multiple regions of the receptacle, or a mathematical function may define the vector at any given position along the receptacle length.

3) A volume, a feed rate, a material identifier, an extruder temperature, and/or any additional printing-specific settings associated with the AM process being used to deposit the anchor. For anchor deposition in SLA, this may include, for example, power settings; for binder getting technologies, this may include, for example, binder volumes and binder deposition rates.

4) A sequence of steps that may be employed to facilitate the deposition of an anchor. In some embodiments, this may include the insertion and removal of a nozzle with respect to a receptacle that occurs in coordination with the deposition of material from the nozzle.

All such information associated with the deposition of a particular anchor may be stored in a data packet and referred to as anchor deposition parameters (ADP). Each anchor may have an ADP packet of information associated with it. ADP information can be employed in the process of FIG. 17, for example in procedure 42.

In embodiments in which receptacles are incorporated into a 3D representation of an object (model) prior to slicing, it may be desirable to also provide ADP for the anchors associated with the receptacles at the same stage. The ADP information could be stored in the 3D model file, in a file format that is able to include such information. In some embodiments, this may be an STL file that has a list of ADPs added to it. In some alternative embodiments, ADPs may be exported from CAD software independently from the model data and loaded into a slicer separately.

When a model with ADP information is loaded into a slicer, preferably the slicer can interpret the ADP and automatically convert the specified information into instructions for the print head to create anchors as desired.

In some embodiments, it may be desirable to have ADP be parametric and controllable by settings in the slicer. For example, even if an ADP specified a flow rate of 1 mm/s for a given anchor, this could be overridden in the slicer and changed if the printer were not capable of achieving such a high flow rate.

In some embodiments, if ADP are not included in the 3D model file when it is loaded into the slicer, an ADP can be generated for an anchor associated with each receptacle in the slicer. In some embodiments, this could be done by a user who specifies ADP using a graphical user interface. In some embodiments, this could be done automatically by software that searches the model to identify receptacles and then creates ADP for each receptacle.

In some embodiments where receptacles are generated during slicing or post-slicing, the generation of respective ADP would preferably happen during the same stage. That is, when a receptacle is being incorporated into a solid body, an ADP for a corresponding anchor may be generated as the same time. The ADP may be converted into printing information at this stage as well, so that it can be placed at the right location in the printer's printing code (usually G-code). (Note that "printing code" in this context not only encompasses tool path movement, but also deposition amounts and other relevant printing parameters of a given AM process).

The inventors have provided products and methods that strengthen multi-material interfaces created in AM, wherein a joiner(s) is employed at the interface(s) between the different materials. A very important subset of multi-material bonding in AM is the bonding between the build platform and one or more build materials in an AM process. Products and methods disclosed herein can be applied in order to provide improved part fixturing to a build platform.

There exist two contradictory requirements for part fixturing, which respectively apply at two different times in the printing process. During printing, it is desirable to have reliable, robust fixturing. However, as soon as the printed part has been completed, the exact opposite is desired, as the user wants the part to be easily removed from the build platform. Prior to the present invention, there has not been a single solution that satisfies both requirements, as they are two ends of the adhesion spectrum.

Most additive manufacturing involves creation of a part from nothing; thus it is inherently difficult to fixture these types of parts which start off very small and are constantly changing. Adequately securing a printed part during the build/3D printing process is critical to ensure the reliability of the process. Failure to do so can lead to a reduction of print quality and/or print failure, and thus increased costs.

Currently, when 3D printers are used to manufacture parts for commercial use, two of the most expensive parts of the process are the labor required by a machine operator and the opportunity cost of failed print jobs. These two costs can significantly outweigh material costs and energy costs, and thus there is significant motivation to reduce or eliminate them. Manual labor is typically required to prepare a build platform, initiate a print, monitor the adhesion of the print to the build platform, remove a print from a build platform, and optionally post-process the printed part. If a print fails due to poor fixturing on the build platform, the operator must remove any printed material, prepare the build platform again, and then initiate the print again, which can take substantial time.

Generally, achieving sufficient adhesion between a printed part and a build platform is one of the most difficult aspects of an AM process. Build platforms are typically flat and commonly made from glass, aluminum, acrylic, or plastic. In some cases, in order to promote adhesion between printed parts and build platform surface, special surfaces are used, such as tapes and glues. In some cases, parts have been 3D printed on a perforated board. Perforated board typically includes small holes (e.g., circular holes having a diameter of commonly less than 1.1 mm). Such small holes were not intended for anchor deposition therein.

It is generally known that a 3D printed part with large flat surfaces in contact with the build platform will in many cases have good adhesion. That is, increased surface area of a part in contact with the build platform results in a better bond. It can be difficult for parts with small surface area in contact with the build platform to adhere to the platform. Sometimes, parts are printed with a raft to increase the size of the surface area in contact with the build platform. For example, if one is printing a dog standing up, the print will have trouble sticking to the build platform because the dog's feet are relatively small. Conveniently, one can print a raft layer(s) that is roughly the same size as the entire dog so that the raft sticks to the build platform and then the dog's feet stick to the raft. A raft is generally of the same material as the desired print or at least a different material that adheres well to the material of the desired print.

Rafts are sacrificial. In general, with lower cost printing they are broken off of the part, but with higher end printing they may be dissolved off. To ensure that the raft and the part do not stick together too well, one may print the part (e.g., the dog feet) a "raft separation distance" away from the raft so that the two can be broken apart later. For an example raft separation distance: If a printed layer is 0.2 mm high, then when the next layer is printed the nozzle will deposit material from 0.2 mm above the previous layer. If the raft separation distance is 0.3 mm, then the nozzle will instead deposit material from 0.5 mm above the previous layer so that the material adheres to the layer below but is much weaker.

Whereas there may be drawbacks regarding printing small parts on a build platform, there may also be drawbacks regarding printing large parts on a build platform. Parts that are too large may exhibit higher expansion/contraction forces as the build materials cool that can cause the part to warp. These forces may be stronger than the adhesive forces holding the part to the build platform, causing the part to lift away from the build platform. Also, adhesion to the build platform often relates to the relative positions of the print nozzle and build platform surface. If this positioning is incorrect, adhesion during the first layer of a print may be compromised. In many cases, manually leveling the build platform with respect to the nozzle's x,y plane is needed. For larger parts, even small inaccuracies in the leveling process can affect adhesion of the part's extremities, often causing a failed print. Accordingly, designers of 3D models typically avoid designing parts that have small elements or flat surfaces that are too large. If flat parts are too small, the parts may not stick well; if a flat part is too big, the part may be prohibitively hard to remove from the build platform. A solution that removes such limitations on designers would permit AM to be employed for a wider variety of applications.

When a 3D print is complete, printed parts must be removed from a build platform. The better the part is stuck to the build platform (which is desired during the build process), the harder it is to remove. Removal often requires significant force and sometimes tools. Most AM system manufacturers recommend using a chisel, blade, mallet, putty knife, or the like. During removal, parts can be broken, the printer can be damaged, the user can be injured, etc. Unreliable part removal is a serious and common problem in 3D printing today.

There are many factors that contribute to the adhesion between a part and the build platform surface. These include how level the surface is, how clean the surface is, how far the surface is from the nozzle, what material is being used, the temperature of the build platform, etc. To minimize the risk of build surface non-uniformity, some 3D printers will print base layers of sacrificial material before they begin building the object. These base layers are usually of a dissolvable/soluble material and may be several millimeters thick. This can be quite wasteful of material and can take a long time to print before the actual printing of the part begins. This also means that a part requires post-processing to remove the sacrificial base, which in some cases can take over six hours. Some 3D printer manufacturers offer one-time-use disposable build platforms that have been prepared ahead of time. This can also be quite wasteful.

There have been some efforts to automate the process of removing parts from a printing surface. U.S. Pat. No. 8,668,859 of Pettis teaches a print surface that has a built-in conveyer belt to automatically remove objects from the working volume. International Patent Publication No. WO 2014121032 of Perez teaches a printing surface with a blade supported for motion across the printing surface to release the part from the surface. Both of these approaches address removal of a part after it has been printed. Neither addresses the earlier problem of how to achieve reliable fixturing during the print.

There is a need for a fixturing solution that can reliably and robustly secure parts during the printing process. There is also a need for parts to be easily released after the printing process. Further, there is a need for parts to be automatically removed from the 3D printer, to obviate the requirement for manual labor. This solution would allow 3D printers to run in manufacturing settings in a "lights out" fashion. Products and methods disclosed herein can be applied to provide improved part fixturing to a build platform, to provide improved part removal from a build platform, and to provide automatic part removal from a build space.

Joiners according to the invention can be used for part fixturing. Punctate and/or linear receptacles can be integrated into the build platform. The receptacles may have any of a variety of geometries, as was described previously. In the following examples, one kind of receptacle profile geometry will generally be shown for simplicity.

Figure 20:
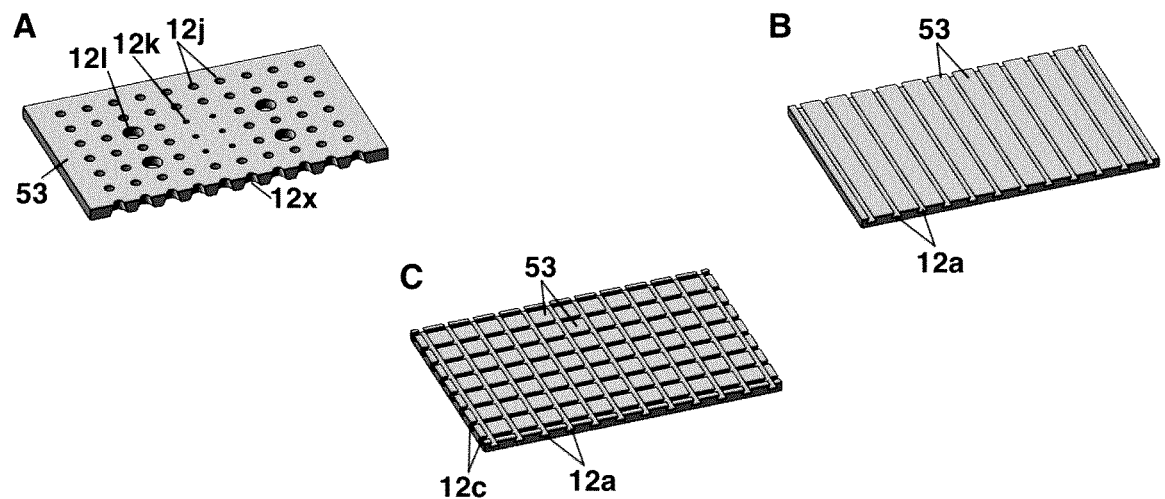
FIG. 20 shows three examples of build platforms with integrated receptacles.

FIG. 20 shows three examples of build platforms with integrated receptacles. FIG. 20A is a partial cross-section of a build platform in isometric view. The platform includes an array of punctate receptacles of varying sizes 12*j*, 12*k*, 12*l*. Although in this example the receptacles are arranged in a uniform, equally spaced array, they need not be and, in other embodiments, may be randomly distributed in a build platform. A cross-section of a row of receptacles is seen at 12*x*. A part would be printed onto the top surface 53 of the build platform, with anchors being bulk deposited into receptacles. In different embodiments, receptacles may all be the same size or there may be a variety of receptacle sizes for special use. For example, referring again to FIG. 20A, small receptacles 12*k* (and thus small joiners) may be used for smaller, more delicate printed parts. Larger receptacles 12*l* may be used for larger joiners to secure larger parts. Some materials exhibit significant warping during the printing process which can cause them to curl away from the printing surface. Depending on the strength of thermal contractions/expansions, larger joiners may be desired to adequately secure parts. FIG. 20B is an isometric view of a build platform having top printing surface 53 and equally spaced unidirectional linear receptacles 12*a*. FIG. 20C is an isometric view of a build platform having top printing surface 53 and equally spaced bidirectional linear receptacles 12*a* and 12*c*. In different embodiments, linear receptacles may have non-uniform spacing, differ in size (length and/or depth), follow a curved path, not extend all the way to the ends of the build platform, etc. A build platform can include a combination of punctate and linear receptacles.

When the printing process has finished, there are many options for how a printed part may be removed from the printing surface. In some embodiments, the part may be removed by brute force. In certain such embodiments, the anchors may be pulled out of the receptacles on the printing surface. This may be advantageous as the printing surface would be ready for reuse without any further actions.

In some embodiments, joiners securing the printed part on the build platform surface may be broken or severed. The inventors have shown that, with enough force, the joiners can be broken and that they typically fracture where the anchor top meets the anchor layer (see, for example, 25c in FIG. 21A). This may be advantageous as the printed part may be ready for use and not need post-processing to remove protruding anchors.

In some embodiments, it may be desirable to control the location where the joiners fracture. For example, it may be desirable for them to fracture in the plane of the anchor layer so that there is minimal residue from the joiner on the printed part. This may be achieved by designing the joiner geometry such that the smallest cross-section of the joiner exists close to the desired breaking location. When force is applied, the joiner will most likely fracture at the region with the smallest cross-section as stress will be highest there.

Figure 21:
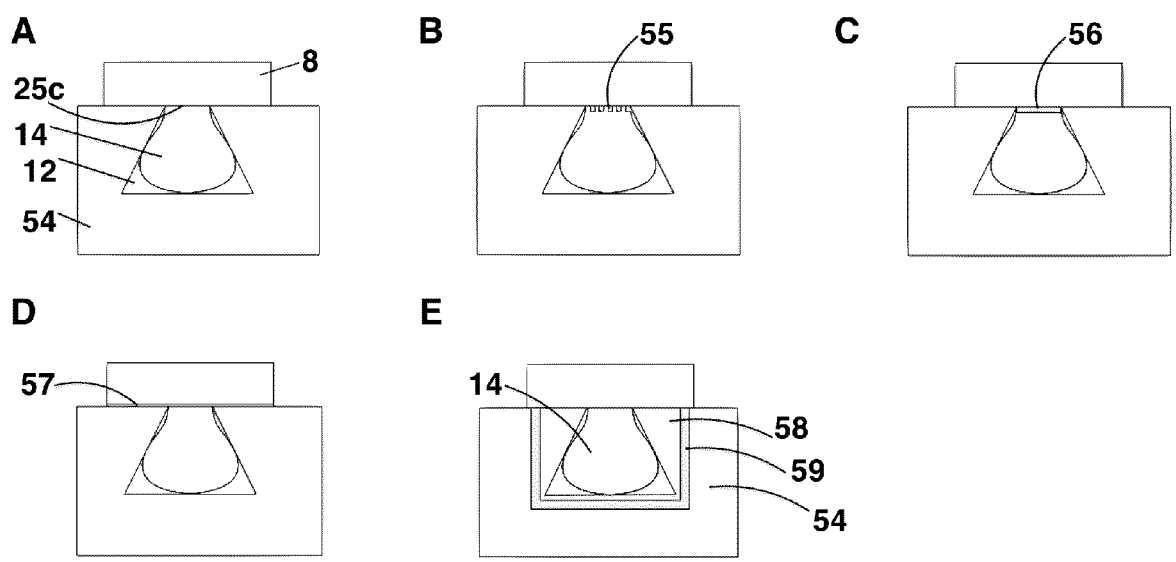
FIG. 21A through FIG. 21E shows examples of joiner cross-sections involving receptacles in build platforms.

FIG. 21 shows examples of joiner cross-sections involving receptacles in build platforms. The concepts exemplified apply to both punctate and linear receptacles. FIG. 21A is a cross-section of a build platform 54 with a receptacle 12. An anchor 14 in the receptacle 12 is attached to the base of a printed part 8. It can be seen that interface 25*c* between the top of the anchor 14 and the part 8 has the smallest cross-section of the joiner and thus, if force is applied, the joiner will most likely fracture there. The anchor 14 may be of the same material as that of part 8 or they may be of different materials. If different, the anchor material may be selected so that the inter-material bond is weaker than the intra-layer bonding within either material to ensure that the joiner severs at the interface 25*c*.

FIG. 21B shows that the fracture location may be controlled at the tool path level by providing a weaker fracture layer/interface 55, as is commonly provided for rafts. Commonly, a printed part may be printed a raft separation distance away from a printed raft so that the part may be more easily separated from the raft when completed. Similarly, in the case of a joiner, the anchor layer may be printed above the anchor by an "anchor separation distance" to weaken the interface between anchor layer and anchor top.

In some embodiments, a severing means (e.g., a sharp blade, heated blade, heated wire, wedge, or the like) may be used to sever the joiner and release the part by sliding it under the part. A combination of the above methods may also be used, e.g., receptacle geometry that makes joiners weak where the anchor layer meets the anchor top, and use of a blade that severs these joiners.

In some embodiments, joiners may be printed using a dissolvable/soluble material. When a print job is finished, the entire printing surface with the secured printed parts on it may be placed in a material dissolving bath which is able to dissolve only the dissolvable material. In some embodiments, instead of manually removing the printing surface and placing it into a dissolving bath, the printing surface may be automatically exposed to a material dissolving process. For example, the printing surface may be lowered into a dissolving bath optionally contained within the 3D printer. Alternatively, a dissolving medium may be pumped into the build chamber to dissolve soluble material in place. Optionally, channels for the pumped medium to access joiner locations may be provided. For example, linear receptacles may have a channel along the length of the anchor. For example, punctate anchors may have a network of channels connecting joiner locations so that the dissolving medium can be pumped into each of the joiner locations. Automatic embodiments may be advantageous as they would reduce costly operator labor required for manual embodiments.

The process of dissolving soluble material may take several hours and the time required will depend on the volume of material that needs to be dissolved. Accordingly, it would be desirable to minimize the amount of dissolvable material employed in order to reduce dissolving time. Referring to FIG. 21C, a thin layer 56 of dissolvable material is provided between the anchor top and the printed part. Dissolvable barrier 56 may be a single printed layer or multiple layers. If the dissolvable barrier 56 is dissolved, the part will be separated from the anchor, effectively disengaging the joiner. Since this dissolvable barrier is thin, it can dissolve fairly quickly. In some embodiments, this approach may lead to an improved surface finish when compared to approaches that require breaking anchors away from the part.

FIG. 21D shows an alternative approach wherein a dissolvable barrier 57 outside of the receptacle and on top of the build platform is employed.

In some embodiments, the temperature of a build platform may be controlled; i.e., the build platform may be heated or cooled. Changing the temperature of the receptacles in the build platform may allow control over some material properties of the joiners. Lowering the temperature may cause a joiner to become more brittle. Accordingly, the energy required to fracture the joiner using the brute force removal methods discussed previously would be reduced. Alternatively, heating a receptacle may produce softening of materials. In some embodiments, a receptacle may be heated during the anchor deposition process in order to reduce the viscosity of the deposited material so that it may more completely fill the receptacle. In some embodiments, the receptacle may be heated during the part removal process to a temperature at which the anchor material substantially softens. If anchors become soft, then the force needed to remove a printed part may be reduced. This may also allow for locations of breaks to be smoothed out and thus more aesthetically pleasing.

In certain situations, if the entire printing surface is heated, there may be risk of thermal damage to printed parts. If heating were substantially localized to the receptacles, risk of such thermal damage would be reduced.

In addition to the static receptacles discussed above, the invention further encompasses active receptacles, for example, heated and/or mechanically actuated receptacles. FIG. 21E shows an example receptacle with an anchor 14. The material 58 local to the receptacle is thermally isolated by insulation 59 from the rest of the build platform 54. The receptacle may be heated or cooled independently from the rest of the build platform 54.

In some embodiments, receptacles may have independent temperature control such that only material local to a given receptacle or grouping of receptacles can be heated or cooled to a selected temperature. In other embodiments, all receptacles may share a common temperature control source.

Several "active mechanical receptacle" approaches according to the invention will be discussed below. FIG. 22, FIG. 23, FIG. 24, and FIG. 26 show some examples.

Figure 22:
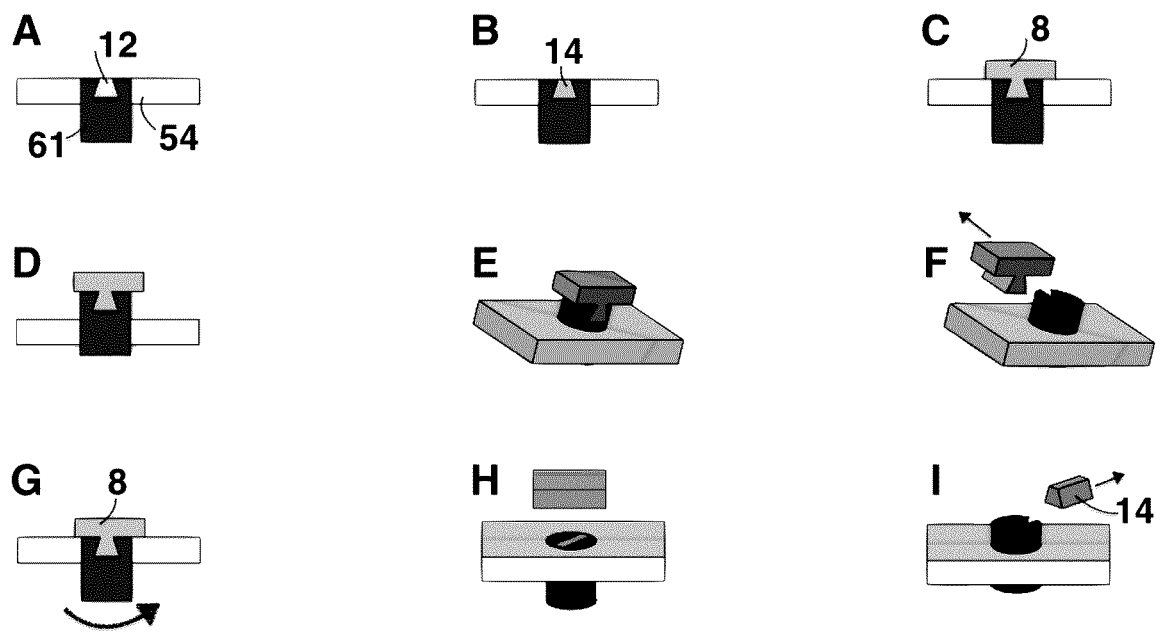
FIG. 22 shows stepwise examples of an active mechanical receptacle in use.

FIG. 22 shows stepwise examples of an active mechanical receptacle in use. Referring to FIG. 22A, a receptacle 12 is located in the end of "anchor pin" 61 that is part of a build platform 54, all shown in cross-section. FIG. 22B shows an anchor 14 that has been deposited in the receptacle 12. FIG. 22C shows an anchor layer and subsequent layers that have been printed on the build platform to form a printed part 8 that is bonded to the deposited anchor 14 and consequently secured to the build platform 54. Two different examples will be described as to how the part may be removed. One is shown in FIG. 22D, FIG. 22E, and FIG. 22F, and the other is shown in FIG. 22G, FIG. 22H, and FIG. 22I.

Referring to FIG. 22D, the anchor pin 61 has been actuated to move upward with respect to the printing plane of the build platform 54 such that the receptacle geometry is exposed. This is also shown in isometric view in FIG. 22E. Since the receptacle geometry is no longer constrained by the rest of the build platform, the anchor may be removed by sliding it laterally out of the receptacle, as is shown in FIG. 22F.

Referring to FIG. 22G, in an alternative example, the anchor pin is twisted with respect to the build platform such that torsion is applied to the anchor and the printed part 8. By rotating the anchor pin with receptacle, e.g., for a complete revolution, the anchor is broken away from the printed part, effectively removing the printed part's adhesion to the build platform and releasing the part, as shown in 3D view in FIG. 22H. In FIG. 22I, the anchor pin has been actuated upward from the build platform so that the anchor 14 can be cleared away. Clearing the anchor from the anchor pin may be a manual or automated step.

It should be noted that use of anchor pins according to the invention may include any of the variations discussed in regard to FIG. 21.

In some alternative embodiments, an anchor pin in a build platform may have a hole (e.g., channel) extending partially or all the way through it along its length. The walls of the hole may have threads on them. An anchor can be deposited into the threaded hole such that the anchor material conforms to the contours of the thread to form a mating thread; that is, a threaded anchor is created. A printed part secured to the threaded anchor can be released from the build platform by rotating the anchor pin so that the threaded anchor moves out of the anchor pin up and away from the build surface. Threaded anchors that remained attached to the printed part could then be removed using any of the methods discussed above.

Figure 23:
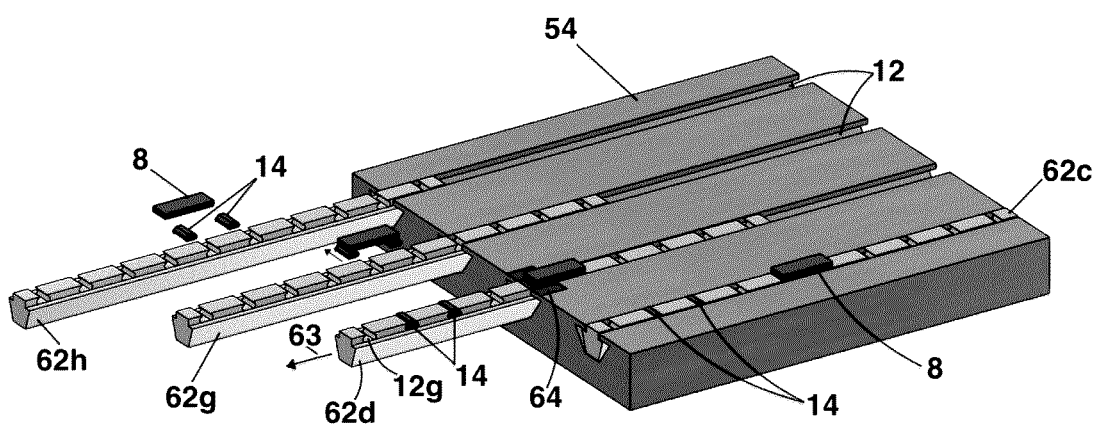
FIG. 23 shows an example of a build platform having linear receptacles into which anchor trolleys fit.

Approaches similar to those employed with punctate receptacles and anchor pins can be employed with linear receptacles in a build platform, an example of which is depicted in FIG. 23. Build platform 54 has four channels 12, i.e., linear receptacles. "Anchor trolleys" 62c, 62d, 62g, 62h fit snugly within the channels 12 and are adapted to be movable along a respective channel in the direction 63. The anchor trolleys may be moved by motor or manually. Each anchor trolley has many receptacles in it which could be punctate or linear. In this example they are linear receptacles 12g some of which are shown with anchors 14 deposited in them. Printed parts 8 can be secured to the build platform using joiners that are printed into the anchor trolleys. When the printed parts need to be removed from the build platform 54, the anchor trolleys can be slid out of the channels 12, as is shown for anchor trolleys 62d, 62g, 62h. When the linear receptacles 12g on the anchor trolleys are no longer within the built platform 54, the joiners are no longer constrained in the direction normal to the length of the anchor trolley and in the plane of the build platform. Accordingly, the joiners may be slid out of the receptacles, as is shown for anchor trolley 62g. The anchors could be removed from the printed part by brute force (shown for anchor trolley 62h), or if dissolvable material was used for the anchors or anchor barriers, the anchors could be removed using a dissolving medium. Alternatively, parting blade 64 in a plane below the printed part and at the build platform may be used so that printed parts are separated from the anchors as the anchor trolleys are slid out of the build platform. This blade could alternatively be a hot wire, wedge, heated blade, etc. Any of the methods for release of a printed part discussed above may be employed.

In some embodiments, an anchor trolley may be made of a metal, ceramic, plastic, glass, or other materials or combinations of materials. In some embodiments, an anchor trolley (or just its top surface) may be made of a material that does not adhere well to the printing materials so that the anchors may separate from the anchor trolley more easily. In some embodiments, the anchor trolley surface may be made of TEFLON (polytetrafluoroethylene). In some embodiments, the top surface of the build platform and/or anchor trolley may be any material finished with any adhesive, such as but not limited to, painter's tape, hairspray, ULTEM™ (polyetherimide), aluminum, glass, KAPTON (polyimide), or the like. In some embodiments, the top surface of an anchor trolley may be unfinished and made from the same material as the build platform. In some embodiments, an anchor trolley may be entirely made of a dissolvable material and thus would be sacrificial for every print.

In some embodiments, the build platform surface may be heated during the printing process to promote part adhesion and then cooled after the printing process in order to reduce adhesion and reduce the force needed to remove the printed part. In some embodiments, the top surface of the build platform may have a lubricant applied to it to reduce the force needed to slide the part off.

In some embodiments, a printed part that was moved outside of the build volume by an anchor trolley may be removed while the next part is being printed and secured to the same anchor trolley. In some embodiments, an anchor trolley may be significantly longer than the build platform. This could allow continuous printing, as the anchor trolley could be actuated to move a printed part outside of the 3D printer's build volume and, by doing so, bring a new length of unused anchor trolley into the build volume. In some embodiments, an anchor trolley may be curved or circular if the linear receptacle within the build platform is also curved or circular with a radius that matches the anchor trolley. An anchor trolley that is a full circle (i.e., a wheel), may be particularly advantageous for build platform clearing.

In some embodiments, an anchor trolley may be fitted with linear bearings, roller bearings, or the like in order to increase the ease of it sliding with respect to the build platform. In some embodiments, movement of an anchor trolley may be automated. In some embodiments, an anchor trolley may be moved by a linear actuator such as, but not limited to, a lead-screw, a rack and pinion system, or the like. In different embodiments, each anchor trolley may be controlled independently or all anchor trolleys may be controlled by one or more actuators. In some embodiments, a plurality of anchor trolleys may be attached together.

In some embodiments, spring-loaded ejector pins may be used to remove anchors from the anchor trolley receptacles. The removal of parts from an anchor trolley may be manual or automated. In an example of the latter, electrically controlled linear actuators could be positioned alongside the anchor trolleys. Ejector pins could be actuated by the linear actuators to push the anchors out of the receptacles in the anchor trolleys. Anchor trolleys could then be moved so that the printed part falls into a hopper, dissolving bath, shipping package, etc.

In some embodiments, the anchor trolley build platform assembly may be equipped with a sensor such as, for example, a mechanical switch, optical sensor, Hall effect sensor, or the like in order to detect the presence and/or location of each trolley.

Figure 24:
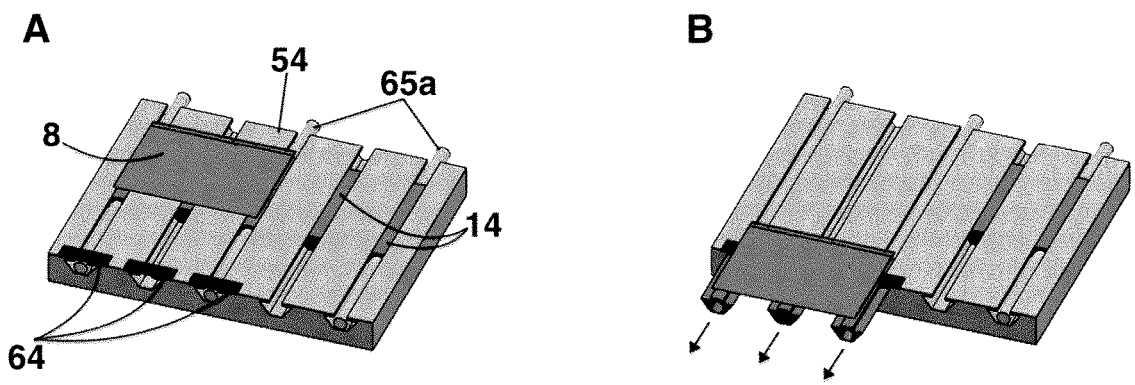
FIG. 24A and FIG. 24B show a stepwise example of a build platform having linear receptacles into which injected trolleys fit.

In other approaches involving active mechanical receptacles, a lead screw or equivalent is incorporated directly into a receptacle such that a deposited anchor forms around the lead screw or equivalent, creating a linear actuation mechanism hereinafter called an "injected trolley", an example of which is shown in FIG. 24. Equivalents to a lead screw include but are not limited to a ball screw, threaded rod, or the like.

Referring to FIG. 24A, build platform 54 has five linear receptacles in it. The linear receptacle furthest to the right has lead screw 65a in it. The lead screw 65a may be constrained largely within the linear receptacle with roller bearings, thrust bearings, and/or other rolling supports. The lead screw 65a may be connected to a motor that can cause it to rotate at a selected speed in either direction. When an anchor 14 is deposited into the receptacle containing the lead screw, deposited material will fill the void around the lead screw within the receptacle. Some material will conform to the contours of the lead screw, resulting in a negative of the lead screw's male thread pattern. As such, the female threaded pattern in the anchor allows it to act as a nut that will move linearly along the lead screw when the lead screw is rotated. Part 8 is printed upon the injected trolley/anchor. Referring to FIG. 24B, when the lead screws rotate, the injected trolleys move with respect to the build platform, causing the part 8 to move off of the build platform. The injected trolley may remain attached to the printed part if it does not affect the use of the part, but most likely it will be removed. Any of the methods for releasing a printed part from anchors discussed above may be employed to remove the injected trolley from the printed part.

During the printing of an injected trolley around a lead screw or equivalent, optionally the build platform and/or lead screw may be heated or cooled. In some embodiments, heat may lower the viscosity of the material being printed, allowing it to get deeper into the threads of the lead screw to create a more robust female thread. In some embodiments wherein heating the anchor material causes it to contract, heating the build platform may make it easier for the injected trolley to slide through the linear trolley for part removal.

Figure 25:
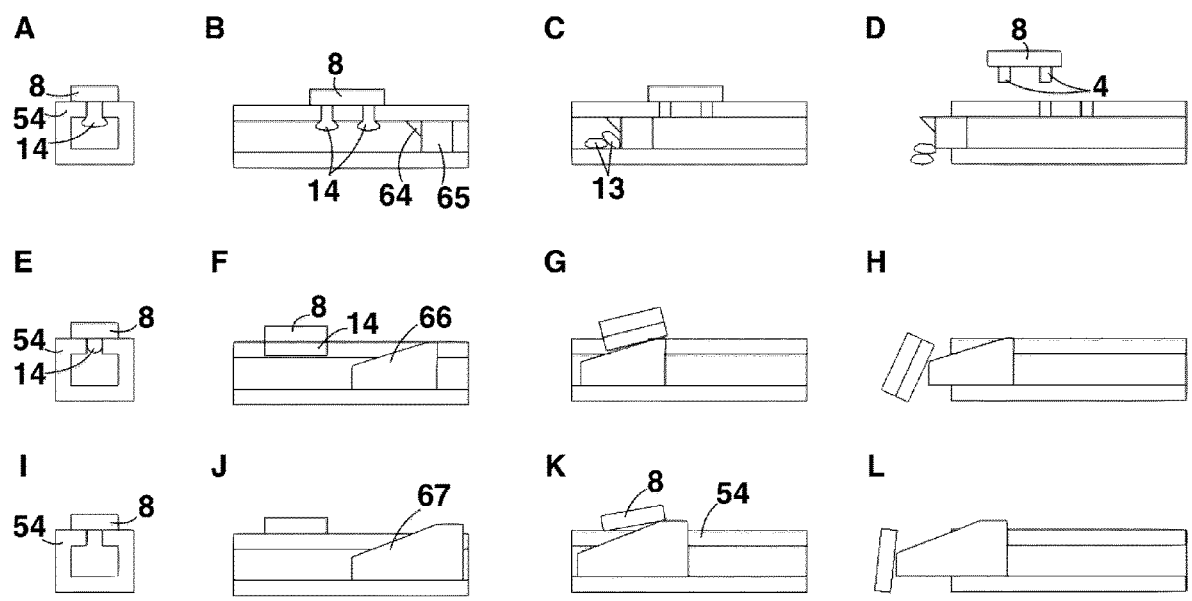
FIG. 25 shows in cross-section examples of three approaches for separating a printed part from a build platform.

FIG. 25 shows examples of three approaches for separating a printed part from a build platform. These separator approaches may be easily automated.

FIG. 25A through FIG. 25D show an example use of an anchor shear trolley. FIG. 25A is a cross-section view of a punctate receptacle in a section of a build platform, wherein 54 is the build platform material, 14 is an anchor that extends through an opening in the top of the build platform and forms a locking shape within the receptacle, and 8 is a printed part attached to the top of the anchor. Note that the space below the anchor 14 and within the build platform is empty and extends into the page as a channel in which an anchor shear trolley travels. FIG. 25B through FIG. 25D are stepwise side view cross-sections of the same build platform that is shown in cross-section in FIG. 25A. FIG. 25B shows that there are two punctate receptacles that have anchors 14 in them and printed part 8 is attached to the anchors. Anchor shear trolley 65 having blade 64 is moveable along the channel inside the build platform. (Although in this example the anchor shear trolley is depicted as being entirely contained within the build platform, in some alternative embodiments it may be only partially contained within the build platform.) Referring to FIG. 25C, the anchor shear trolley has moved from right to left and the blade has sheared off the lower portions 13 of the anchors 14. Referring to FIG. 25D, the anchor shear trolley has moved further left so as to discard the sheared-off anchor portions 13. Now that the upper portions 4 of the anchors are no longer attached to the portions 13 within the punctate receptacles, the upper portions 4 have disengaged and been removed from the build platform. The printed part may be post-processed as discussed above to remove the remaining anchor portions 4.

Anchor shear trolleys and methods provide a reliable and rapid way for printed parts secured to a build platform to be removed. Although the anchor shear trolley approach is depicted for punctate anchors, it may also be employed for linear anchors. The blade depicted may, in other embodiments, be substituted with any other convenient means for severing an anchor, e.g., a heated element, a wire, a rotating drill, or the like. Anchor shear trolleys may be manually controlled, e.g., using a hand cranked linear actuator, or automatically controlled, e.g., by an automated linear actuator. Anchor shear trolleys may optionally be fixed with bearings to allow easy travel within the channel. In some embodiments, multiple anchor shear trolleys may be used in a build platform. They may be controlled independently or together.

In contrast to an anchor shear trolley breaking an anchor, an anchor ejecting trolley pushes an anchor out of a receptacle. FIG. 25E through FIG. 25H show an example use of an anchor ejecting trolley. FIG. 25E is a cross-section view of a linear receptacle in a section of a build platform, where 14 is an anchor that extends into the linear receptacle in the build platform 54, and 8 is a printed part attached to the top of the anchor. Note that the space below the anchor 14 and within the build platform 54 is empty and extends into the page as a channel in which an anchor ejecting trolley travels. FIG. 25F through FIG. 25H are stepwise side view cross-sections of the same build platform that is shown in cross-section view in FIG. 25E. FIG. 25F shows linear anchor 14 with printed part 8 attached to it. Anchor ejecting trolley 66 is moveable along the channel inside the build platform. A portion of the anchor ejecting trolley 66 extends upward into the linear receptacle. Although it is not absolutely required, note that in this example the anchor ejecting trolley is gradually sloped upward from the left side to the right, the portion that extends into the receptacle being on the right. (In this example the anchor ejecting trolley is depicted as being entirely contained within the build platform, but in some alternative embodiments it may be only partially contained within the build platform.)

Referring to FIG. 25G, the anchor ejecting trolley has moved from right to left, and the portion extending up into the receptacle has rammed the linear anchor 14, causing it to dislodge and be ejected. The sloping of the portion caused load to be applied gradually to the linear anchor, decreasing the force required for ramming the anchor ejecting trolley along the channel. Referring to FIG. 25H, the anchor ejecting trolley has moved further left and the printed part has been entirely removed from the build volume. The printed part may be post-processed as discussed above to remove the remaining linear anchor.

Anchor ejecting trolleys and methods provide a reliable and rapid way for printed parts secured to a build platform to be removed. Although the anchor ejecting trolley approach is depicted for linear anchors, it may also be employed for punctate anchors. In embodiments used with punctate anchors, the anchor ejecting trolley may comprise a portion moveable between a first retracted position and a second extended position. When positioned adjacent a punctate receptacle, the portion could be moved from the first retracted position to the second extended position so as to force an anchor outward from the receptacle. In different embodiments, the portion may be spring-loaded, or the portion may be moved with a linear actuator.

Anchor ejecting trolleys may be manually controlled, e.g., using a hand cranked linear actuator, or automatically controlled, e.g., by an automated linear actuator. Anchor ejecting trolleys may optionally be fixed with bearings to allow easy travel within the channel. Optionally, anchor ejecting trolleys may be heated, lubricated, and/or made from a low friction material such as TEFLON or polished steel. In some embodiments, multiple anchor ejecting trolleys may be used in a build platform. They may be controlled independently or together. They may be staggered and/or have different geometries where their respective portions contact anchors, so that they apply peak separation force at different times in order to reduce the force needed to actuate the trolleys.

Another separator approach for separating a printed part from a build platform relates to a part ejecting trolley. Generally, this approach involves a channel in a build platform that has an opening along its length (like a linear receptacle). The channel with lengthwise opening may span substantially the length of the build platform. Prior to the invention, build platforms have not comprised such configurations, since build platforms are generally used for printing parts with flat bottoms. As will be described below, in the part ejecting trolley approach, the user tries not to fill the channel with the lengthwise opening.

FIG. 25I through FIG. 25L show an example use of a part ejecting trolley. FIG. 25I is a cross-section view of a build platform 54, where 8 is a printed part. Note that below the surface of the build platform is a channel in which a part ejecting trolley travels. The top of the channel has an opening that extends the length of the channel. FIG. 25J through FIG. 25L are stepwise side view cross-sections of the same build platform that is shown in cross-section view in FIG. 25I. Referring to FIG. 25J, part ejecting trolley 67 is moveable along the channel inside the build platform. The part ejecting trolley 67 extends from below the build platform top surface, through the plane of the build platform, and above it. Although it is not absolutely required, note that in this example the part ejecting trolley is gradually sloped upward from the left side to the right, the portion that extends above the build platform being on the right. Referring to FIG. 25K, the part ejecting trolley has moved from right to left, and the portion extending above the build platform has rammed the printed part 8, causing it to dislodge and be separated from the build platform. Just like for 66 in FIG. 25G, the gradually increasing slope of the portion of 67 that contacts the printed part applies separation force to the printed part more gradually and reduces the force needed to drive the part ejecting trolley. Referring to FIG. 25L, the part ejecting trolley has moved further left and the printed part has been entirely removed from the build volume.

Advantageously, a part ejecting trolley being partially below a printed part allows it to apply a separation force that has a significant component in the direction normal to the build platform, not just in the direction parallel to the build platform.

Currently, printed parts are often separated from build platforms with a manually or automatically wielded blade. It can be very difficult to get a blade under a printed part. To overcome this difficulty, greater force is often applied, which can cause damage to the printed part, the build platform, the tool, and/or the operator. Part ejecting trolleys could obviate use of a blade and excessive force.

In the depicted example, the part ejecting trolley was used to completely remove the printed part from the build volume. However, in some embodiments, a part ejecting trolley may simply be used to separate the part from the build platform, and the part may then be removed manually or automatically, e.g., by a robotic arm. This may be desirable for delicate parts.

For some types of parts (e.g., parts that would only have small sections contacting the build platform), it may be desirable to print the part onto a temporary raft. Accordingly, part ejecting trolleys may apply force to the raft and apply less load directly to the printed part. The part could then be separated from the raft using approaches discussed herein.

In some embodiments, multiple part ejecting trolleys may be used in a build platform. They may be controlled independently or together. They may be staggered and/or have different geometries where they contact the printed parts so that they apply peak separation force at different times, in order to reduce the force needed to actuate the trolleys and to reduce the strain on the printed parts.

In some embodiments, multiple part ejecting trolleys may be positioned linearly along a given channel. Each part ejecting trolley may become gradually higher with respect to the build platform surface. A final part ejecting trolley may have a particularly tall protrusion in order to push any previously separated parts off of the build platform.

In some embodiments, part ejecting trolleys may be adjustable (manually or automatically) in any combination of the following ways:

1) They may expand or contract in terms of their length along the channel.

2) They may be higher or lower in terms of their height with respect to the build platform top surface.

3) The slope or profile of the ejection surface that contacts the printed part may be adjusted.

Part ejecting trolleys may be actuated back and forth along their length multiple times. In some embodiments, for each pass the part ejecting trolley makes below a printed part, it may have any or all of the above parameters adjusted. For example, the height may be increased after each pass so that the part ejecting trolley very gradually applies separation force.

Knowing the location of part ejecting trolleys within a build platform, software may position a printed part in order to optimize the orientation of the part relative to the trolley paths. For example, a long rectangular part may be oriented along the length of a part ejecting trolley so that the part may be gradually separated from the build platform all along its length. If instead the orientation of the long rectangular part were rotated 90 degrees to intersect the trolley path, the part ejecting trolley may try to separate the part from the build platform at the middle of the part, which could possibly cause strain on the part and/or require a larger amount of separation force.

In some preferred embodiments, the lengthwise opening in the channel of a part ejecting trolley would be as small a gap in the build platform as practicable, so that printed material does not substantially enter it. (It should be noted that, unlike the case of a linear receptacle of a joiner, bulk deposition is not involved.) In some embodiments, the channel opening may be sealed from the build volume by use of flaps (e.g., rubber flaps) along the length of the channel opening, bellows, or the like, as long as movement of the part ejecting trolley remains possible. Maintaining a substantially flat surface along the build platform would also be desirable. Preferably, the flaps/bellows would be strong enough to substantially block printed material from entering the channel, but weak enough that they could be easily displaced by the part ejecting trolley as the trolley moves through the channel. In some embodiments, the flaps/bellows may allow lubricant (e.g., oil) to be contained within a channel.

In some embodiments, part ejecting trolleys may be actuated in coordination with an external operation such as a packaging or post-processing operation. In embodiments where the whole build platform did not need to be cleared, independent sections of the build platform could be cleared on demand. For example, a post-processing bath may be positioned near a build platform such that a part ejecting trolley could push printed parts into the bath. Only parts that needed to be post-processed would be pushed into the bath, whereas other parts could remain on the build platform for other subsequent steps. In another example, a packaging station may be positioned near a build platform. One at a time, parts could be actuated into boxes such that the correct part or parts end up in each box. Prior to the present invention, selectively removing printed parts from a build platform (as opposed to removing all printed parts at once) in coordination with an additional operation has not been known; more particularly, automated selective removal in coordination with an additional operation has not been known.

Figure 26:
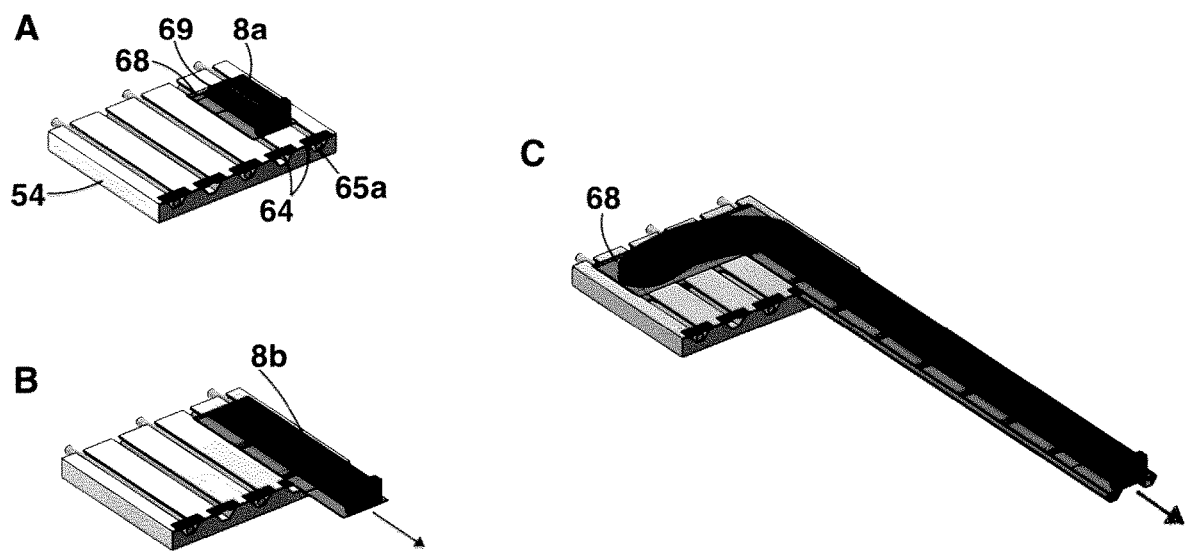
FIG. 26A through FIG. 26C show a stepwise example of "infinite axis printing" using a build platform having linear receptacles similar to those depicted in FIG. 24.

It can be seen that approaches described above (e.g., anchor trolleys, injected trolleys) have the ability to move a printed part with respect to the build platform with high precision. Such ability to clear the printed part from the build volume is highly advantageous, but it is not the only advantage provided according to the invention. Others include:

1) infinite axis printing
2) inter-operation positioning
3) active part fixturing A stepwise example of "infinite axis printing" is shown in FIG. 26. FIG. 26A shows a build platform 54 having linear receptacles similar to those depicted in FIG. 24. The linear receptacle on the far right has a lead screw 65a in it, around which an injected trolley has been deposited. A raft 68 has been printed across the two receptacles on the right, and printed part 8a has been printed on top of the raft 68. In this example, the printed part will be a hockey stick, and part 8a is the first portion of the hockey stick shaft. By rotating the lead screw 65a within the linear receptacles, the raft 68 and part 8a can be moved over the blades 64, separating them from the anchors, including the injected trolley. By moving the raft 68 and part 8a, previously occupied volume becomes available on the build platform, which can allow for more to be printed.

In FIG. 26B, it can be seen that the initial portion 8a of the hockey stick has been moved away from where it was printed, and two more portions 8b have been printed to continue building the length of the hockey stick's shaft.

Referring again to FIG. 26A, note that one end of the part 8a was printed with an angled face 69 (i.e., it is not a surface normal to the build platform top surface). This was done so that the nozzle of the material deposition printer could print layers below the completed layers of the first portion 8a without colliding with the previously printed part. When printing an entire part one layer at a time, this is not a concern, but now that the user is printing multiple layers to form a first portion of a printed part, moving the first portion over, and then starting to print an adjacent portion of the printed part, there exist new and more complicated issues of obstacle avoidance. Depending on the nozzle geometry, the angle of the surface which acts as an interface between portions may need to be adjusted accordingly. In printing technologies such as, for example, SLA, an angled surface between portions of the printed part may be needed to ensure that an energy source can reach the entire surface area of the interface without obstruction by previously printed layers. The interface orientation may need to be selected based on the printing technology being used. In some embodiments, the interface between portions of a part may not be planar; in the example of FIG. 26, it is shown as a 45 degree angled flat surface for simplicity/convenience. In some embodiments of infinite-axis printing, joiners, tie-roads, anchor arms, and/or other approaches discussed above may be used to reinforce interfaces between different portions of the printed part.

In FIG. 26C, it can be seen that several more portions of the hockey stick were printed. When the bottom part of the stick needed to be printed, more injected trolleys and linear anchors in other receptacles were used. The raft 68 was also extended. Creation and use of these elements would be implemented by software that would analyze the object to be printed before printing it. Placement of elements such as anchors, injected trolleys, and rafts, and instructions to advance the injected trolleys at selected points during the printing process would be determined by software and included in the printing instructions sent to the printer.

Using infinite axis printing, a printed part may extend beyond the build platform. Accordingly, in some embodiments, a support member(s) may be provided to partially or fully support the printed part. If the part becomes too large and remains unsupported, there may be risk of it breaking off or becoming damaged.

Infinite axis printing provides the ability to move a printed part outside of a build volume in order to print parts larger than the initial build volume. Technically the build volume does not change as the range of motion of the print head relative to the build platform is not changed, but the ability to move the printed part with respect to the build platform increases the "effective build volume". An extended effective axis is created. As can be seen in FIG. 26, this allows printed parts to be manufactured that have at least one dimension that is larger than the same dimension of the build volume.

Prior to the invention, there have not been printing technologies that can create objects larger than the build volume. Other approaches to increase the build volume have typically been to increase the amount that either the printing head or build platform can move. A common approach to expand the build volume is to increase the z-axis dimension (the distance between the print head and the build platform). Since the z-dimension of the part is unsupported, this can become problematic when a printed part becomes too large or heavy, as the printed part is fixtured to the build platform and the print head can become quite far from the build platform. Even if the printed part is fixtured well to the build platform, there may be flexibility in the printed part which allows it to twist, bend, sway, etc. This can lead to poor surface finish, certain dimensions not being the proper size, etc. The larger the build volume is made using this strategy (i.e., increasing the z-axis length), the worse this problem becomes.

The infinite axis solution disclosed herein, on the other hand, provides the ability to move a printed part in the plane of the build platform and does not require an increase in the unsupported length of a part between the print head and the build platform in order to expand the build volume. Accordingly, the increase in effective build volume provided according to the invention does not contribute to poor surface finish or decreased accuracy of dimensions.

"Inter-operation positioning" according to the invention refers to the ability to position a printed part with respect to multiple manufacturing operations. If, for example, a part is to be 3D-printed using a material extrusion printing technology, and then painted using an automated painting tool, there may be practical reasons for why the two operations should take place in separate areas. For example, the paint could cause damage to the 3D printer. In another example, a computer numerical control (CNC) milling operation may use liquid coolant that could damage a 3D printer and thus should be isolated from the printer. In these and other such cases, it is desirable for the printed part to move with respect to the operations. This could be achieved by keeping the printed part stationary and moving the 3D printer and (for example) painting system with respect to the part. However, the printer and painter could be very large and difficult to move. Another alternative is to keep the printing and painting processes stationary and move the printed part with respect to them, as printed parts are usually lightweight and easy to move.

The invention disclosed herein provides approaches to move a printed part with respect to the build platform. The invention further provides approaches to move a printed part outside of a printing zone and into the zone of another operation. This may be performed in an automated and precise way.

Figure 27:
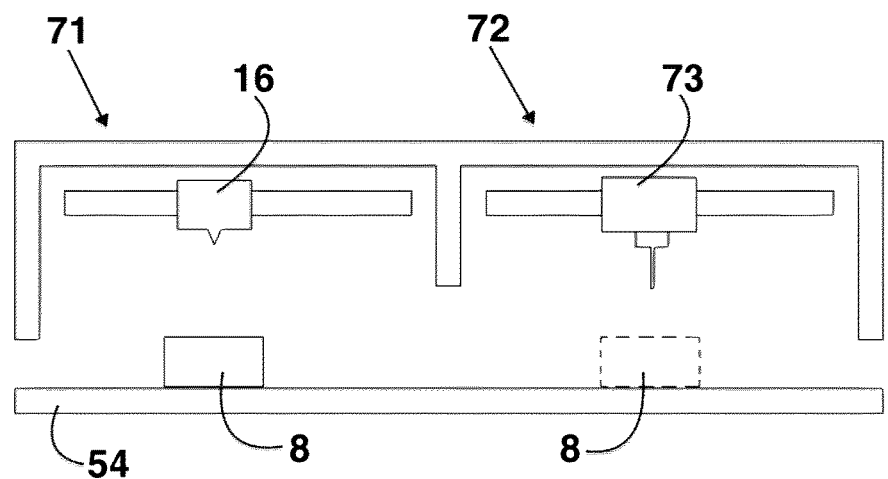
FIG. 27 shows an example of how an AM build platform can span between multiple processes.

In some embodiments, the AM build platform may span between one or more processes, an example of which is shown in FIG. 27. FIG. 27 is a simple schematic of a manufacturing system having a first operation and a second operation. On the left, the first operation 71 involves an FFF 3D printer with print head 16, and on the right, the second operation 72 involves a subtractive manufacturing CNC mill with machining head 73. Build platform 54 spans between the first and second operations such that printed part 8 can be moved outside of the 3D printing build volume on the left into the CNC mill working volume on the right using trolley technology embedded in the build platform (not shown). After a printed part has been moved outside of the 3D printing zone for processing in the CNC milling zone, a new 3D printing process could begin. That is, parts could be processed in parallel by the independent operations on the same build platform.

In some embodiments, a part can be actuated back to a previous operation for further processing. In addition to being able to move a printed part between the working volumes of different operations, trolley technology provides, in some embodiments, the ability to move a part along an axis during an operation.

Although many products can be manufactured in an integrated manner using just AM processes, there are also AM products that require other manufacturing processes. For example, in order to achieve a polished finish, the surface of an AM product may need to be polished using a polishing wheel. In another example, in order to achieve a very precise hole diameter, a product made by AM may be subjected to subtractive manufacturing such as reaming. Other examples of processes that may be employed for a part that has been manufactured using an AM technology include but are not limited to:

1) Surface finishing such as, for example, painting, powder coating, curing, sand blasting, anodizing, oxidizing, galvanizing, electroplating, etc.

2) Post-processing such as, for example, support material removal, curing, sintering, build platform removal, polishing, deburring, tapping, threading, etc.

3) Scanning or inspection, for example using metrology equipment such as a coordinate measuring machine (CMM), etc.

4) Using the printed part in another manufacturing operation such as, for example, injection molding, investment casting, die casting, etc.

5) Securing the printed part to foreign objects/components manually or in an automated way (e.g., pick-and-place) such as, for example, batteries, printed circuit boards, reinforcing members, displays, sensors, radio frequency identification (RFID) devices, threaded inserts, etc.

Trolley technology according to the invention may be employed to integrate such different processes.

Part fixturing has been discussed previously as the ability to reliably secure a printed part to a build platform during a build process. Advantageously, part fixturing approaches according to the invention may be extended to foreign objects that are used during a 3D printing or other process. In CNC machining, part fixturing is a common consideration in the processing workflow. Often, material is fixtured in place using a clamp before it is machined. This can be difficult if a part that is being fixtured/held does not have flat surfaces to be gripped by the clamp. If the material is brittle or not rigid, it can also be difficult to apply sufficient clamping force without damaging the material. Sometimes a custom clamp is required in order to secure parts in place. This can be expensive, time-consuming, and labor-intensive to create.

Joiner technology can be applied to fixturing/securing of foreign objects to obviate risk of application of excess force and/or to provide other advantages. A support(s) for the foreign object may be 3D printed such that the foreign object can be placed in it. Joiners could then be used to secure the foreign object to the printed support(s).

Figure 28:
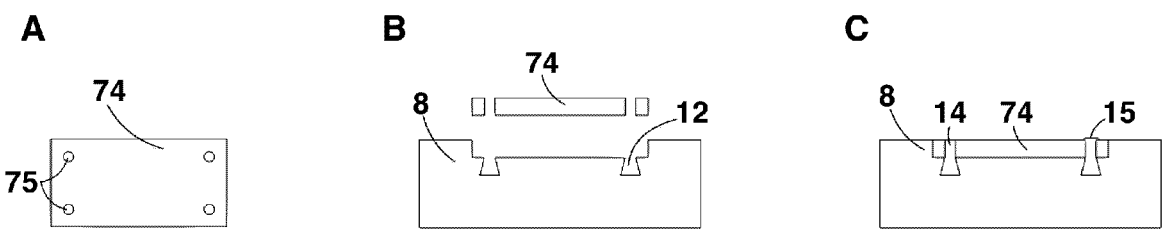
FIG. 28 shows an example of joiner technology used to secure a foreign object.

FIG. 28 shows an example of joiner technology used to secure a foreign object. FIG. 28A is a top view of a rectangular printed circuit board (PCB) 74 that has holes 75 in its corners. FIG. 28B is a side view of the same PCB 74 in a cross-section cutaway that intersects two of the holes, and a side cross-section of a 3D printed part 8 that is adapted to receive the PCB 74. The 3D printed part 8 has punctate receptacles 12 that align with the holes in the PCB 74. FIG. 28C is a side view cross-section showing the 3D printed part 8 with the PCB 74 positioned in it. Anchors 14 have been deposited into the part's receptacles, also filling the aligned holes of the PCB. The top surface 15 of the anchor on the right protrudes above the top surface of the PCB and its diameter is larger than the diameter of the hole of the PCB, forming a mechanical lock. The PCB and 3D printed part are now locked together. In some situations, it may be desired that the PCB and printed part be permanently secured to each other. In other situations, the PCB could be temporarily secured to the printed part as a fixturing approach for the PCB to undergo further processing. For example, the PCB could be CNC milled now that it is securely in place.

In the example of FIG. 28, a joiner is used to attach a foreign object to a printed part by using the anchor as a "rivet." This use of anchors to secure a foreign object is similar to the situation described above, where a joiner is used to reinforce layers of a part in FIG. 7.

Figure 29:
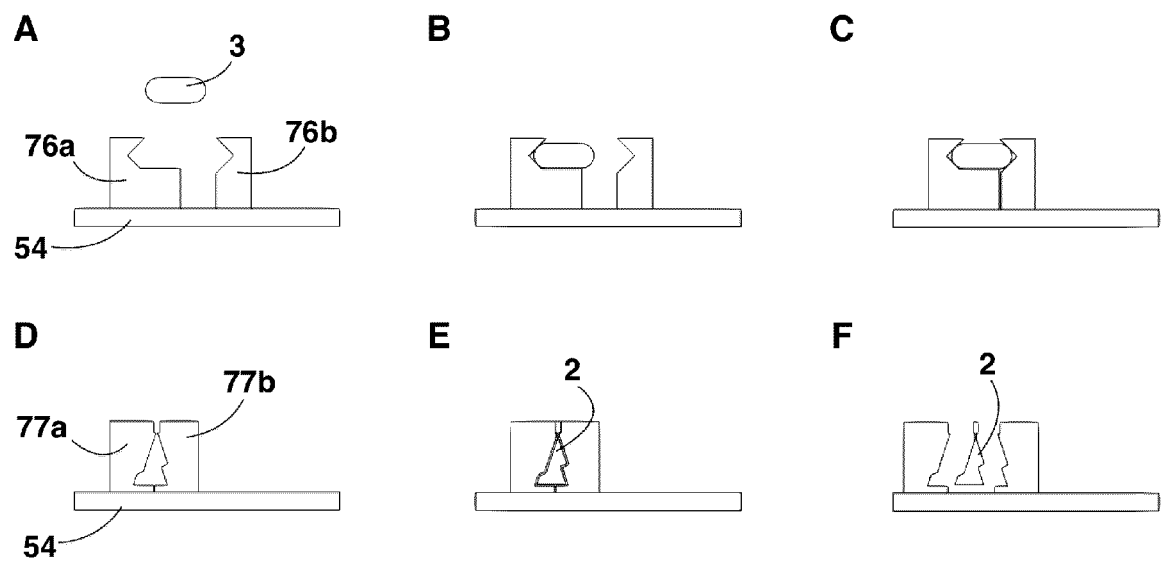
FIG. 29 shows in cross-section further examples of joiner technology used to secure objects and "active part fixturing".

FIG. 29 shows further examples of joiner technology used to secure objects. Here active part fixturing refers to approaches where foreign objects or printed objects are secured/fixtured using anchor trolleys and/or injected trolleys. Not only do anchor trolleys and injected trolleys allow printed parts to move with respect to the build platform, but they allow parts to move with respect to each other. For example, multiple trolleys may be employed in one build platform, such that two or more parts may move independently with respect to the build platform and each other (e.g., a first object moves left at 0.05 m/s and a second object moves right at 0.07 m/s).

FIG. 29A through FIG. 29C show a first stepwise example. Referring to FIG. 29A, a 3D-printed gripper having a first fixture component 76a and a second fixture component 76b is adapted to receive a foreign object 3. The fixture components are themselves fixtured due to having been printed onto anchor and/or injected trolleys (not shown) in the build platform 54. Referring to FIG. 29B, the object 3 rests on a complementary portion of the first fixture component 76a. Using the anchor and/or injected trolley(s) (not shown), fixture components 76a and/or 76b are actuated toward each other to close around the object 3 and secure it in place, which is shown in FIG. 29C. With object 3 secured in place, it may now be processed by an additive manufacturing technology, a 3D scanner, a CNC mill, etc.

According to the invention, active part fixturing provides a universal clamping system that is customizable and can allow complex objects to be secured easily. In some embodiments, there may be more than two fixture components involved in clamping. If the geometry of a foreign object is known, then in some embodiments computer software may create a custom fixture that conforms to the geometry of the foreign object. In some embodiments, a foreign object may be 3D-scanned and the scan data may then be used to create a custom fixture that conforms to the geometry of the foreign object. In some embodiments, fixture components may be loaded onto a build platform. These fixture components could be manufactured using another manufacturing technology, or could be reused from previous printing and fixturing. For example, a fixture component may be loaded by threading onto an injected trolley lead screw. In certain embodiments, there may be two or more injected trolleys in one channel, each trolley supporting a fixturing component.

In another example, fixture components may comprise anchors that could be inserted into receptacles on one or more anchor trolleys. In cases where fixture components are not needed anymore, the anchor and/or injected trolleys may be used to remove them from a build platform, and new fixture components may be printed in place or loaded. In some embodiments, changing fixture components may not involve manual labor, which can reduce costs. Where fixture components are loaded onto a build platform, datuming may be employed to verify location, as described in detail below.

FIG. 29D through FIG. 29F are side cross-sections showing a second stepwise example wherein a multi-part mold is created using anchor and/or injected trolleys. First mold component 77a and second mold component 77b have a cavity between them. The mold components are fixtured on build platform 54 due to having been printed onto anchor and/or injected trolleys (not shown) in the build platform. Referring to FIG. 29E, the mold cavity has been filled with material to form a part 2. Referring to FIG. 29F, using the anchor and/or injected trolleys (not shown), the mold components 77a and 77b have moved away from each other, allowing the molded part 2 to be removed from the mold.

According to the invention, active part fixturing provides a means of injection molding that is customizable. The process of forming a molded part between mold components on anchor and/or injected trolleys and then actuating the trolley(s) to free the molded part may be repeated multiple times if desired. In some embodiments, there may be more than two mold components. In some embodiments, a robotic arm may remove the molded part. In some embodiments, a specific mold component may act as an ejector pin, moving the molded part out of the mold. Clearing the molded part would permit another molding to take place. In some embodiments, mold components may be loaded onto a build platform. These mold components could be manufactured using another manufacturing technology, or could be reused from previous printing and molding. For example, a mold component may be loaded by threading onto an injected trolley lead screw. In certain embodiments, there may be two or more injected trolleys in one channel, each trolley supporting a mold component. In another example, mold components may comprise anchors that could be inserted into receptacles on one or more anchor trolleys. In cases where mold components are not needed anymore, the anchor and/or injected trolleys may be used to remove them from a build platform, and new mold components may be printed in place or loaded. In some embodiments, changing mold components may not involve manual labor, which can reduce costs. Where mold components are loaded onto a build platform, datuming may be employed to verify location, as described in detail below.

Figure 19:
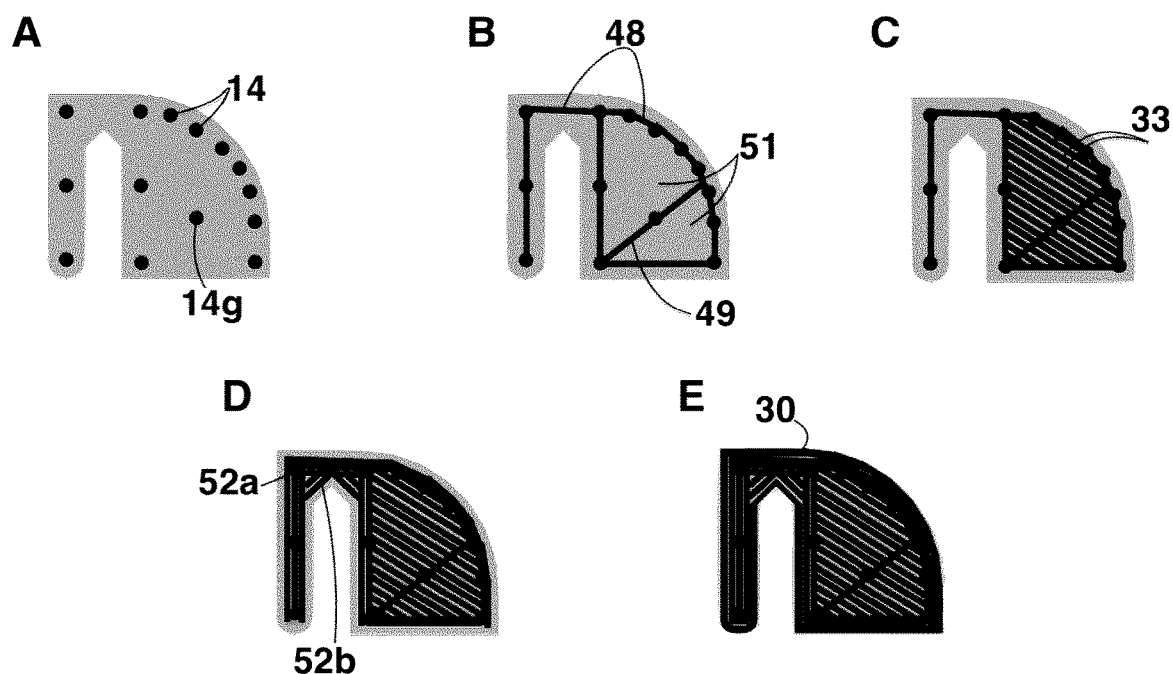
FIG. 19A through FIG. 19E show in top views a stepwise example of how an anchor layer tool path of a second material can be printed on a solid body of a first material.

Planning processes for joiners used to attach materials have been discussed in detail above, particularly with respect to FIG. 17, FIG. 18, and FIG. 19. Such processes are also applicable to planning for joiners used to attach parts to build platforms. Notwithstanding, some aspects of planning processes for joiners for part fixturing will be discussed below.

Currently, positioning a printed part on a build platform in software is usually done manually by a user (e.g., by dragging and dropping a part). Some software automatically positions a part location so that the part is centered and spaced from other parts. With a standard rectangular glass build platform, it does not matter very much where a part is positioned; it will print the same in a corner as it will in the middle. However, for certain embodiments described herein, there is a dependence on where a part is positioned with respect to joiner features in the build platform (e.g., punctate and linear receptacles, other channels, trolleys). Planning methods according to the invention provide positioning of printed parts relative to such features so that the features function appropriately; this includes generating anchors (and in some cases, rafts) for appropriate function together with the features of the build platform. Examples discussed below with reference to FIG. 30 will illustrate.

Embodiments can automatically position printed parts with respect to such joiner features. This can remove the manual effort that would be required to plan out part positions for part fixturing. In a factory of the future, where a large quantity of prints may need to be processed and printed every hour, it will be useful for these build setup processes to be automated.

FIG. 30A is a top view of a build platform 54 which has anchor pins 61, punctate receptacles 12, a linear receptacle fitted with a threaded rod 65b (to become an injected trolley), a linear receptacle 12a, and an anchor trolley mechanism 62. A parting blade 64 is at the end of each of the three linear receptacles/channels. Two shoe insoles will be printed; the desired parts are shown in FIG. 30A as 44a and 44b, respectively.

In order to secure insole 44a to the build platform with joiners, the locations for joiners need to be determined. Based on the fixed number of receptacles available in the build platform, there is a discrete number of locations where joiners could be placed. For insole 44a, all receptacle locations under or adjacent to the printed part are identified. Unlike the planning step depicted in FIG. 18F, here all of the joiners do not need to be fully underneath the printed part. For part fixturing, it is desirable in some embodiments to have anchors deposited outside of the bottom surface of the printed part, as this can constrain the outside edges of the part. Not having any joiners outside of the part could risk the outside edges not being constrained well enough and could lead to bending or warping in those areas.

Referring to FIG. 30B, it may be desirable to print a raft 68a on top of the selected joiners 9 in order to provide a flat, uniform surface on which to print the part. To form a raft geometry, joiners around the printed part may be connected by roads and the raft may be generated to fill the area within the connected joiners. (See discussion of FIG. 19 for a similar example.) This would ensure all external sections of the raft are printed onto joiners to secure it to the build platform sufficiently. In some embodiments, the raft may be provided with a feature(s) for easy separation from the part (e.g., raft separation distance, dissolvable layer, etc.) as discussed in regard to FIG. 21.

In other embodiments (not shown), a part may be printed without a raft and the joiners can be directly attached to the printed part. The decision of whether or not to use a raft may be determined by the build planning software based on the density of receptacles underneath the part and if they are sufficient to fixture a part without a raft connecting them.

Figure 30:
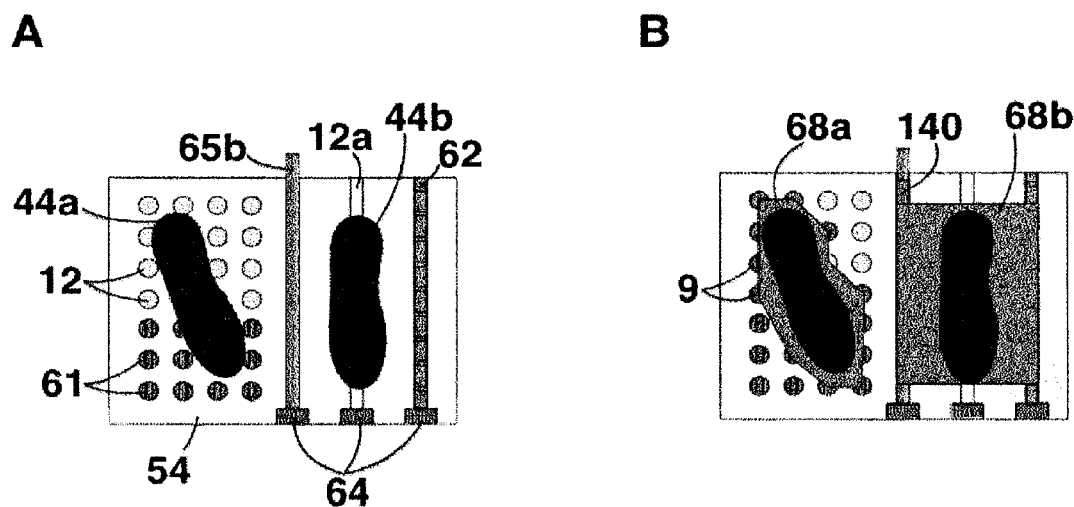
FIG. 30A and FIG. 30B show two examples of positioning printed parts with respect to joiner features. Both are top views of build platforms onto which insoles are printed.

Referring again to FIG. 30, in order to secure insole 44b to the build platform with joiners, the location for joiners need to be determined. For linear receptacles, injected trolleys, and anchor trolleys, the length of the anchor is determined. For linear receptacles and injected trolleys, this length may be the length underneath the printed part plus a constant offset past the part in both linear directions. For anchor trolleys, the total length is similar but anchors need only be deposited in discrete receptacles along the desired portion of the trolley. As shown in FIG. 30B, a raft 68b may optionally be generated to fill the area between the trolleys in order to provide a flat, uniform surface on which to print the part.

For the injected trolley at the left of the raft 68b, optional anchor extension 140 may be provided and can be added automatically in software. Extension 140 is an extra segment of anchor that facilitates separation of the anchor from the raft once the final raft portion near 140 is passed by the blade. Having anchor extension 140 ensures there is enough material engaging the threads in the lead screw/threaded rod to achieve the desired pushing force without risk of the trolley breaking or stripping based on excessive load from the lead screw/threaded rod.

Currently, when 3D printers fabricate parts, each segment of the part is referenced with respect to an absolute or relative coordinate system local to the printer. A print head generally performs a homing sequence relative to the build platform. Ordinarily, the homing sequence needs to be more precise in the z-axis of the printer (axis normal to flat build platform), and can be less precise in the plane of the build platform (x and y axes). That is, the distance between the print head and build platform is a more sensitive parameter, whereas printing a part +/−3 mm in the x- or y-axis will usually have a negligible effect on the print. However, with respect to the present invention, precision in all three axes is desirable when locating features of a part, foreign object, and/or build platform, such as, for example, receptacles, relative to the print head. For example, if a print head were 3 mm off in the x-axis relative to the true "home" of the build, then when it attempted to deposit material into a linear receptacle, it may instead deposit the material onto the build platform top surface beside the linear receptacle, which could cause the print to fail.

Furthermore, according to the invention, foreign objects may be introduced into AM processes. Foreign objects may need to be secured structurally using joiners and/or may need to make other connections, such as, for example, electrical connections made with conductive joiners. In some embodiments, pre-existing fixture components or mold components are deemed foreign objects when they are loaded onto anchor or injected trolleys. In all of these cases, precisely positioning the foreign object on the build platform relative to the print head (and/or other objects on the build platform) is highly desirable. For example, if two mold components were not positioned correctly relative to each other and to the print head, subsequent injection molding would likely fail.

The problem of part location/orientation is common in CNC machining. When a block of material or part is loaded into a CNC mill, the machine first needs to ascertain exactly where the geometry of the part is relative to an origin (e.g., a selected feature). This is usually done using a probe and is referred to as datum acquisition or "datuming". In 3D printing, datuming, wherein the geometry of a build platform, foreign object, printed part, and/or any other object within a 3D printing process is located with respect to the print head, is a new problem. According to the invention, such datuming includes collection of data regarding position and orientation. For example, data may be collected about a foreign object introduced into a printing zone, such that the foreign object's position and orientation are obtained with respect to an origin and/or with respect to another known datum location within the 3D printer, e.g., a build platform or printed part. Preferably, a human user or automated alternative could place a foreign object into a 3D printing zone and datuming systems in the printer would determine its precise position and orientation. As described below, in some embodiments, corrective actions may then be provided.

Several datuming approaches using a variety of tools may be employed in accordance with the invention and are discussed below. In some embodiments, a single such approach may be used; in other embodiments, such approaches and tools may be used in combination.

In some embodiments, a print head (or alternative tool head) may have a measurement probe affixed thereto. The probe can be run through a datum collection cycle in which it probes multiple areas of a build platform and/or foreign object in order to determine the object's position and orientation. Foreign objects and/or build platforms may be fitted with special datum features that allow a probe to easily determine position and orientation.

In some embodiments, a camera may be employed to capture images of a build platform or foreign object in order to determine the object's position. The build platform and/or foreign object may be fitted with markings such as, for example, scale bars, that aid a camera in determining position and orientation. In some embodiments, a single camera may be moved with respect to an object whose image is being captured, such that sufficient data is obtained to determine the object's 3D geometry and position/orientation relative to the build platform. In some embodiments, multiple cameras or a stereo camera may be employed to determine the object's 3D geometry and position/orientation relative to the build platform.

In some embodiments, a 3D scanner may be used to scan a build platform and/or foreign object in order to determine the object's position and orientation. In some embodiments, the scanner and/or the object being scanned may be precisely moved so that scanning data may be collected from multiple angles.

In certain situations, e.g., where foreign objects are very large and/or not dimensionally stable, it may be desirable to provide additional means for locating receptacles relative to the print head. In some embodiments, receptacles may have special datum elements associated with them. For example, each receptacle could have a painted-on pattern such as a grid or scaled lines that is captured by a camera to determine the exact location and orientation of the receptacle. This could further ensure that the print head deposits anchors precisely and joiners are reliably formed. In some embodiments, markings at a receptacle could include ADP. That is, a receptacle could be labeled with anchor information appropriate for the receptacle. For example, a receptacle may have a bar code or the like that, when scanned by the print head or printer, provides details such as the volume of material that could be deposited to fill the receptacle, the precise location of the receptacle, the angle at which material should be deposited into the receptacle, etc.

Data obtained from the probe, camera, 3D scanner, etc. can be processed and used by the 3D printer. If a foreign object is exactly at its desired position relative to the build platform, then no corrective action needs to take place. If it is not, then corrective action may be required. In some embodiments, position/orientation may be corrected either manually or using an automated actuator. Further data (feedback) may be acquired to confirm or repeat the repositioning. In some embodiments, corrective action could be in the form of an offset corresponding to the determined misalignment that is accounted for in the printer control code (usually G-code) that is executed for the print. That is, compensating factor(s) along an axis or axes could be provided in the printing code so as to achieve printing where desired.

In some embodiments in which a foreign object is used in an integrated AM process, data about the foreign object may be known at the time that the printing code for the part is being generated. Such data may include the foreign object material, geometry, locations and specifications of any receptacles, etc. When a foreign object is introduced into a 3D printer, it may be desirable to verify that it is the chosen foreign object. If the wrong object were to be included it could compromise the quality of the product being printed or cause the print to fail. Objects maybe verified, for example, by having visual markings that are checked by a camera or scanner, or by having integrated ID systems such as RFID tags.

If data about a foreign object is not known at the point when it is introduced into a 3D printing process, data may need to be collected. In some embodiments, the object may be provided with an identifier whose information is stored in a database. For example, the object may have a part number on it. When the number is scanned by a 3D printer's camera, the system would reference a database with information about the part such as its material, geometry, locations and specifications of any receptacles, etc. If there is no information known about the foreign object being introduced, then data may be collected in situ. A 3D scanner or any of the other approaches and tools discussed above may be employed. The data collected would be processed in order to determine 3D geometry of the object. Any receptacles that may be present would be identified from the data to allow use of joiners. Such data collection and processing could be advantageous as it would allow substantially any object to be inserted into a 3D printer and potentially used. For example, if a part was being printed that needed a stainless steel hinge, a user could introduce into the process a stainless steel hinge that happened to be in stock, and the system would take any corrective actions to integrate this particular hinge in the process, rather than having to order another specific hinge model that was not in stock.

Figure 31:
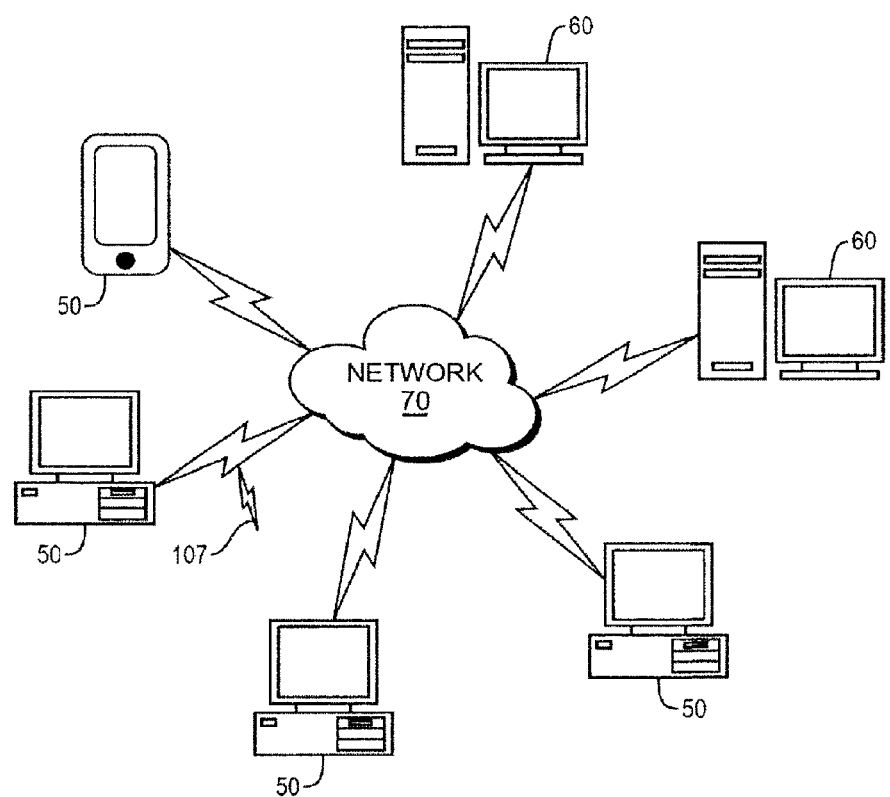
FIG. 31 illustrates a computer network or similar digital processing environment in which embodiments of the present invention may be implemented.

FIG. 31 illustrates a computer network or similar digital processing environment in which embodiments of the present invention may be implemented.

Client computer(s)/devices 50 (e.g., a 3D printer) and server computer(s) 60 provide processing, storage, and input/output devices for executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, BLUETOOTH®, etc.) to communicate with one another. Other electronic device/computer network architectures are suitable.

Figure 32:
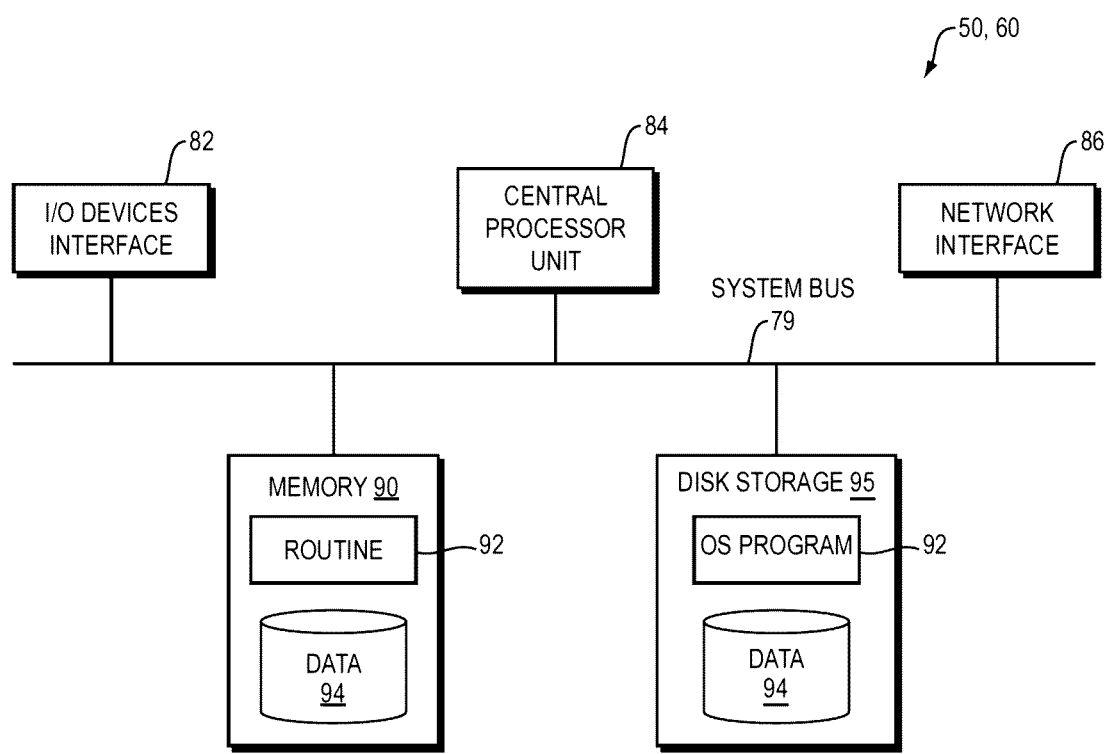
FIG. 32 is a diagram of an example internal structure of a computer (e.g., client processor/device or server computer) in the computer system of FIG. 31.

FIG. 32 is a diagram of an example internal structure of a computer (e.g., client processor/device 50 or server computer 60) in the computer system of FIG. 31. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, microphones, loudspeakers, etc.) to the computer 50, 60. A network interface 86 allows the computer to connect to various other devices attached to a network (e.g., network 70 of FIG. 31). Memory 90 provides volatile storage for computer software instructions 92 and data 94 used to implement an embodiment of the present invention (e.g., identifying a multi-material interface, identifying locations of joiners, identifying/creating receptacles, creating tool path instructions for anchor printing, etc., as detailed above). Disk storage 95 provides non-volatile storage for computer software instructions 92 and data 94 used to implement an embodiment of the present invention. A central processor unit 84 is also attached to the system bus 79 and provides for the execution of computer instructions (e.g., code).

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, USB drives, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

In alternative embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer.

Generally speaking, the term "carrier medium" or transient carrier encompasses the foregoing transient signals, propagated signals, propagated medium, storage medium and the like.

In other embodiments, the program product 92 may be implemented as a so-called Software as a Service (SaaS), or other installation or communication supporting end-users.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A system for securing a part to a build platform and separating the part from the build platform, the system comprising:

a) a build platform having a receptacle;

b) an anchor bulk deposited by an additive manufacturing tool head in the receptacle, the anchor attached to a base of a part being formed in an additive manufacturing process, the anchor securing the part to the build platform while the part is being formed; and c) a mechanism that effects controlled separation of at least a portion of the anchor from at least one of the base and the receptacle to separate the formed part from the build platform;

wherein the receptacle is a linear receptacle and includes a linear actuation mechanism, the anchor deposited around the linear actuation mechanism to form an injected trolley, and wherein actuation of the injected trolley by the linear actuation mechanism causes separation of at least a portion of the anchor from the at least one of the base and the receptacle.

2. A separator to separate a part from a build platform in an additive manufacturing system, the separator comprising:

a) a build platform having a surface, an opening in the surface, and a channel below the surface, the channel communicating with the opening and being parallel to a plane of the platform, a part formed by an additive manufacturing tool head being positioned on the surface and above at least a portion of the opening; and b) a trolley movable in the channel, wherein movement of the trolley in the channel and under and/or adjacent to the part causes separation of the part from the build platform;

wherein the opening of the build platform comprises a punctate receptacle in which an anchor is bulk deposited by the additive manufacturing tool head to secure the part to the build platform, a top portion of the anchor being attached to the part, a lower portion of the anchor extending into the channel, and the trolley including a severing means to shear off the lower portion of the anchor with movement of the trolley in the channel.

3. A method for securing a part to a build platform and separating the part from the build platform, the method comprising:

a) joining, comprising
   (i) bulk depositing by an additive manufacturing tool head an anchor in a receptacle of a build platform, and
   (ii) attaching the anchor to a base of a part being formed in the additive manufacturing process, the anchor securing the part to the build platform while the part is being formed; and b) with a mechanism that effects controlled separation, separating the formed part from the build platform by separating at least a portion of the anchor from at least one of the base and the receptacle;

wherein the receptacle is a linear receptacle and includes a linear actuation mechanism, the anchor deposited around the linear actuation mechanism to form an injected trolley, and wherein actuation of the injected trolley by the linear actuation mechanism causes separation of at least a portion of the anchor from the at least one of the base and the receptacle.

4. A method of separating a part from a build platform in an additive manufacturing system, the method comprising:

a) providing a build platform having a surface, an opening in the surface, and a channel below the surface, the channel communicating with the opening and being parallel to a plane of the platform, a part formed by an additive manufacturing tool head being positioned on the surface and above at least a portion of the opening; and b) moving a trolley in the channel and under and/or adjacent to the part to cause separation of the part from the build platform;

wherein the opening of the build platform comprises a punctate receptacle in which an anchor is bulk deposited to secure the part to the build platform, a top portion of the anchor being attached to the part, a lower portion of the anchor extending into the channel, and the trolley including a severing means to shear off the lower portion of the anchor with movement of the trolley in the channel.

\* \* \* \* \*